US008075669B2

(12) United States Patent
Meindl et al.

(10) Patent No.: US 8,075,669 B2
(45) Date of Patent: Dec. 13, 2011

(54) COMPOSITE MATERIAL

(75) Inventors: Klaus Meindl, Putzbrunn (DE); Wolfgang Buerger, Burgrain (DE)

(73) Assignee: Gore Enterprise Holdings, Inc., Newark, DE (US)

(*) Notice: Subject to any disclaimer, the term of this patent is extended or adjusted under 35 U.S.C. 154(b) by 730 days.

(21) Appl. No.: 12/107,595

(22) Filed: Apr. 22, 2008

(65) Prior Publication Data
US 2009/0049988 A1 Feb. 26, 2009

(30) Foreign Application Priority Data

Apr. 23, 2007 (EP) .................................. 07251682
May 25, 2007 (GB) .................................. 0710058.9

(51) Int. Cl.
*B01D 53/22* (2006.01)
*B01D 71/06* (2006.01)
*B01D 69/12* (2006.01)

(52) U.S. Cl. ............... 95/46; 95/45; 95/52; 96/4; 96/6; 96/10; 96/11; 96/12; 96/13; 210/640; 210/500.27; 55/385.4; 55/524

(58) Field of Classification Search .............. 96/4, 6, 96/8, 10, 11, 12, 13, 14; 95/45, 46, 52; 210/640, 210/500.27; 428/319.3, 36.6; 55/385.4, 55/524
See application file for complete search history.

(56) References Cited

U.S. PATENT DOCUMENTS

| | | | |
|---|---|---|---|
| 3,341,497 A | 9/1967 | Sherman et al. | |
| 3,354,022 A | 11/1967 | Dettre et al. | |
| 3,953,566 A | 4/1976 | Gore | |
| 3,962,153 A | 6/1976 | Gore | |
| 4,096,227 A | 6/1978 | Gore | |
| 4,187,390 A | 2/1980 | Gore | |
| 4,754,009 A | 6/1988 | Squire | |
| 4,909,810 A * | 3/1990 | Nakao et al. | 95/52 |
| 4,945,125 A | 7/1990 | Dillon et al. | |
| 5,066,683 A | 11/1991 | Dillon et al. | |
| 5,116,650 A | 5/1992 | Bowser | |
| 5,156,780 A | 10/1992 | Kenigsberg et al. | |
| 5,157,058 A | 10/1992 | Dillon et al. | |
| 5,271,839 A | 12/1993 | Moya et al. | |
| 5,343,434 A | 8/1994 | Noguchi | |
| 5,352,513 A | 10/1994 | Mrozinski et al. | |
| 5,362,553 A | 11/1994 | Dillon et al. | |
| 5,370,836 A | 12/1994 | Yokoyama et al. | |
| 5,462,586 A * | 10/1995 | Sugiyama et al. | 96/13 |
| 5,466,509 A | 11/1995 | Kowligi et al. | |
| 5,539,072 A | 7/1996 | Wu | |
| 5,554,414 A | 9/1996 | Moya et al. | |
| 5,560,986 A * | 10/1996 | Mortimer, Jr. | 428/308.4 |
| 5,627,042 A | 5/1997 | Hirose et al. | |
| 5,919,878 A | 7/1999 | Brothers et al. | |
| 6,159,565 A | 12/2000 | Campbell et al. | |
| 6,196,708 B1 | 3/2001 | Rogers | |
| 6,355,081 B1 | 3/2002 | Wang et al. | |

(Continued)

FOREIGN PATENT DOCUMENTS

EP 0 307 123 3/1989

(Continued)

*Primary Examiner* — Jason M Greene
(74) *Attorney, Agent, or Firm* — Richard W. Ellis

(57) ABSTRACT

There is described a composite material such as venting materials and vents containing said venting materials. The vents are air- or more generally gas-permeable venting composites that are oleophobic and liquid repellent.

29 Claims, 23 Drawing Sheets

U.S. PATENT DOCUMENTS

| | | |
|---|---|---|
| 6,406,517 B1 * | 6/2002 | Avery et al. ............ 95/45 |
| 6,410,084 B1 | 6/2002 | Klare et al. |
| 6,627,291 B1 | 9/2003 | Clark et al. |
| 6,638,610 B1 | 10/2003 | Yao |
| 6,676,993 B2 | 1/2004 | Klare |
| 6,683,126 B2 | 1/2004 | Keller et al. |
| 6,737,489 B2 | 5/2004 | Linert et al. |
| 6,780,497 B1 | 8/2004 | Walter |
| 6,805,731 B2 * | 10/2004 | Cheng et al. ............ 96/8 |
| 2001/0018096 A1 | 8/2001 | Klare |
| 2003/0211264 A1 * | 11/2003 | Farnsworth et al. ...... 428/36.9 |
| 2004/0026245 A1 * | 2/2004 | Agarwal et al. ......... 204/424 |
| 2005/0061663 A1 | 3/2005 | Chen et al. |
| 2005/0124242 A1 | 6/2005 | Norvell et al. |
| 2006/0047311 A1 | 3/2006 | Lutz et al. |
| 2007/0231542 A1 | 10/2007 | Deng et al. |

FOREIGN PATENT DOCUMENTS

| | | |
|---|---|---|
| EP | 0 513 392 | 11/1992 |
| EP | 0 729 901 | 9/1996 |
| EP | 1 216 089 | 6/2002 |
| WO | WO 94/13469 | 6/1994 |
| WO | 96/32635 | 10/1996 |
| WO | 2004/091747 | 10/2004 |
| WO | WO 2006/127946 | 11/2006 |

\* cited by examiner

Direction of Uniaxial Expansion

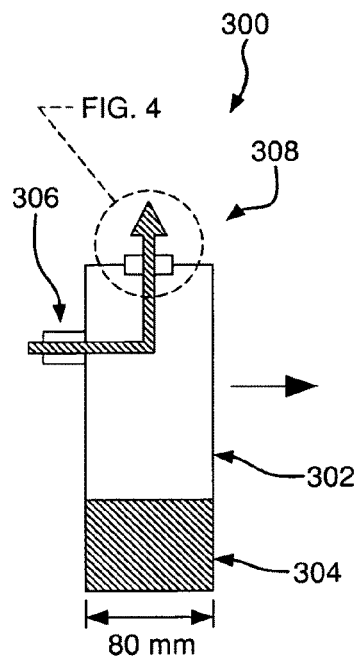
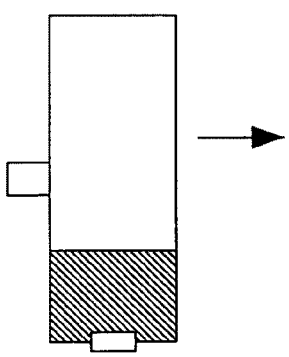
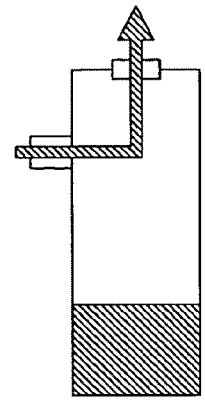
FIG. 3A  FIG. 3B  FIG. 3C
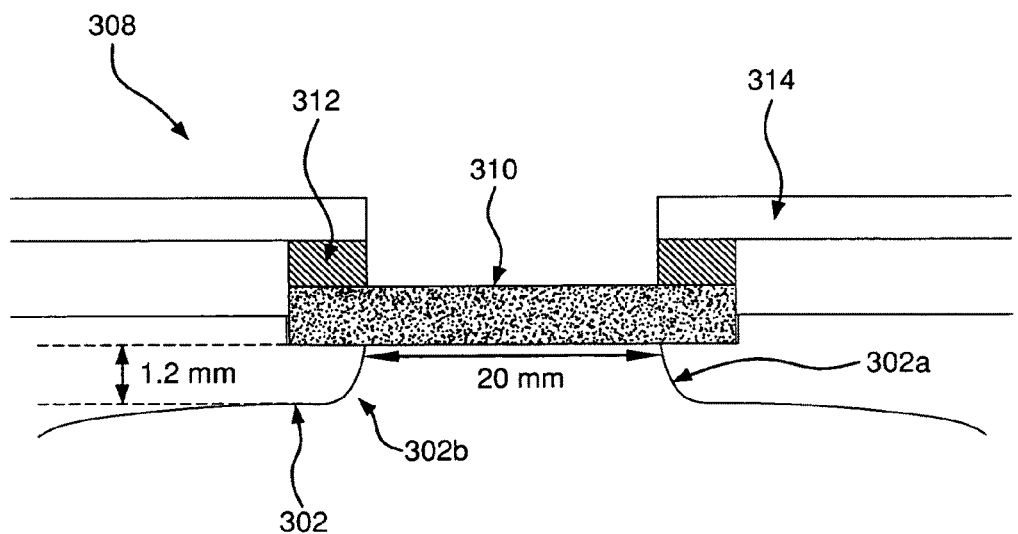
FIG. 4

Comparison of Example 12 (left side) and Example 13 (right side).

COMPOSITE MATERIAL

FIELD OF THE INVENTION

This invention relates to composite materials such as venting materials and vents containing said venting materials. More particularly, the present invention relates to air- or more generally gas-permeable venting composites that are oleophobic and liquid repellent.

BACKGROUND OF THE INVENTION

There are many types of vents on the market that allow containers to vent by allowing a small amount of air flow through the vent. Packaging vents are commonly used in providing venting solutions for consumer and industrial liquid cleaners. These liquid cleaners normally contain organic additives and surfactants which lower the surface tension of the liquid thereby promoting wetting and adherence to surfaces.

A further difficulty is that many types of newly developed liquid cleaners additionally have a higher viscosity than previously used. Higher viscosity liquids are preferred as this allows the liquid cleaner to function much better by increasing the adherence and contact time of the liquid to the surface to be cleaned. As a result of both the higher viscosity and the low surface tension, the viscous liquids also have the ability to stick much better to the vents themselves. The vents can therefore easily become clogged by liquid left on the surface of the vent. A further problem arises if the viscous liquid dries on the surface of the vent leaving an impermeable film made up of solid components dissolved in the liquid. The vent may therefore be rendered permanently inoperable with highly viscous liquids.

There is also the issue that many types of liquid cleaners emit small amounts of gaseous substances such as oxygen or chlorine which can lead to containers becoming over-inflated if a vent becomes clogged by a viscous liquid.

Viscous oils are a further type of liquid causing problems in automotive related venting applications. Motor oils, for example, have the ability to stick onto vents for electronic housings thereby preventing air flow and pressure exchange through the vent.

U.S. Pat. No. 5,462,586 relates to an oil- and water-repellent gas-permeable filter which contains a porous filter material that has its internal and external surfaces coated with a compound comprising a first fluoropolymer having a fluorine-containing aliphatic cyclic structure in the main chain and a second fluoropolymer containing polyfluoroalkyl groups. The coating in U.S. Pat. No. 5,462,586 is intended to have substantially no effect on the porosity of the porous filter material. U.S. Pat. No. 5,462,586 is incorporated herein by reference.

It is an object of at least one aspect of the present invention to obviate or mitigate at least one or more of the aforementioned problems.

It is a further object of at least one aspect of the present invention to provide a venting composite that is capable of providing sufficient residual gas flow (e.g. air flow) even after coming into contact with a liquid having both a high viscosity and low surface tension.

SUMMARY OF THE INVENTION

According to a first aspect of the present invention, there is provided a gas-permeable composite comprising:
(a) a porous polymeric structure having a structure defining a plurality of pores extending therethrough and with at least one outer surface;
(b) a coating covering at least a portion of said outer surface;
(c) said coating comprising at least a first and second component;
(d) said first component comprising oleophobic and hydrophobic fluorinated material; and
(e) said second component comprising a perfluoropolyether (PFPE), said PFPE comprising end-groups selected from the following:

$$-(O)_n-(CR_1R_2)_m-CR_3R_4R_5$$

wherein:
$R_1$=H, F, Cl, Br or I;
$R_2$=H, F, Cl, Br or I;
$R_3$=H, F, Cl, Br or I;
$R_4$=H, F, Cl, Br or I;
$R_5$=H, F, Cl, Br, I, alkyl or aryl;
n=0 or 1; and
m=0-10.

The $R_5$ group may be an alkyl- or aryl-group.

Typically, the PFPE may comprise two end-groups at opposite ends of the PFPE structure.

Typically, the PFPE may comprise two perfluorinated end-groups at opposite ends of the PFPE structure, such as, $-OCF_3$, $-OC_2F_5$, and $-OC_3F_7$.

However, there may also be non-perfluorinated end groups such as those containing H, Cl, Br or I radicals. Examples of non-perfluorinated end groups of PFPEs (e.g. neutral PFPEs) may comprise structures such as:

$-CF_2R_6$=H, Cl, Br, or I;

or $-CFR_7-CF_3$ $R_7$=H, Cl, Br or I.

The end-groups according to the formula of $-(O)_n-(CR_1R_2)_m-CR_3R_4R_5$ may be selected from any combination of the following:
$-OCF_3$; $-OC_2F_5$; $-OC_3F_7$; $-OC_4F_9$; $-OC_5F_{11}$; $-OC_6F_{13}$; $-OC_7F_{15}$; $-OC_8F_{17}$; $-C_9F_{19}$; $-OC_{10}F_{21}$;
$-OCF_2H$; $-OC_2F_4H$; $-OC_3F_6H$; $-OC_4F_8H$; $-OC_5F_{10}H$; $-OC_6F_{12}H$; $-OC_7F_{14}H$; $-OC_8F_{16}H$; $-OC_9F_{18}H$; $-OC_{10}F_{20}H$;
$-OCF_2Cl$; $-OC_2F_4Cl$; $-OC_3F_6Cl$; $-OC_4F_8Cl$; $-OC_5F_{10}Cl$; $-OC_6F_{12}Cl$; $-OC_7F_{14}Cl$; $-OC_8F_{16}Cl$; $-OC_9F_{18}Cl$; $-OC_{10}F_{20}Cl$;
$-OCF_2Br$; $-OC_2F_4Br$; $-OC_3F_6Br$; $-OC_4F_8Br$; $-OC_5F_{10}Br$; $-OC_6F_{12}Br$; $-OC_7F_{14}Br$; $-OC_8F_{16}Br$; $-OC_9F_{18}Br$; $-OC_{10}F_{20}Br$;
$-OCF_2I$; $-OC_2F_4I$; $-OC_3F_6I$; $-OC_4F_8I$; $-OC_5F_{10}I$; $-OC_6F_{12}I$; $-OC_7F_{14}I$; $-OC_8F_{16}I$; $-OC_9F_{18}I$; $-OC_{10}F_{20}I$;
$-OCF_1H_2$; $-OC_2F_3H_2$; $-OC_3F_5H_2$; $-OC_4F_7H_2$; $-OC_5F_9H_2$; $-OC_6F_{11}H_2$; $-OC_7F_{13}H_2$; $-OC_8F_{15}H_2$; $-OC_9F_{17}H_2$; $-OC_{10}F_{19}H_2$;
$-OCFCl_2$; $-OC_2F_3Cl_2$; $-OC_3F_5Cl_2$; $-OC_4F_7Cl_2$; $-OC_5F_9Cl_2$; $-OC_6F_{11}Cl_2$; $-OC_7F_{13}Cl_2$; $-OC_8F_{15}Cl_2$; $-OC_9F_{17}Cl_2$; $-OC_{10}F_{19}Cl_2$;
$-OCF_1Br_2$; $-OC_2F_3Br_2$; $-OC_3F_5Br_2$; $-OC_4F_7Br_2$; $-OC_5F_9Br_2$; $-OC_6F_1Br_2$; $-OC_7F_{13}Br_2$; $-OC_8F_{15}Br_2$; $-OC_9F_{17}Br_2$; $-OC_{10}F_{19}Br_2$;

—$OCF_1I_2$; —$OC_2F_3I_2$; —$OC_3F_5I_2$; —$OC_4F_7I_2$; —$OC_5F_9I_2$; —$OC_6F_{11}I_2$; —$OC_7F_{13}I_2$; —$OC_8F_{15}I_2$; —$OC_9F_{17}I_2$; —$OC_{10}F_{19}I_2$;

—$CF_3$; —$C_2F_5$; —$C_3F_7$; —$C_4F_9$; —$C_5F_{11}$; —$C_6F_{13}$; —$C_7F_{15}$; —$C_8F_{17}$; —$C_9F_{19}$; —$C_{10}F_{21}$;

—$CF_2H$; —$C_2F_4H$; —$C_3F_6H$; —$C_4F_8H$; —$C_5F_{10}H$; —$C_6F_{12}H$; —$C_7F_{14}H$; —$C_8F_{16}H$; —$C_9F_{18}H$; —$C_{10}F_{20}H$;

—$CF_2Cl$; —$C_2F_4Cl$; —$C_3F_6Cl$; —$C_4F_8Cl$; —$C_5F_{10}Cl$; —$C_6F_{12}Cl$; —$C_7F_{14}Cl$; —$C_8F_{16}Cl$; —$C_9F_{18}Cl$; —$C_{10}F_{20}Cl$;

—$CF_2Br$; —$C_2F_4Br$; —$C_3F_6Br$; —$C_4F_8Br$; —$C_5F_{10}Br$; —$C_6F_{12}Br$; —$C_7F_{14}Br$; —$C_8F_{16}Br$; —$C_9F_{18}Br$; —$C_{10}F_{20}Br$;

—$CF_2I$; —$C_2F_4I$; —$C_3F_6I$; —$C_4F_8I$; —$C_5F_{10}I$; —$C_6F_{12}I$; —$C_7F_{14}I$; —$C_8F_{16}I$; —$C_9F_{18}I$; —$C_{10}F_{20}I$;

—$CF_1H_2$; —$C_2F_3H_2$; —$C_3F_5H_2$; —$C_4F_7H_2$; —$C_5F_9H_2$; —$C_6F_{11}H_2$; —$C_7F_{13}H_2$; —$C_8F_{15}H_2$; —$C_9F_{17}H_2$; —$C_{10}F_{19}H_2$;

—$CFCl_2$; —$C_2F_3Cl_2$; —$C_3F_5Cl_2$; —$C_4F_7Cl_2$; —$C_5F_9Cl_2$; —$C_6F_{11}C_{12}$; —$C_7F_{13}Cl_2$; —$C_8F_{15}Cl_2$; —$C_9F_{17}Cl_2$; —$C_{10}F_{19}Cl_2$;

—$CF_1Br_2$; —$C_2F_3Br_2$; —$C_3F_5Br_2$; —$C_4F_7Br_2$; —$C_5F_9Br_2$; —$C_6F_1Br_2$; —$C_7F_{13}Br_2$; —$C_8F_{15}Br_2$; —$C_9F_{17}Br_2$; —$C_{10}F_{19}Br_2$; and —$CF_1I_2$; —$C_2F_3I_2$; —$C_3F_5I_2$; —$C_4F_7I_2$; —$C_5F_9I_2$; —$C_6F_{11}I_2$; —$C_7F_{13}O_2$; —$C_8F_{15}I_2$; —$C_9F_{17}I_2$; —$C_{10}F_{19}I_2$.

The gas-permeable composite according to the present invention repels oils, water and/or water-based liquids. The gas-permeable composite may be used where a surface of the composite may come into contact with high viscosity, low surface tension liquids. The gas-permeable composite may therefore be used as a gas filter or a vent for receptacles (e.g. bottles) containing high viscosity liquids thereby preventing the receptacle becoming under- or over-pressurised. The vent may be located in a lid or cap of the receptacle.

The gas-permeable composite has the ability to repel high viscosity liquids such as industrial cleaners, detergent solutions and oils. The gas-permeable composite may be used to repel any form of hydrocarbon based liquids such as oils, lubrication oils, fuel oils, hydraulic fluids, gasoline, diesel and the like. The composite may therefore have uses in automotive applications where lubricating oil is used in vehicle engines and in gearbox transmissions or axles. The oleophobic and liquid repellent properties of the composite may also be used as a gas filter (e.g. an air filter) to prevent or least minimise air particle contamination. For example, the gas-permeable composite may be used to protect electronic components in mobile telephones, computers (such as disk drives) or automotive applications (such as sensors, motors, head lamps) or may be used in venting applications for medical equipment.

The gas-permeable composite may be substantially liquid-water resistant and may have a water entry pressure (WEP) higher than about 0.05 bar, 0.1 bar, 0.5 bar, 1.0 bar or 2.0 bar.

The gas-permeable composite may have an oil rating of greater than about 1, 2, 3, 4, 5, 6 or 7 according to AATCC Test Method 118-1989. The gas-permeable composite is therefore oleophobic.

The gas-permeable composite may have an air-permeability prior to any form of contact with a viscous liquid of less than about 1000 Gurley seconds, 200 Gurley seconds, 100 Gurley seconds, 50 Gurley seconds, or 30 Gurley seconds.

Typically, the gas-permeable composite may have a gas flow (e.g. air flow) recovery greater than about 5%, 10%, 20%, 30%, 40%, 50%, 60%, 70%, 80% or 90% as compared with the initial gas flow after exposure to a liquid for a set period of time such as about 5 seconds, 10 seconds, 30 seconds or 60 seconds. The gas flow recovery may be measured after a pre-determined waiting time such as about 1 minute, 5 minutes or 10 minutes. In particular embodiments, the gas-permeable composite may have a gas flow (e.g. air flow) recovery greater than about 5%, 10%, 20%, 30%, 40%, 50%, 60%, 70%, 80% or 90% as compared with the initial gas flow after exposure to a certain challenging test liquid such as described in an "air flow recovery test", which is described hereinafter in more detail. By exposure is meant any form of contact between the liquid (e.g. the test liquid) and a surface of the gas-permeable composite which includes inverting a liquid in a container onto a surface of the gas-permeable composite or dipping the gas-permeable composite into a liquid for a set period of time.

In the following, the removal of liquid from a surface is commonly designated as liquid repellency. By liquid repellency is meant the removal of liquid from a contact surface. So a vent with the ability to efficiently remove liquid from at least one of its surfaces is in the following designated as a vent with good liquid repellency properties.

The thickness of the gas-permeable composite may be in the region of a few micrometers to several hundreds of micrometers. For example, the composite may have a thickness of about 0.1 μm-5000 μm, about 0.5 μm-1000 μm, about 1 μm-800 μm, about 5 μm-800 μm, about 5 μm-500 μm, about 10 μm-800 μm, about 10 μm-500 μm, about 50 μm-500 μm, about 100 μm-500 μm, about 10 μm-100 μm, or about 10 μm-50 μm.

The composite may also be attached to another or a plurality of other layers such as any appropriate backing layer to increase the mechanical integrity of the gas-permeable composite. The gas-permeable composite may therefore be formed into, for example, a laminate.

The coating is comprised of a combination of the first and second components forming a synergistical partnership. The first component may provide a certain degree of oleophobicity to prevent lower surface tension liquids from entering/wetting pores of the porous polymeric structure. The second component may support the liquid repellency properties of coated surfaces. The liquid repellency properties may be improved by increasing the total coating laydown thereby closing/clogging surface pores and/or smoothing an outer surface of the polymeric structure (typically the second component is a liquid, and a liquid inherently forms extremely "smooth" surfaces).

The ratio and amount of the first and second components may be chosen and adapted to provide an optimum combination of liquid entry pressure and liquid repellency. The liquid entry pressure is important to keep liquids out of the pores, i.e. to prevent wetting of the pores with low surface tension liquids. The liquid repellency is necessary for removal of liquid puddles/droplets or liquid films from the substrate surface. Both properties are important for air flow recovery of the vent after contact with challenging liquids.

It is found that although the first and second components can be chosen to give excellent liquid repellency properties, this can have a detrimental effect on the liquid entry pressure. There is therefore a balance and trade-off in selecting the first and second components to obtain acceptable values for both liquid repellency and liquid entry pressures.

The weight ratio between the first and second components in the formed coating may be selected from any of the following ranges: about 1 weight part of the first component to about 0.01-100 weight parts of the second component; about 1 weight part of the first component to about 0.01-20 weight parts of the second component; from about 1 weight part of the first component to about 0.1-30 weight parts of the second component; from about 1 weight part of the first component to about 0.5-20 weight parts of the second component; from about 1 weight part of the first component to about 2-20 weight parts of the second component; from about 1 weight part of the first component to about 1-10 weight parts of the second component; from about 1 weight part of the first component to about 3-7 weight parts of the second component; or from about 1 weight part of the first component to about 3-5 weight parts of the second component.

The molar ratio between the first and second components in the coating may be selected from any of the following ranges: from about 1 mol part of the first component to about 0.05-15000 mol parts of the second component; from about 1 mol part of the first component to about 0.5-10000 mol parts of the second component; or from about 1 mol part of the first component to about 1-5000 mol parts of the second component.

The coating covers/encloses at least some of the structural features of the outer and inner surface of the porous polymeric structure by a thin layer thus modifying the chemical nature of the surface and by that modifying the surface energy of the porous polymeric structure to prevent ingression of liquids (e.g. organic liquids) or oils.

The coating may also form at least one or more or a plurality of closed and/or occluded surface portions by, for example, a thin closed and/or gas-impermeable coating layer on parts of the outer surface of the porous polymeric structure. For example, in the case of expanded PTFE the coating layer may cover the nodes and fibrils on the outer surface of the porous structure and may block and/or occlude some of the pores on the outer surface of the porous polymeric structure. By outer surface is meant the outermost surface extending around a perimeter of the porous polymeric structure which can be physically touched and which first comes into contact with a liquid to be repelled. It is this outer surface that is important for liquid repellency. The term "outer surface" is not intended to include the inner structure within the main body of the porous polymeric structure.

It was found that in case of the gas-permeable membrane with the best liquid repellency behaviour, a portion of the surface pores may be covered/occluded by the coating, thus forming bridging elements between the solid, non-porous surface regions of the membrane. Without wishing to be bound by theory, it is thought that these bridging elements are at least one reason for the improved liquid repellency behaviour and that the second component in, for example, a liquid form has a smoothing effect on the surface of the porous polymeric structure.

The smallest occluded surface portion may be in a size substantially equivalent to that of a pore/opening of the porous substrate. The closed and/or occluded surface portions occurring on the outer surface of the porous polymeric structure may have a size from several $\mu m^2$ (square-micrometers) to several hundreds of $\mu m^2$, and in total may comprise greater than about 1%, 2%, 5%, 7%, 10%, 20%, 30%, 50% of the outer surface.

The coating may also soak through the whole porous polymeric structure so that the other (uncoated) side is also rendered oleophobic.

The coating may penetrate (e.g. soak and/or impregnate) into the main body of the porous polymeric structure, however, it is intended that a portion of the coating remains on the outer surface of the porous polymeric structure, thus allowing the formation of closed and/or occluded surface portions.

The coating may both efficiently promote liquid repellency and may prevent or substantially prevent ingression of low surface tension liquids into pores of the porous polymeric structure and therefore maintain the ability to have a gas flow through the composite after contact with a viscous liquid. The coating may therefore be used to provide a vent with significantly improved liquid repellency performance and significantly improved air flow recovery.

The coating layer both covering the structural features and covering/occluding the surface pores may have a typical thickness in the range of about 0.001 μm to 5 μm, about 0.01 μm to 1 μm, or about 0.1 μm to 0.5 μm The coating does not fully block and/or occlude the porous structure, thus the composite remains gas-permeable. The coating may be found to block and/or occlude about 0.01-70%, about 0.1-80%, about 0.1-50%, about 0.1-30%, about 0.5-10%, about 1-30%, about 1-10%, or about 1-5% of the surface pores. In particular embodiments, at least about 0.1%, 1%, 5%, 10%, 20%, 30%, 50% or 70% of the surface pores may be blocked and/or occluded.

The total coating weight relative to the porous polymeric structure weight range may range from about 0.1-1000 wt. %, about 0.1-500 wt. %, about 0.1-300 wt %, about 1-500 wt. %, about 1-200 wt %, about 1-100 wt. %, about 1-50 wt. %, about 5-100 wt %, about 1-30 wt. %, about 5-30 wt % or about 2-15 wt. %.

The ratio of total coating weight relative to the weight of the porous polymeric structure may be at least about 3%, 5%, 10% or 20%.

Typically, the coating may be deposited in a range of about 0.01-1000 $g/m^2$, about 0.05-300 $g/m^2$, about 0.1-800 $g/m^2$, 0.5-500 $g/m^2$, 0.5-300 $g/m^2$, about 1-300 $g/m^2$, about 5-200 $g/m^2$, about 10-100 $g/m^2$, about 0.1-100 $g/m^2$, about 1-50 $g/m^2$ or about 20-50 $g/m^2$. Alternatively, the coating may be deposited in a range of at least about 0.05 $g/m^2$, 0.1 $g/m^2$, 1 $g/m^2$, 10 $g/m^2$, 20 $g/m^2$, 30 $g/m^2$, 40 $g/m^2$, 80 $g/m^2$, 100 $g/m^2$, 500 $g/m^2$ or 1000 $g/m^2$.

Typically, the first component may have a molecular weight ranging from about 500 a.m.u. to about 10,000,000 a.m.u. or about 5000 a.m.u. to about 1,000,000 a.m.u. Preferably, the molecular weight of the first component may range from about 10,000 a.m.u. to about 1,000,000 a.m.u.

The fluorine content of the first component may be at least about 1 wt. %, 5 wt. %, 10 wt. %, 20 wt. % or 40 wt. % of the molecular structure of the first component.

The first component comprises any fluorinated material which is both oleophobic and hydrophobic, i.e. both oil- and water-repellent. Applied as a coating on a porous substrate, the first component prevents ingression of oils and low surface tension liquids into the pores of the substrate.

The first component may comprise a fluorinated or perfluorinated form of an oligomer and/or polymer, preferably of an ester such as an acrylate or methacrylate. Homo- or copolymers of fluorinated acrylate or methacrylate compounds are well-known in the art. Examples for those polymers are described in "Modern Fluoropolymers", edited by John Scheirs, Wiley Series in Polymer Science, John Wiley & Sons (Chichester, N.Y., Weinheim, Brisbane, Singapore, Toronto), 1997, Chapter 26: Fluorinated Acrylic Ester Polymers, which is incorporated herein by reference. Copolymers of fluorinated acrylates or methacrylates may comprise a range of other vinyl-monomers and are selected to adjust the required performance.

An example for a structural element of a fluorinated acrylic ester polymer may be as follows:

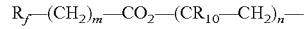

$R_{10}$=—H, —$CH_3$;

m=1, 2; and $R_f$=perfluoroalkyl.

The first component may also be in the form of a co- or ter-polymer of tetrafluoroethylene (TFE) with, optionally, other fluorinated or non-fluorinated monomers.

In particular embodiments, the first component may comprise at least one amorphous fluoropolymer, amorphous perfluoropolymer, or a combination thereof, which can be dissolved in fluorinated solvents or mixtures thereof. Commercially available amorphous perfluoropolymers are known as Teflon® AF (DuPont), Hyflon® AD (Solvay Solexis) and Cytop® (Asahi Glass).

Teflon AF® is a family of amorphous fluoropolymers made by DuPont and are made by the copolymerisation of 2,2-bis-trifluoromethyl-4,5-difluoro-1,3,-dioxole (PDD) with other fluorine-containing monomers. At present the commercial Teflon® AF grades are copolymers of PDD and tetrafluoroethylene (TFE) and are known as Teflon® AF1600 and Teflon® AF2400 (DuPont).

The chemical structure of Teflon® AF1600 and Teflon® AF2400 is as follows:

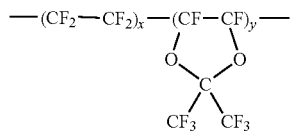

x/y=0/100 to 99/1 preferably with
x/y=about 36/64 for Teflon® AF1600 (64 mol % PDD)
x/y=about 17/83 for Teflon® AF2400 (83 mol % PDD)

Hyflon® AD (from Solvay Solexis) is a family of amorphous perfluoropolymers made by copolymerization of 2,2,4-Trifluoro-5-trifluoromethoxy-1,3-dioxole (TTD) and tetrafluoroethylene (TFE). The chemical structure of Hyflon AD®60X and Hyflon AD®80X is as follows:

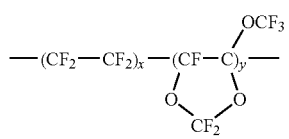

x/y=0/100 to 99/1 preferably with
x/y=about 40/60 for Hyflon AD®60X (about 60 mol % TTD)
x/y=about 15/85 for Hyflon AD®80X (about 85 mol % TTD)

Cytop® is a PBVE polymer manufactured by Asahi Glass (PBVE=poly(heptafluoro-1-butene-trifluoro-vinylether)).

The first composition may also comprise amorphous tetrafluoroethylene/perfluoro alkyl vinyl ether co- or ter-polymers.

Besides the already mentioned commercially available fluoropolymers there are many others known in the art. U.S. Pat. No. 6,248,823 B1 for example describes solvents for amorphous fluoropolymers such as poly(BFP/TFE), poly(TFE/PMVE) or poly(TFE/PMVE/PEVE) [BFP=hexafluoropropene; TFE=tetrafluoroethylene; PMVE=perfluoro(methyl vinyl ether); PEVE=perfluoro(ethyl vinyl ether)]. EP 0 633 257 describes amorphous homo- and co-polymers of perfluorodioxoles. U.S. Pat. No. 5,883,177 describes amorphous perfluoropolymers based on TTD which are dissolved in fluoro-containing solvents to obtain solutions for coatings. U.S. Pat. No. 5,663,255 describes novel amorphous TFE-HFP copolymers. U.S. Pat. No. 5,919,878 describes amorphous fluoropolymers containing PEVE. U.S. Pat. No. 6,248,823 B1, EP 0 633 257, U.S. Pat. No. 5,883,177, U.S. Pat. No. 5,663,255 and U.S. Pat. No. 5,919,878 are incorporated herein by reference.

The first component may also comprise hydro- and oleophobic polymers containing PFPE blocks or units respectively obtained by chemical reactions of functionalized PFPEs compounds. For example, EP 1 270 631 A1 describes the preparation of PFPEs terminated with isocyanate groups which are reacted with hydrogenated diols to yield urethane polymers with PFPE units. EP 1 270 631 A1 is incorporated herein by reference.

The above given examples for the first component should only serve as examples. In general the first component is not particularly limited as long as it comprises a fluorinated material which is both oleophobic and hydrophobic, i.e. both oil- and water-repellent.

Typically, the first component may be deposited in a range of about 0.01-1.000 g/m$^2$, about 0.05-500 g/m$^2$, about 0.1-400 g/m$^2$, about 0.5-300 g/m$^2$, about 1-200 g/m$^2$, about 5-100 g/m$^2$, about 10-500 g/m$^2$, about 5-100 g/m$^2$, or about 20-40 g/m$^2$. Alternatively, the first coating may be deposited in a range of at least about 0.01 g/m$^2$ 0.1 g/m$^2$, 1 g/m$^2$, 10 g/m$^2$, 20 g/m$^2$, 40 g/m$^2$, 100 g/m$^2$, 500 g/m$^2$ or 1000 g/m$^2$.

The second component may comprise any form or combination of a neutral PFPE. In general PFPEs differ by the type of end groups in the molecular chain. There are PFPEs which have neutral, non-reactive end groups. These types of PFPEs are called neutral PFPEs and those are included in the present invention. They are also sometimes referred to as unpolar or non-polar PFPEs. Common terminal end groups of neutral PFPEs are —OCF$_3$, —OC$_2$F$_5$, and —OC$_3$F$_7$. However, neutral PFPEs may comprise also other types of non-perfluorinated end groups such as those containing H-, Cl-, Br- or I-radicals.

Moreover, PFPEs containing radicals such as H-, Cl-, Br-, I- or even other radicals within their backbone (i.e. not just as end groups) may still be regarded as neutral PFPEs according to the present invention, as long as they are hydrophobic. An example for a repeating unit with H-, Cl, Br, and/or I- within the backbone may be CR$_1$R$_2$CF$_2$CF$_2$O wherein R$_1$ and R$_2$ independently have the meaning of H, Cl, Br, I, or C$_1$-C$_4$ perfluoroalkyl.

Neutral PFPEs differ from functionalised PFPEs which may have been modified by end groups of a polar and reactive nature. These are commercially available, for example, under the trade name Fluorolink® (Solvay Solexis).

This invention refers to neutral PFPEs. Neutral PFPEs are thermally stable, substantially insoluble in water and most common solvents, and cannot be leached out after a coating application.

Commercially available PFPEs suitable for the present invention are, for example, known under the trade names Fomblin®, Galden® (both from Solvay Solexis), Krytox® (DuPont) and Demnum® (Daikin). These compounds are available in a substantially pure form, and are also sometimes supplied as a microemulsion in water, such as Fomblin FE 20C or Fomblin FE 20 EG.

A general description of PFPEs is found in the book "Modern Fluoropolymers", edited by John Scheirs, Wiley Series in Polymer Science, John Wiley & Sons (Chichester, N.Y., Wienheim, Brisbane, Singapore, Toronto), 1997, Chapter 24: Perfluoropolyethers (Synthesis, Characterization and Applications), which is incorporated herein by reference.

A description of some newer types of neutral PFPEs as received by direct fluorination are given in the book "Fluoropolymers 1, Synthesis", edited by G. Hougham, P. E.

Cassidy, K. Johns, T. Davidson, Kluwer Academic/Plenum Publishers (New York, Boston, Dordrecht, London, Moscow), Chapter 14.3: Perfluoropolyethers, 1999, which is incorporated herein by reference.

In most cases, neutral PFPEs have basic repeating units selected from any one of or combination of the following: $CF_2O$; $CF_2CF_2O$; $CF(CF_3)O$; $CF_2CF_2CF_2O$; $CF_2CF(CF_3)O$; and $CF(CF_3)CF_2O$. Some newer types of neutral PFPEs may also contain other repeating units (e.g. $C(CF_3)_2O$) or such with more than three carbon atoms: e.g. $CF_2CF_2CF_2CF_2O$; $C_4F_8O$; or $C_6F_{12}O$.

Some suitable neutral PFPE structures which are commercially available are as follows:

Fomblin® Y:

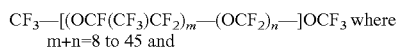

m+n=8 to 45 and m/n=20 to 1000

Fomblin® Z:

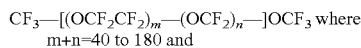

m+n=40 to 180 and m/n=0.5 to 2

Krytox®:

n=10 to 60

Demnum®:

A common characteristic of PFPEs is the presence of perfluoroalkyl ether moieties. PFPE is synonymous to perfluoropolyalkylether. Other synonymous terms frequently used include" "PFPE", "PFPE oil", "PFPE fluid" and "PFPAE.

The second component may comprise any suitable neutral PFPE available as a liquid, oil or grease which may be non-water or substantially non-water soluble.

The second component comprising a neutral PFPE may be a viscous liquid with viscosities ranging from about 10 mPa·s to about 1,000,000 mPa·s, about 10 mPa·s to about 10,000 mPa·s or preferably about 100 mPa·s to about 3000 mPa·s. The second component may have a viscosity greater than about 50 mPa·s, 100 mPa·s, 150 mPa·s, 200 mPa·s, 250 mPa·s or 300 mPa·s. Typically, the second component may be a viscous liquid with a viscosity greater than about 100 mPa·s.

The second component may have a surface tension lower than about 40 mN/m, 30 mN/m, 25 mN/m, 20 mN/m, 15 mN/m or 10 mN/m. Typically, the second component may have a surface tension lower than about 28 mN/m.

The second component may have a boiling point or decomposition point respectively of greater than about 150° C., 200° C., 250° C. or 300° C. Typically, the second component may have a boiling point or decomposition point of greater than about 200° C.

The second component may have a vapour pressure at about 20° C. lower than about $10^{-1}$ mm Hg, $10^{-2}$ mm Hg, $10^{-3}$ mm Hg, $10^{-4}$ mm Hg, $10^{-5}$ mm Hg, $10^{-6}$ mm Hg, or preferably lower than $10^{-2}$ mm Hg.

Typically, the second component may have a molecular weight ranging from about 500 a.m.u. to about 500,000 a.m.u or about 1000 a.m.u. to about 100,000 a.m.u. Preferably, the molecular weight of the second component may range from about 2,000 a.m.u to about 20,000 a.m.u.

The second component may have an average molecular weight of at least about 1,000 a.m.u., 10,000 a.m.u., 50,000 a.m.u. or 100,000 a.m.u. Preferably, the second component may have an average molecular weight of at least 1,000 a.m.u.

Typically, the second component may be deposited in the range of about 0.01-1000 $g/m^2$, about 0.05-500 $g/m^2$, about 0.1-400 $g/m^2$, about 0.5-300 $g/m^2$, about 1-200 $g/m^2$, about 5-100 $g/m^2$, about 10-500 $g/m^2$, about 5-100 $g/m^2$, or about 20-40 $g/m^2$. Alternatively, the second component may be deposited in the range of at least about 0.01 $g/m^2$, 0.1 $g/m^2$, 1 $g/m^2$, 10 $g/m^2$, 20 $g/m^2$, 40 $g/m^2$, 100 $g/m^2$, 500 $g/m^2$ or 1000 $g/m^2$.

The fluorine content of the second component may be at least about 1 wt. %, 10 wt. %, 20 wt. % or 40 wt. % of the molecular structure of the second component It is preferred that the second component may be substantially chemically inert, have high thermal stability, have a boiling point or decomposition point respectively greater than about 150° C. or 200° C., have a low vapour pressure, have low surface tension, have oleophobic properties and have low solubility in common solvents.

Typically, the porous polymer structure may have passageways or continuous pores through the material. The passageways may open on both sides of the porous polymer structure allowing the structure to function as a vent.

The porous polymeric structure may be selected from any suitable porous structure and may be in the form of a layer with a thickness ranging from about 0.1 μm to about 5000 μm, about 1 μm to about 500 μm, or about 10 μm to about 400 μm. In particular embodiments, the porous polymeric structure may have a thickness of about 100 μm, about 200 μm or about 300 μm. In alternative embodiments where the porous polymeric structure is in the form of, for example, a tape, the thickness of the tape may range from about 10 μm to about 500 μm.

The porous polymeric structure may be microporous comprising inorganic, organic or polymeric material.

Further, the porous polymeric structure may be a woven or non-woven.

Typically, the porous polymeric structure may comprise one fluoropolymer or a combination of fluoropolymers. The porous polymeric structure may comprise polytetrafluoroethylene (PTFE), which may be expanded. The porous polymeric structure may comprise one of or a combination of suitable fluoropolymers such as PTFE or polyvinylidene fluoride. Alternatively, the porous polymeric structure may also comprise non-fluorinated polymers, such as any one of or a combination of polyolefins (e.g. polyethylene, polypropylene), polyamides, polyester, polysulfone, poly(ethersulfone), polycarbonate, polyurethane and combinations thereof.

In particular embodiments, the porous polymeric structure may be in the form of a membrane.

The porous polymeric structure may be expanded in at least one direction and may therefore be uni-axial or multi-axial expanded. In a particular embodiment the porous structure may be expanded in two directions, such as in two substantially perpendicular directions, providing a bi-axial structure. The porous polymeric structure may therefore be either mono- or bi-axially expanded such as mono- or bi-axially expanded polytetrafluoroethylene.

The porous polymeric structure may be at least partially composed of fibrils and/or nodes.

In one embodiment the porous polymeric structure may be exemplified by a porous ePTFE film. The layer thickness, densities and pore-size of the ePTFE layer used can vary, depending on the application.

Typically, an ePTFE vent may have a thickness in the range of about 5 μm to about 500 μm, a density in the range of about 0.4 to about 1.5 $g/cm^3$ and an average pore size in the range of about 0.05 to about 10 μm. Preferred embodiments may have a thickness of about 30 µm to about 350 µm, a density in the range of about 0.5 to about 1.5 g/cm³, and an average pore size of about 0.1 µm to about 5 µm.

A particular preferred substrate is a porous PTFE made by stretching PTFE tape or film as described in U.S. Pat. No. 3,953,566, which is incorporated herein by reference. In this procedure, the structure comprises an interconnected network of nodes and fibrils interconnecting the nodes, the nodes and fibrils comprising the internal structure that defines the pores.

The porous polymeric layer may be an ePTFE membrane such as described in U.S. Pat. No. 3,953,566, which is incorporated herein by reference.

The porous polymeric structure may be laminated to or combined with a support layer which may comprise a woven structure or non-woven structure.

In particular embodiments, the gas-permeable composite may comprise an ePTFE layer coated with a solution of, for example, about 0.5 wt. %-2 wt. % Teflon® AF (e.g. Teflon® AF 1600) and about 1 wt. %-20 wt. % PFPE in an appropriate solvent such as an organic fluorinated solvent. In further embodiments, the gas-permeable composite may comprise an already oleophobic treated membrane, which has an additional PFPE coating deposited thereon in a second coating step with, for example, a coating solution concentration of the PFPE in the range of about 1 wt. %-10 wt. %.

According to a second aspect of the present invention, there is provided a gas-permeable composite comprising:
(a) a porous polymeric structure having a structure defining a plurality of pores extending therethrough and with at least one outer surface;
(b) a coating covering at least a portion of said outer surface;
(c) said coating comprising at least a first and second component;
(d) said first component comprising oleophobic and hydrophobic fluorinated material; and
(e) said second component comprising a block copolymer, said block-copolymer comprising a PFPE backbone.

The block copolymer may be in the form of an A-B or an A-B-A block copolymer wherein either of the A or B units may be PFPE based such as non-polar PFPE or neutral PFPE. The PFPE may comprise repeating units such as any one of or combination of the following: $CF_2O$; $CF_2CF_2O$; $CF(CF_3)O$; $CF_2CF_2CF_2O$; $CF_2CF(CF_3)O$; $CF(CF_3)CF_2O$; $—(C(CF_3)_2O)—$; $—CF_2CF_2CF_2O—$; $—(C_4F_8O)—$ or $—(C_6F_{12}O)—$.

The PFPE forming the backbone of the copolymer is covalently linked to a non-PFPE block such as any suitable hydrocarbon based block. The hydrocarbon based block may be selected from any polyolefin (such as polyethylene, polypropylene), polyester, polyurethane, polyamide or any other suitable polymeric forming components.

An example with a block-copolymer comprising PFPE- and poly(ε-caprolactone)-blocks is described in Polymer 42 (2001) 1771-1779 (M. Toselli, et al.) which is incorporated herein by reference.

According to a third aspect of the present invention, there is provided a gas-permeable composite comprising:
(a) a porous polymeric structure having a structure defining a plurality of pores extending therethrough and with at least one outer surface;
(b) a coating covering at least a portion of said outer surface;
(c) said coating comprising at least a first and second component;
(d) said first component comprising oleophobic and hydrophobic fluorinated material; and
(e) said second component comprising a neutral perfluoropolyether (PFPE).

In most cases, neutral PFPEs have basic repeating units selected from any one of or combination of the following: $CF_2O$; $CF_2CF_2O$; $CF(CF_3)O$; $CF_2CF_2CF_2O$; $CF_2CF(CF_3)O$; and $CF(CF_3)CF_2O$. Some newer types of neutral PFPEs may also contain other repeating units (e.g. $C(CF_3)_2O$) or such with more than three carbon atoms: e.g. $C_4F_8O$; or $C_6F_{12}O$.

According to a fourth aspect of the present invention, there is provided a gas-permeable composite comprising:
(a) a porous polymeric structure having a structure defining a plurality of pores extending therethrough and with at least one outer surface;
(b) a coating covering at least a portion of said outer surface;
(c) said coating comprising at least a first and second component;
(d) said first component comprising oleophobic and hydrophobic fluorinated material; and
(e) said second component comprising a hydrophobic fluorinated liquid.

According to a fifth aspect of the present invention, there is a provided a method of forming a gas-permeable composite, said method comprising:
(a) providing a porous polymeric structure having a structure defining a plurality of pores extending therethrough and with at least one outer surface
(b) providing a coating on at least a portion of said outer surface of said porous polymeric structure, wherein said coating comprises at least a first and second component, wherein said first material comprises an oleophobic and hydrophobic fluorinated material and said second component comprises a perfluoropolyether (PFPE), said PFPE comprising end-groups selected from the following:

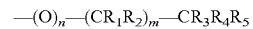

wherein:
$R_1$=H, F, Cl, Br or I;
$R_2$=H, F, Cl, Br or I;
$R_3$=H, F, Cl, Br or I;
$R_4$=H, F, Cl, Br or I;
$R_5$=H, F, Cl, Br, I, alkyl or aryl;
n=0 or 1; and
m=0-10.

According to a sixth aspect of the present invention, there is a provided a method of forming a gas-permeable composite, said method comprising:
(a) providing a porous polymeric structure having a structure defining a plurality of pores extending therethrough and with at least one outer surface;
(e) providing a coating on at least a portion of said outer surface of said porous polymeric structure, wherein said coating comprises at least a first and second component, wherein said first material comprises an oleophobic and hydrophobic fluorinated material and said second component comprises a block copolymer, said block-copolymer comprising a PFPE backbone.

The method comprises forming a coating which may be obtained by dissolving together both the first and second components in an appropriate solvent to form a coating solution and then depositing this coating solution onto at least part of the outer surface of the porous polymeric structure using any suitable technique. The first and second components may form a coating solution in any appropriate concentration such as about 0.1-50 wt. %, about 0.5-30 wt. %, or about 1-10 wt. %.

Typically, an organic solvent such as a fluorinated or perfluorinated organic solvent may be used to dissolve the first and second components. The solvent may be a low molecular weight $C_1$-$C_{20}$ or $C_2$-$C_{10}$ fluorinated or perfluorinated solvent. Suitable solvents are available under the tradename 3M™ Fluorinert™ Liquids, 3M™ Performance Fluids or 3M™ Novec™ Fluids. The solvent is intended to evaporate off leaving behind the first and second components to form the coating. The boiling point of the solvent may be below about 150° C., 100° C. or 70° C.

Any suitable form of deposition technique may be used to form the coating such as a roller coating process, dipping, spray coating, brush coating, print coating, spin coating, depositing with a dropper such as a pipette, and the like. In alternative embodiments, either the first or second component may initially be deposited in a first step at least onto the outer surface of the porous polymeric structure and thereafter in a second step the remaining of either the first or second component deposited.

In particular embodiments, the porous polymeric structure may have an initial oleophobic and hydrophobic coating formed from the first component. The second component dissolved in solvent may then be added on top of the oleophobic and hydrophobic coating. Depending on the compatibility of both components, the components may then either at least partially dissolve into each other, or may stay separated. For each of the two separate coating steps, any suitable form of deposition technique may be used such as a roller coating process, dipping, spray coating, brush coating, print coating, spin coating, depositing with a dropper such as a pipette, and the like. The first component comprising oleophobic and hydrophobic fluorinated material may further be deposited by a plasma deposition coating step or another coating step out of the gas phase.

The first component may at least partially dissolve in the second component. It should also be noted that there may also be more than a two-component system, other than the solvent. The first component may at least partially dissolve in the second component, especially when a high weight ratio of the first to the second component such as about 1:10 (i.e. in excess of the second component) is used. This can, for example, be the case for the aforementioned amorphous perfluoropolymers (as first component) and neutral PFPEs as second component.

On addition of the first component to the second component, the first and second components may simply mix with each other to form an admixture whereupon there is no chemical reaction or substantially no chemical reaction between the two components.

In certain embodiments, the first component may also be regarded as swollen by the second component rather than dissolved.

It is also found that by coating with a mixture of said first and second components prevents total clogging of the pores. Total clogging of the pores of a porous structure can be an issue when a high concentration of a high molecular weight polymer such as Teflon® AF in a coating solution is used. Surprisingly, in the present invention it was found that although using a high overall concentration of said first and second components in the coating solution, total clogging of the pores does not happen. Although not wishing to be bound by theory, it is thought total clogging of the pores is avoided because of the low molecular weight range of the oils (e.g. a molecular weight of a few thousand grams/mol, more oligomers than polymers) used as the second component. This surprising finding has significant advantages in that some previously known oleophobic materials are extremely expensive (e.g. Teflon® AF1600) and these expensive materials can now be mixed with much less expensive materials such as fluorinated PFPE oils to provide significant technical advantages such as improved liquid repellency and avoidance of total clogging of the pores.

The first component prior to forming the coating may be in a solid and/or amorphous form and may comprise any suitable fluorinated or per-fluorinated oleophobic and hydrophobic oligomer and/or polymer, or combination thereof. The first component may exist as a solid at, for example, about 20° C. and about 1 bar.

The second component prior to forming the coating is typically in a liquid form and may comprise any neutral PFPE.

According to a seventh aspect of the present invention, there is provided a venting apparatus having an opening for venting gas from an enclosure or receptacle, said venting apparatus comprising:

a porous gas-permeable composite venting element located within, outside or on said venting apparatus and forming a liquid-tight seal for said opening, said porous gas-permeable composite venting element comprising:
(a) a porous polymeric structure having a structure defining a plurality of pores extending therethrough and with at least one outer surface;
(b) a coating covering at least a portion of said outer surface;
(c) said coating comprising at least a first and a second component
(d) said first component comprising an oleophobic and hydrophobic fluorinated material; and
(e) said second component comprising a perfluoropolyether (PFPE), said PFPE comprising end-groups selected from the following:

wherein:
$R_1$=H, F, Cl, Br or I;
$R_2$=H, F, Cl, Br or I;
$R_3$=H, F, Cl, Br or I;
$R_4$=H, F, Cl, Br or I;
$R_5$=H, F, Cl, Br, I, alkyl or aryl;
n=0 or 1; and
m=0-10.

According to an eighth aspect of the present invention there is provided a venting apparatus having an opening for venting gas from an enclosure or receptacle, said venting apparatus comprising:

a porous gas-permeable composite venting element located within, outside or on said venting apparatus and forming a liquid-tight seal for said opening, said porous gas-permeable composite venting element comprising:
(a) a porous polymeric structure having a structure defining a plurality of pores extending therethrough and with at least one outer surface;
(b) a coating covering at least a portion of said outer surface;
(c) said coating comprising at least a first and a second component
(d) said first component comprising an oleophobic and hydrophobic fluorinated material; and
(e) said second component comprising a block copolymer, said block-copolymer comprising a PFPE backbone.

The venting apparatus may be used as a vent for receptacles (e.g. bottles) containing liquids. The vent may be located in a lid or cap of the receptacle.

Additionally, the venting apparatus may be used in automotive applications where lubricating oil is used in vehicle engines and in gearbox transmissions or axles.

In further applications, the venting apparatus may be used to protect electronic components in mobile telephones, computers (such as disk drives) or automotive applications (such as sensors, motors, head lamps), or may be used in venting applications for medical equipment.

According to a ninth aspect of the present invention, there is provided a method of venting gas from an enclosure or receptacle, said method comprising:

providing a porous gas-permeable composite element within, outside or on a venting apparatus and forming a liquid-tight seal for an opening on said venting apparatus, said porous gas-permeable composite venting element comprising:
(a) a porous polymeric structure having a structure defining a plurality of pores extending therethrough and with at least one outer surface;
(b) a coating covering at least a portion of said outer surface;
(c) said coating comprising at least a first and a second component
(d) said first component comprising an oleophobic and hydrophobic fluorinated material; and
(e) said second component comprising a perfluoropolyether (PFPE), said PFPE comprising end-groups selected from the following:

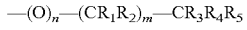
—(O)$_n$—(CR$_1$R$_2$)$_m$—CR$_3$R$_4$R$_5$ wherein:
R$_1$=H, F, Cl, Br or I;
R$_2$=H, F, Cl, Br or I;
R$_3$=H, F, Cl, Br or I;
R$_4$=H, F, Cl, Br or I;
R$_5$=H, F, Cl, Br, I, alkyl or aryl;
n=0 or 1; and
m=0-10.

The porous PTFE structure thereby may be a porous expanded PTFE structure.

The first component may also comprise at least one of or a combination of amorphous fluoropolymers or amorphous perfluoropolymers.

Further, the enclosure or receptacle may contain a liquid or oil and a porous gas-permeable composite element may be capable of venting gas from the enclosure or receptacle even after contacting the liquid or oil and thereby preventing the enclosure or receptacle from becoming under- or over-pressurized.

According to a tenth aspect of the present invention, there is provided a method of venting gas from an enclosure or receptacle, said method comprising:

providing a porous gas-permeable composite element within, outside or on a venting apparatus and forming a liquid-tight seal for an opening on said venting apparatus, said porous gas-permeable composite venting element comprising:
(a) a porous polymeric structure having a structure defining a plurality of pores extending therethrough and with at least one outer surface;
(b) a coating covering at least a portion of said outer surface;
(c) said coating comprising at least a first and a second component
(d) said first component comprising an oleophobic and hydrophobic fluorinated material; and
(e) said second component comprising a block copolymer, said block-copolymer comprising a PFPE backbone.

The method includes venting or filtering gas from any of the following: receptacles (e.g. bottles) containing high viscosity liquids; in automotive applications where lubricating oil is used in vehicle engines and in gearbox transmissions or axles; protecting electronic components in mobile telephones, computers (such as disk drives) or automotive applications (such as sensors, motors, head lamps); and in medical equipment applications.

According to a eleventh aspect of the present invention, there is provided a gas-permeable composite comprising:
(a) a porous polymeric structure having a structure defining a plurality of pores extending therethrough and with at least one outer surface;
(b) a coating covering at least a portion of said outer surface;
(c) said coating comprising at least a first and second component;
(d) said first component comprising an oleophobic and hydrophobic fluorinated material;
(e) said second component comprising a perfluoropolyether (PFPE), said PFPE comprising end-groups selected from the following:

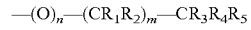
—(O)$_n$—(CR$_1$R$_2$)$_m$—CR$_3$R$_4$R$_5$ wherein:
R$_1$=H, F, Cl, Br or I;
R$_2$=H, F, Cl, Br or I;
R$_3$=H, F, Cl, Br or I;
R$_4$=H, F, Cl, Br or I;
R$_5$=H, F, Cl, Br, I, alkyl or aryl;
n=0 or 1; and
m=0-10;

wherein the gas-permeable composite has a gas flow recovery (compared with the initial/original gas flow) greater than about 5% after exposure to a viscous liquid having a viscosity greater than about 10 mPa·s and a surface tension lower than about 35 mN/m at about 25° C.

According to a twelfth aspect of the present invention, there is provided a gas-permeable composite comprising:
(a) a porous polymeric structure having a structure defining a plurality of pores extending therethrough and with at least one outer surface;
(b) a coating covering at least a portion of said outer surface;
(c) said coating comprising at least a first and second component;
(d) said first component comprising an oleophobic and hydrophobic fluorinated material;
(e) said second component comprising a block copolymer, said block-copolymer comprising a PFPE backbone;

wherein the gas-permeable composite has a gas flow recovery (compared with the initial/original gas flow) greater than about 5% after exposure to a viscous liquid having a viscosity greater than about 10 mPa·s and a surface tension lower than about 35 mN/m at about 25° C.

Typically, the gas-permeable composite may have a gas flow recovery greater than about 5% after exposure to a viscous liquid having a viscosity in the range 10 mPa·s-50 mPa·s and a surface tension higher than about 27 mN/m at about 25° C.

According to a thirteenth aspect of the present invention, there is provided a gas-permeable composite comprising:

(a) a layer of a porous PTFE structure with an inner and outer surface and having passageways through the structure;
(b) the porous structure comprising a coating on at least a portion of said outer surface;
(c) said coating comprising at least a first and second component;
(d) said first component comprising at least one oleophobic and hydrophobic fluoropolymer that imparts to the composite an oil rating of at least 3;
(e) said second component comprising a perfluoropolyether (PFPE), said PFPE comprising end-groups selected from the following:

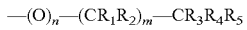
—(O)$_n$—(CR$_1$R$_2$)$_m$—CR$_3$R$_4$R$_5$ wherein:
R$_1$=H, F, Cl, Br or I;
R$_2$=H, F, Cl, Br or I;
R$_3$=H, F, Cl, Br or I;
R$_4$=H, F, Cl, Br or I;
R$_5$=H, F, Cl, Br, I, alkyl or aryl;
n=0 or 1; and
m=0-10;
wherein the gas-permeable composite has a gas flow recovery greater than about 5% after exposure to a viscous liquid having a viscosity at about 25° C. greater than about 10 mPa·s and a surface tension at about 25° C. lower than about 35 mN/m.

According to a fourteenth aspect of the present invention, there is provided a gas-permeable composite comprising:
(a) a layer of a porous PTFE structure with an inner and outer surface and having passageways through the structure;
(b) the porous structure comprising a coating on at least a portion of said outer surface;
(c) said coating comprising at least a first and second component;
(d) said first component comprising at least one oleophobic and hydrophobic fluoropolymer that imparts to the composite an oil rating of at least 3;
(e) said second component comprising a block copolymer, said block-copolymer comprising a PFPE backbone;
wherein the gas-permeable composite has a gas flow recovery (compared with the initial/original gas flow) greater than about 5% after exposure to a viscous liquid having a viscosity greater than about 10 mPa·s and a surface tension lower than about 35 mN/m at about 25° C.

According to a fifteenth aspect of the present invention, there is provided a gas-permeable composite obtainable by:
(a) providing a porous polymeric structure having a structure defining a plurality of pores extending therethrough and with at least one outer surface;
(b) coating at least a portion of said outer surface of the porous polymeric structure with a first and second component;
(c) said first component comprising an oleophobic and hydrophobic fluorinated material; and
(d) said second component comprising a perfluoropolyether (PFPE), said PFPE comprising end-groups selected from the following:

—(O)$_n$—(CR$_1$R$_2$)$_m$—CR$_3$R$_4$R$_5$ wherein:
R$_1$=H, F, Cl, Br or I;
R$_2$=H, F, Cl, Br or I;
R$_3$=H, F, Cl, Br or I;
R$_4$=H, F, Cl, Br or I;
R$_5$=H, F, Cl, Br, I, alkyl or aryl;
n=0 or 1; and
m=0-10.

According to a sixteenth aspect of the present invention, there is provided a gas-permeable composite obtainable by:
(a) providing a porous polymeric structure having a structure defining a plurality of pores extending therethrough and with at least one outer surface;
(b) coating at least a portion of said outer surface of the porous polymeric structure with a first and second component;
(c) said first component comprising an oleophobic and hydrophobic fluorinated material; and
(d) said second component comprising a block copolymer, said block-copolymer comprising a PFPE backbone.

According to a seventeenth aspect of the present invention, there is provided use of a gas-permeable composite in a vent or gas filter, said gas-permeable composite comprising:
(a) a porous polymeric structure having a structure defining a plurality of pores extending therethrough and with at least one outer surface;
(b) a coating covering at least a portion of said outer surface;
(c) said coating comprising at least a first and second component;
(d) said first component comprising an oleophobic and hydrophobic fluorinated material; and
(e) said second component comprising a perfluoropolyether (PFPE), said PFPE comprising end-groups selected from the following:

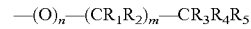
—(O)$_n$—(CR$_1$R$_2$)$_m$—CR$_3$R$_4$R$_5$ wherein:
R$_1$=H, F, Cl, Br or I;
R$_2$=H, F, Cl, Br or I;
R$_3$=H, F, Cl, Br or I;
R$_4$=H, F, Cl, Br or I;
R$_5$=H, F, Cl, Br, I, alkyl or aryl;
n=0 or 1; and
m=0-10.

According to an eighteenth aspect of the present invention, there is provided use of a gas-permeable composite in a vent or gas filter, said gas-permeable composite comprising:
(a) a porous polymeric structure having a structure defining a plurality of pores extending therethrough and with at least one outer surface;
(b) a coating covering at least a portion of said outer surface;
(c) said coating comprising at least a first and second component;
(d) said first component comprising an oleophobic and hydrophobic fluorinated material; and
(e) said second component comprising a block copolymer, said block-copolymer comprising a PFPE backbone.

According to a nineteenth aspect of the present invention, there is provided a gas-permeable composite comprising:
(a) a layer of a porous expanded PTFE structure with an inner and outer surface and having passageways through the structure;
(b) the microporous structure comprising a coating on at least a portion of said outer surface;
(c) said coating comprising at least a first and second component;
(d) said first component comprising at least one of or a combination of oleophobic and hydrophobic amorphous fluoropolymers/perfluoropolymers; and (e) said second component comprising a perfluoropolyether (PFPE), said PFPE comprising end-groups selected from the following:

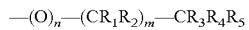

wherein:
R$_1$=H, F, Cl, Br or I;
R$_2$=H, F, Cl, Br or I;
R$_3$=H, F, Cl, Br or I;
R$_4$=H, F, Cl, Br or I;
R$_5$=H, F, Cl, Br, I, alkyl or aryl;
n=0 or 1; and
m=0-10.

According to a twentieth aspect of the present invention, there is provided a gas-permeable composite comprising:
(a) a layer of a porous expanded PTFE structure with an inner and outer surface and having passageways through the structure;
(b) the microporous structure comprising a coating on at least a portion of said outer surface;
(c) said coating having at least a first and second component;
(d) said first component comprising at least one of or a combination of oleophobic and hydrophobic amorphous fluoropolymers/perfluoropolymers; and
(e) said second component comprising a block copolymer, said block-copolymer comprising a PFPE backbone.

BRIEF DESCRIPTION OF THE DRAWINGS

Embodiments of the present invention will now be described, by way of example only, with reference to the accompanying drawings in which:

FIGS. 3A-3C are representations of apparatus and a procedure used for conducting an air flow recovery test;

FIG. 4 is an expanded view of part of the apparatus shown in FIG. 3A;

DETAILED DESCRIPTION OF THE INVENTION

Figure 1:
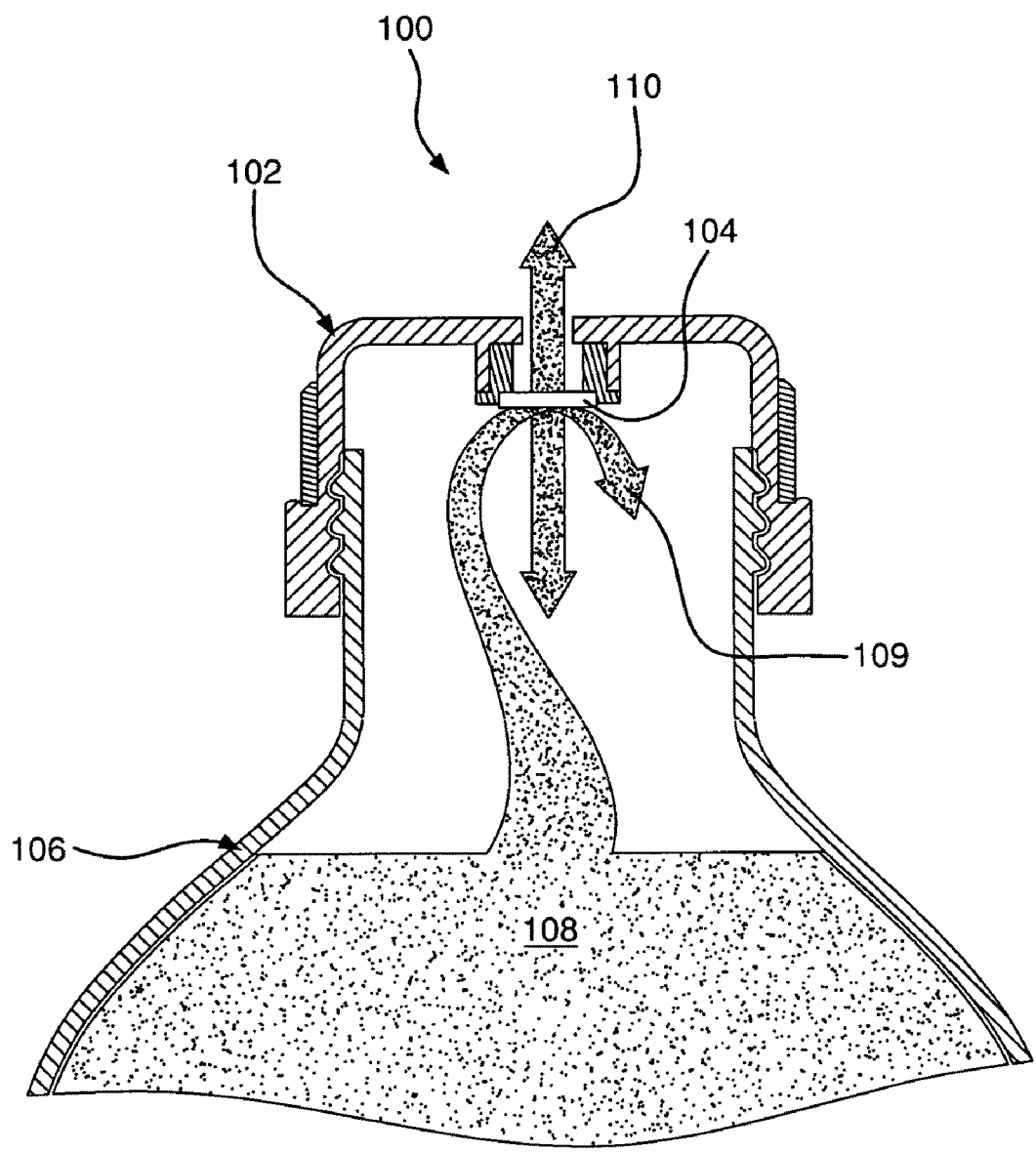
FIG. 1 is a representation of venting apparatus according to an embodiment of the present invention.

FIG. 1 is a one possible representation of apparatus according to the present invention, generally designated 100. The apparatus 100 comprises a lid 102 containing a gas-permeable vent 104 (e.g. an air-permeable vent). The gas-permeable vent 104 is centrally located in the lid 102 and permits gas flow 110 through the vent 104. Although not shown, it is not necessary for the gas-permeable vent 104 to be centrally located on the lid 102. The lid 102 is secured to a container 106 via a screw-thread. The container 106 contains a viscous, low surface tension liquid 108. The container 106 may be used as a receptacle for any type of liquid. As shown in FIG. 1, any viscous liquid 109 contacting the gas-permeable vent 104 is repelled. The lid 102 and gas permeable vent 104 contained therein, form a liquid-tight, gas permeable seal for the container 106.

Figure 2:
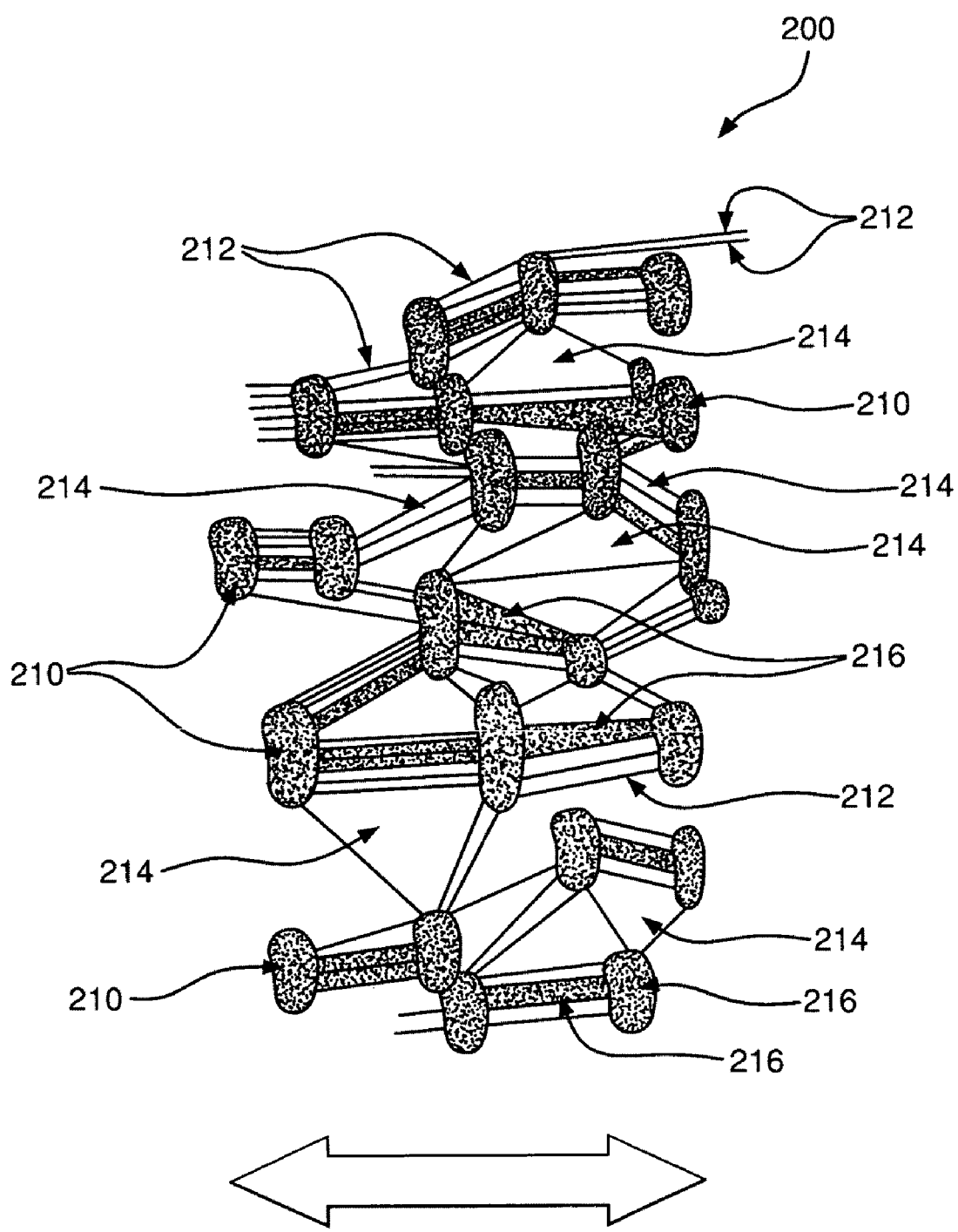
FIG. 2 is a schematic top view of a coated porous PTFE structure according to a further embodiment of the present invention.

FIG. 2 is a schematic top view of a uni-axially expanded PTFE structure generally designated 200 which may form an outer surface of a porous composite according to the present invention. The PTFE structure 200 is made up of nodes 210 and fibrils 212, with pores 214 located between the fibrils 212. There is a coating layer 216 (represented by shading) on the surface of the fibrils 212, between some of the fibrils 212, and on top of the nodes 210. The coating layer 216 is a combination of a first component comprising oleophobic and hydrophobic fluorinated material and a second component. The second comprises PFPE, said PFPE comprising end-groups selected from the following:

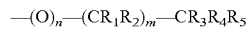

wherein:
R$_1$=H, F, Cl, Br or I;
R$_2$=H, F, Cl, Br or I;
R$_3$=H, F, Cl, Br or I;
R$_4$=H, F, Cl, Br or I;

$R_5$=H, F, Cl, Br, I, alkyl or aryl;
n=0 or 1; and
m=0-10.

Alternatively, the second component is a block copolymer comprising a PFPE backbone.

The coating layer 216 covers/fills at least partially some of the pores 214 made up by the space between the fibrils 212. The coating layer 216 may cover/fill at least part of the pores 214 on the outermost surface of the PTFE structure 200 but may also partially penetrate/impregnate into the main body of the PTFE structure 200. The coating layer 216 therefore covers/coats the nodes 210 and fibrils 212 on the outer surface of the PTFE structure 200 and may block and/or occlude some of the surface pores 214 of the PTFE structure 200.

DEFINITION OF TERMS

By "gas-permeable composite" is meant a porous material that permits bulk flow of air or other gases through it. This is in contrast to non-porous materials in which gas permeation is controlled by diffusion mechanisms.

By "oleophobic (coating) component/material" is meant a material which repels oils. Typically these materials are fluorinated and exhibit surface energies lower than about 26 mN/m, preferred lower than about 24 mN/m, most preferred lower than about 20 mN/m.

By "oleophobic substrate/composite/membrane" is meant a porous article with an AATCC Test Method 118-1989 oil rating of at least 1. This means that the gas-permeable substrate/composite/membrane has a degree of repellency towards oils and/or low surface tension liquids.

By "hydrophobic (coating) component" is meant a material which repels water. Typically these materials are substantially insoluble in water and exhibit contact angles with water greater than about 60°, preferred greater than about 90°.

By "solid" is meant a state of matter which can support loads, has a definite shape and volume, and whose constituent elements have a substantially fixed position in space relative to each other which accounts for a degree of rigidity.

By "liquid" is meant a state of matter that has the ability to flow under the action of extremely small shear stresses and to conform to the shape of a confining vessel. The term "liquid" also includes all forms of oils and greases.

By "liquid tight seal" is meant a seal which can withstand a water entry pressure of at least about 0.03 bar without leakage.

By "outer surface" is meant the outermost surface extending around an outer external perimeter of the porous polymeric structure which can be physically touched and which first comes into contact with a liquid to be repelled. It is this outer surface that is important for liquid repellency. The "outer surface" is not intended to include the inner structure within the main body of the porous polymeric structure.

By "coating" is meant a material covering surfaces on the "outer surface" of the porous polymeric structure and the inner structure within the main body of the porous polymeric structure. The coating may form at least one or more or a plurality of closed and/or occluded surface portions by, for example, regions of a closed and/or gas-impermeable coating layer.

By "fluorinated material" is meant a material with a fluorine content of at least 1 wt. %.

By "neutral PFPE" is meant a perfluoropolyether with neutral or non-reactive end groups. These are also sometimes referred to as unpolar or non-polar PFPEs. Neutral PFPEs differ from the functionalized PFPEs which contain reactive end groups. Common terminal end groups of neutral PFPEs are —$OCF_3$—$OC_2F_5$, and —$OC_3F_7$. However, there may be also other types of non-perfluorinated end groups such as those containing H-, Cl- Br- or I-radicals. Examples for non-perfluorinated end groups of neutral PFPEs comprise structures such as —$CF_2R$(R=H, Cl, Br or I) or —CFR—$CF_3$ (R=H, Cl, Br or I). Also PFPEs containing radicals such as H-, Cl-, I- or Br- or even other radicals within their backbone (i.e. not just as end groups) may still be regarded as neutral PFPEs according to the present invention, as long as they are hydrophobic.

By "porous" is meant materials that allow passage of gases, especially air. These include materials that comprise pores and voids that form passageways extending through the thickness of a material. Such materials may have very small, microscopic voids throughout an internal structure which form an interconnected continuous air path (passageway) from one surface to another. The passageways open on sides of the material, and may be interconnected internally by, for example, fibrils and nodes.

By "polymer structure" is meant any form of dimer, trimer, other forms of higher adducts, co-polymers, block co-polymers, ter-polymers, branched polymers, cross-linked polymers, low molecular weight polymers or high molecular weight polymers. A "polymer structure" may be formed by a polymerisation reaction such as a radical polymerisation, a condensation or addition type reaction and may have repeat structural units and/or monomers connected by covalent bonds.

By "oligomer" is meant a relatively small number of monomer units such as less than about 100 monomer units or less than about 30 monomer units.

By "component" is meant a chemical molecule, compound and/or composition which is used as one of the ingredients to form the coating.

Definition of the Term "Liquid Repellency"

The term "liquid repellency" is used as a generic term for the ability of a surface to repel or remove liquids from a surface when forces such as gravity or surface tension work. The term is used irrespective of the exact mechanism how the liquid is repelled or leaves the surface. It implies the contraction of liquids on a surface to droplets, but also formation of a liquid film on the surface which contracts and/or slides down, or any other suitable mechanism.

There was the need to come up with a test method which quantifies the liquid repellency property of a porous substrate. The test method used is described below.

Test Descriptions

Oil Rating

The oil rating was determined using the AATCC Test Method 118-1989. The higher the rating, the better the oil repellency/resistance. A value of greater than 1, more preferably 4, or higher is preferred. The oil rating was determined on the side where the coating solution was applied or on the side that was directed towards the coating solution bath, respectively.

Water Entry Pressure

Water entry pressure (WEP) provides a test method for water intrusion through membranes. A test sample is clamped between a pair of testing plates. The lower plate has the ability to pressurise a section of the sample with water. A piece of pH paper is placed on top of the sample between the plate on the non-pressurized side as an indicator of evidence for water entry. The sample is then pressurized with a rate of 1 bar/100 seconds until the pH paper gets wet which is the first sign of water entry. The water pressure at breakthrough is recorded as the WEP.

Liquid Entry Pressure

The same test method as described for the measurement of the water entry pressure was used, only water replaced by another liquid. In all measurements, a liquid composed of 68 wt. % water, 30 wt. % of 2-Propanol (Isopropanol, 99%) and 2 wt. % sodium dodecylsulfate (SDS) was used as test liquid. A surface tension of 26.5 mN/m and a viscosity of 2.5 mPa·s (at a shear rate of 50 sec$^{-1}$) were measured at a temperature of 25° C. for this test liquid. (This test liquid was used as an approximation to standard liquid cleaners).

Gurley Air Flow Data

The Gurley air flow test measures the time in seconds for 100 cc of air to flow through a one square inch sample at 4.88 inches of water pressure. A sample is measured in a Gurley Densometer Model 4110 (ASTM 0726-58). The sample is placed between the clamp plates. The cylinder is then dropped gently. The automatic timer (or stopwatch) is used to record the time (seconds) required for a specific volume recited above to be displaced by the cylinder. This time is the Gurley number.

Pore Size

Pore size is determined using a standard PMI Porometer, Model CFP-1500 AEXL. A silicone fluid is used for wetting of the pores (Silicones for personal care, 200 10 cst, from Dow Corning). The determined mean flow pore size is given as the pore size of the substrates used in the description of the examples.

Surface Tension Measurement

Surface tension of the challenge fluid was measured with a Krüss K12 tensiometer, using a Krüss K12 hardware using the Wilhelmy plate method. Wilhelmy plate immersions were conducted with flamed Krüss standard platinum plate and the software default parameters. All given surface tensions refer to a temperature of 25° C.

Viscosity Measurements

The viscosity of the reference liquids is determined by a Haake rheometer, model RheoStress 1. A plate/cone arrangement (cone designation C35/2 Ti) was used for all the measurements. All given viscosity data refer to a temperature of 25° C. and a shear rate of 50 sec.$^{-1}$.

Determination of Coating Laydown

The total coating laydown was determined by hot solvent extraction. For these measurements, 25 mm diameter discs of all samples were weighted before and after hot solvent extraction. From the weight difference of those samples the coating laydown was determined.

The samples were extracted for several days first with hot perfluorinated solvent FC-77 (from 3M company), afterwards with hot fluorinated solvent HFE-7500 (from 3M company) until no more weight loss of the samples was detected.

Air Flow Recovery Test

FIGS. 3A-3C represent the air flow recovery test. FIG. 3A is a schematic representation of the air-flow recovery test apparatus, generally designated 300. The air-flow recovery test apparatus 300 comprises a cylindrical container 302 with a diameter of 80 mm which may be used to retain a volume of 100 ml of test liquid 304. As test liquid, a water based liquid composed of 3 wt. % Polyvinylpyrrolidone (from Aldrich Company, Art. No. 437190, mean molecular weight of 1300000 as determined by LS (Light Scattering)), 3 wt. % of the silicone surfactant Tegoprene® 5847 (wetting agent from Goldschmidt AG), and 94 wt. % deionised water was used. A surface tension of 23 mN/m and a viscosity of 13.7 mPa·s (measured at a shear rate of 50 sec$^{-1}$) were determined for the test liquid at a temperature of 25° C. The test liquid must always be freshly prepared on the day of the measurement. This test liquid was used for the characterisation of all samples and in the following, all air flow data after performing air-flow recovery test always refer to this test liquid unless otherwise stated.

A second test liquid, a viscous oil was used for three samples only (Examples 1, 4 and 5) to demonstrate the ability of surfaces to repel oils. The designation of this oil was "Castrol Transmax Z" (automatic transmission fluid from Deutsche Castrol Vertriebsgesellschaft mbH, Hamburg). A surface tension of 29.5 mN/m and a viscosity of 59.7 mPa·s (measured at a shear rate of 50 sec$^{-1}$) was determined at 25° C.

As shown in FIG. 3A, there is an adapter 306 through which air may enter into the container 302 for measurement of the initial air flow and residual air flow after liquid contact. Both air flows are measured at a pressure of 12 mbar (i.e. at an overpressure of 12 mbar compared with the surrounding pressure) yielding the air flow in the units norm/standard-liters/hour/cm$^2$. All air flow data regarding air flow recovery test hereinafter referred to are therefore in the units of standard liters/hour/cm$^2$ measured at a pressure of 12 mbar.

The membrane being tested is located at the top end 308 of the container 302. FIG. 4 is an expanded view of the top end 308 of the container 302 which shows a microporous test sample 310 extending across a neck 302a of the container 302. The material the container 302 and the neck 302a were constructed of was polycarbonate (Makrolon®).

The radius of the neck 302a rounding was 1 mm. The microporous test sample 310 is secured in place using a sealing ring 312 and a counter-pressure plate 314. A substantially circular 20 mm diameter section of the microporous test sample is exposed to the test liquid 304. In the event that a sample to be tested has a smaller diameter, then an adaptor plate may be used to seal and locate the test sample or vent construction, respectively, within the perimeter of the neck 302a. A simple calculation can then be used to scale the obtained results for these smaller types of microporous test samples. Smaller samples may therefore be measured with this apparatus.

To perform the air flow recovery test, the container 302 as shown in FIG. 3B is inverted so that the test liquid 304 contacts the microporous test sample 310 for 5 seconds. The height of the liquid column over the test sample is 2 cm. As shown in FIG. 3C, the container 302 is then returned to its original position whereupon the residual air flow was measured after a waiting time of exactly 5 minutes. The air flow recovery test is performed at room temperature.

The percent air flow recovery of a porous test sample was determined by the following formula: (residual air flow/initial air flow)*100. Both air flows were determined as described in the air flow recovery test.

Liquid Repellency Test

Figure 5:
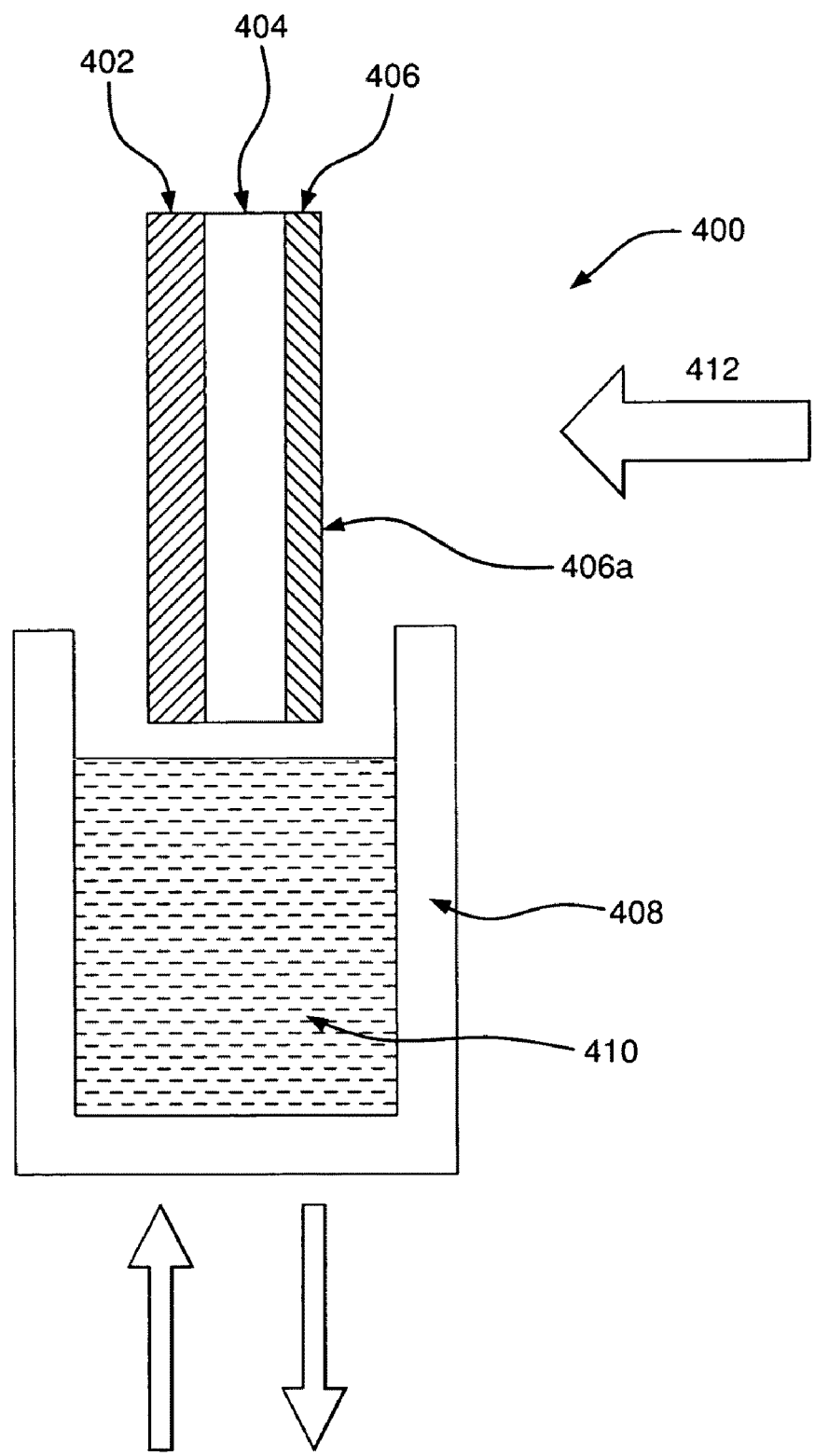
FIG. 5 is a representation of apparatus and a procedure used for conducting a vertical immersion test referred to as a "liquid repellency test"

FIG. 5 is a representation of apparatus 400 used to perform a liquid repellency test.

One side of a glass slide 402 (3.4 cm×8 cm) is provided with a double-sided adhesive tape 404 onto which a sample of the microporous substrate 406 to be tested is fixed.

To perform the liquid repellency test, the glass slide 402 with the fixed porous substrate 406 is vertically immersed into a bath 408 containing test liquid 410 for about 1-2 seconds and then pulled out. The test liquid was coloured with a few drops (5 drops per 100 g of liquid) of the following blue dyestuff solution: Duasyn Cyan FRL 10 liq. (Clariant Produkte (Deutschland) GmbH, Frankfurt am Main). The test was practically done by vertically fixing the glass slide 402 with a sample holder (not shown), and lifting the bath 408 with the test liquid 410 from below until about 80% of the length of the fixed porous substrate 406 is immersed. After an immersion time of about 1-2 seconds, the bath 408 was quickly pulled away from the bottom so that a thin film of the test liquid 410 was left on outer surface 406a of the porous substrate 406. The sliding down and contraction behaviour of the liquid film of 410 on the outer surface 406a during time may be recorded with a video camera 412 for subsequent evaluation.

Figure 6A:
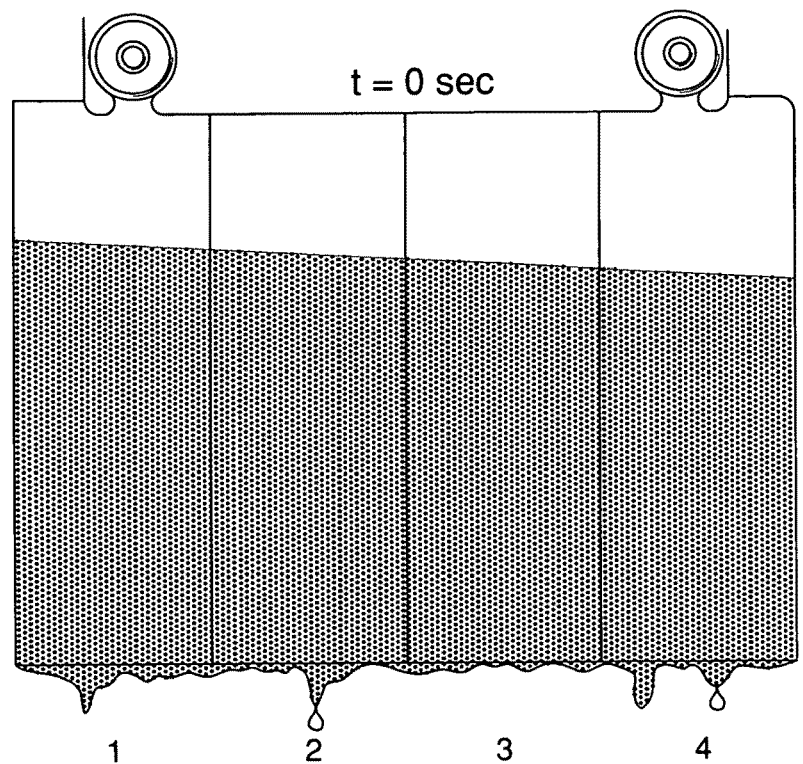
FIGS. 6A and 6B are representations of test liquid residing on four different test samples 1-4 at t=0 sec and t=15 sec, respectively.
Figure 6B:
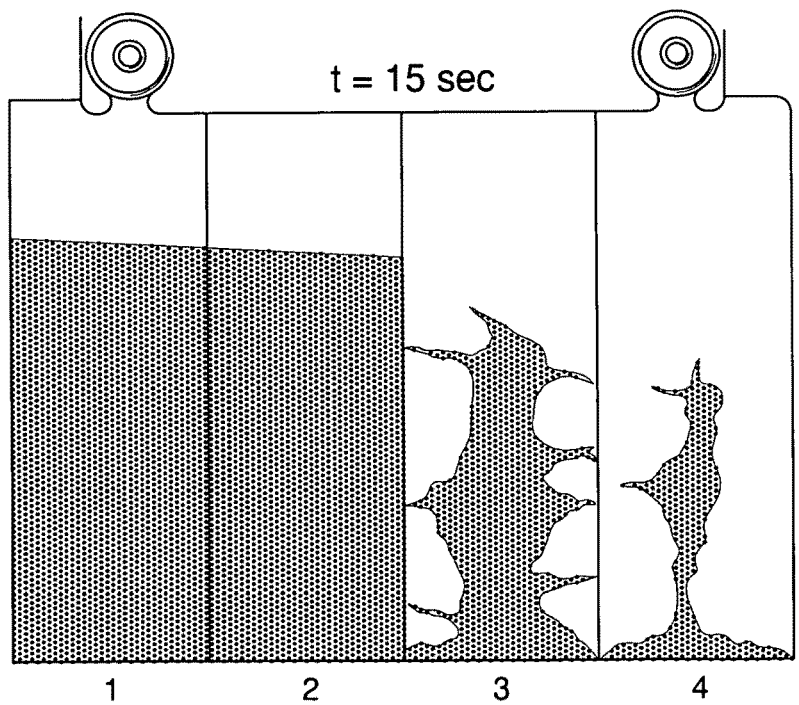

FIGS. 6A and 6B show a typical evaluation of four test Samples 1, 2, 3, 4 in parallel. Sample 1 was coated with a solution of 1 wt. % Teflon® AF1600 in a fluorinated solvent, Sample 2 was coated with a solution of 1 wt. % Teflon® AF1600 and 1 wt. % PFPE in a fluorinated solvent, Sample 3 was coated with a solution of 1 wt. % Teflon® AF1600 and 5 wt. % PFPE, and Sample 4 was coated with a solution of 1 wt. % Teflon® AF1600 and 10 wt. % PFPE in a fluorinated solvent. The PFPE used was Fomblin® Y LVAC 25/6 (Solvay Solexis; average molecular weight: 3300 a.m.u.). FIG. 6A shows a first snapshot immediately after removal of the bath (t=0 seconds) and FIG. 6B shows a second snapshot after a waiting time of 15 seconds, respectively. The test liquid used was a mixture of water, polyvinylpyrrolidone and a silicone surfactant (Tegoprene® 5847) as described before. This test liquid had a surface tension of 23 mN/m and a viscosity of 13.7 mPa·s (at a shear rate of 50 sec$^{-1}$), both measured at a temperature of 25° C.

FIG. 6B shows that Sample 1 is ineffective at repelling the test liquid as the percentage of area covered remains almost unchanged after 15 seconds. However, Samples 3-4 which were coated with increasing amounts of PFPE exhibit much improved liquid repellency properties. Sample 4 has the best liquid repellency properties as virtually all of test liquid has been repelled from the contact surface after 15 seconds.

Figure 7A:
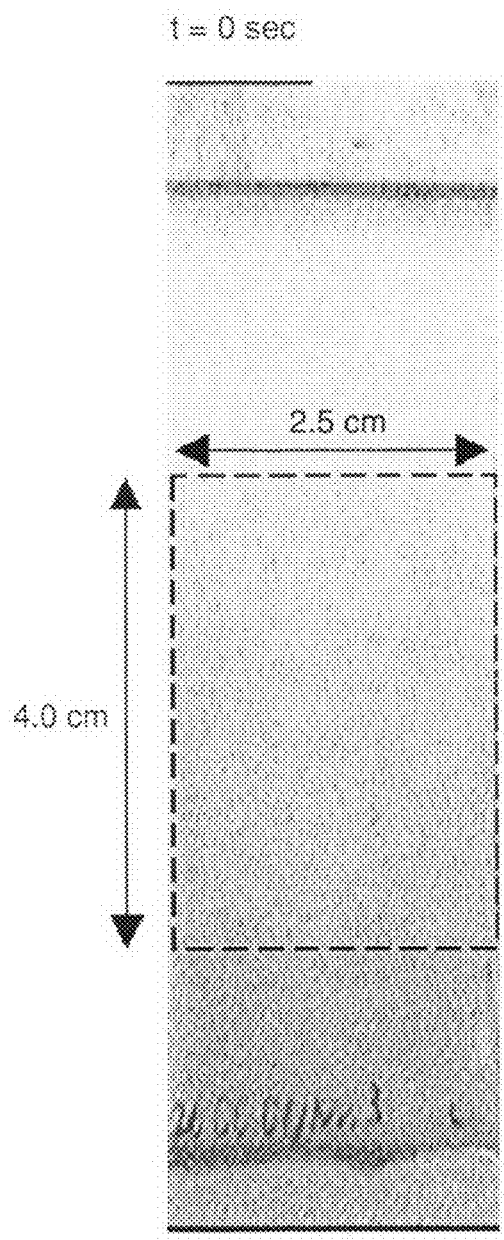
FIGS. 7A and 7B are expanded views of sample 3 as shown in FIGS. 6A and 6B at t=0 sec and t=15 sec, respectively.
Figure 7B:
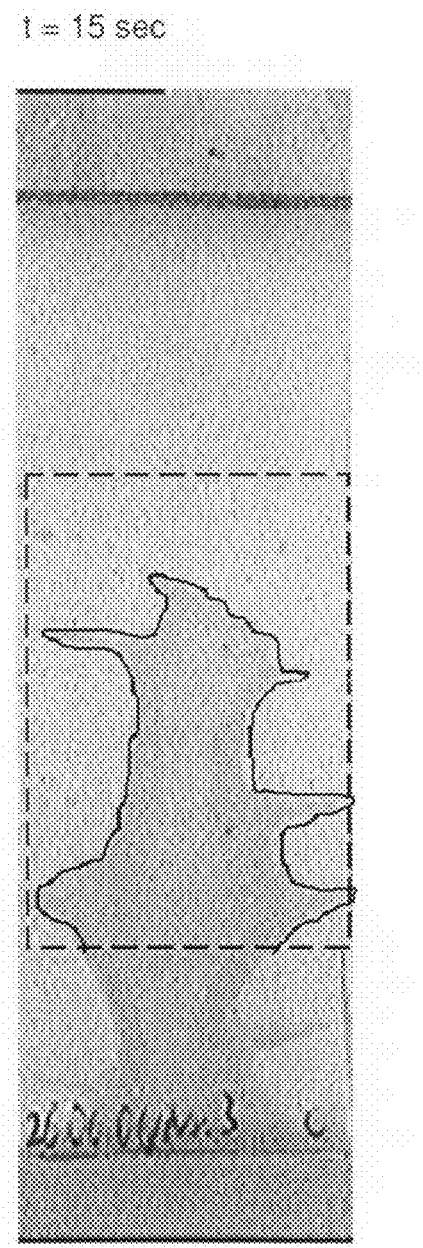

FIGS. 7A and 7B are magnified views of the images taken of Sample 3 at t=0 seconds and t=15 seconds, respectively. The liquid repellency test requires the fraction of the area within the evaluated area which is still covered by the test liquid to be determined after a certain time t. For Sample 3, after a waiting time of 15 seconds about 50% of the evaluated area is still covered by the test liquid. The evaluated area was 2.5 cm (width of the sample)×4.0 cm (distance from the liquid borderline at t=0 seconds to the lower edge).

Whilst specific embodiments of the present invention have been described above, it will be appreciated that departure from the described embodiments may still fall within the scope of the present invention. For example, any suitable oleophobic and hydrophobic fluorinated material may be used to form the first component and any suitable second component comprising a PFPE with end-groups as follows may be used:

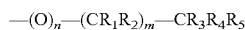

$$—(O)_n—(CR_1R_2)_m—CR_3R_4R_5$$

wherein:
$R_1$=H, F, Cl, Br or I;
$R_2$=H, F, Cl, Br or I;
$R_3$=H, F, Cl, Br or I;
$R_4$=H, F, Cl, Br or I;
$R_5$=H, F, Cl, Br, I, alkyl or aryl;
n=0 or 1; and
m=0-10.

Alternatively, the second component may comprise a block copolymer comprising a PFPE backbone.

EXAMPLES

In the following examples, four different expanded polytetrafluoroethylene (ePTFE) membranes were used as a porous polymer substrate.

Substrate 1

An uncoated porous monoaxial expanded polytetrafluoroethylene membrane having a thickness of 308 μm, an area weight of 275 g/m$^2$, a porosity of 59.3%, a mean pore size of 0.32 μm, an air flow of 24 Gurley seconds, a water entry pressure of 0.93 bar, and an oil rating of 2 was used. The polytetrafluoroethylene membrane was manufactured as defined in U.S. Pat. No. 3,953,566, which is incorporated herein by reference.

Substrate 2

An uncoated porous expanded polytetrafluoroethylene membrane commercially available under the article number #13883na from W.L. Gore & Associates was used. The polytetrafluoroethylene membrane has a porosity of 53% and was oleophobically treated with a fluoromethacrylate.

This oleophobically treated ePTFE membrane had a thickness of 191 μm, an area weight of 205 g/m$^2$, a porosity of 51%, a mean pore size of 0.72 μm, an air flow of 25 Gurley seconds, a water entry pressure of 1.19 bar, and an oil rating of 8.

Substrate 3

A commercially available biaxial expanded ePTFE membrane (available from W. L. Gore & Associates GmbH, Germany, Article No. GMP 20233). This ePTFE membrane had a thickness of 25 μm, an area weight of 16 g/m$^2$, a porosity of 71%, a mean pore size of 0.19 μm, an air flow of 13.4 Gurley seconds, a water entry pressure of 4.38 bar, and an oil rating of 1.

Substrate 4

An uncoated porous monoaxial expanded polytetrafluoroethylene membrane having a thickness of 106 μm, a width of 12.0 cm, an area weight of 83 g/m$^2$, a porosity of 64%, a mean pore size of 0.32 μm, an air flow of 22 Gurley seconds, a water entry pressure of 1.40 bar, and an oil rating of 1 was used. The polytetrafluoroethylene membrane was manufactured as defined in U.S. Pat. No. 3,953,566, which is incorporated herein by reference.

The parameters and properties of Substrates 1, 2, 3 and 4 are shown in Table 1 below.

TABLE 1

| Substrate No. | Thickness (μm) | Area Weight (g/m$^2$) | Density (g/cm$^3$) | Porosity (%) | Pore Size PMI MFP AVG (μm) | Air flow in Gurley sec. | WEP (bar) | Oil rating |
|---|---|---|---|---|---|---|---|---|
| Substrate 1 | 308 | 275 | 0.892 | 59.3 | 0.32 | 24.2 | 0.93 | 2 |
| Substrate 2 | 191 | 205 | 1.074 | 51.0 | 0.72 | 25.4 | 1.19 | 8 |
| Substrate 3 | 25 | 16 | 0.636 | 71.0 | 0.19 | 13.4 | 4.38 | 1 |
| Substrate 4 | 106 | 83 | 0.789 | 64.0 | 0.32 | 22 | 1.40 | 1 |

The Substrates 1, 2, 3 and 4 were treated to form composites according to the present invention. Two different coating processes were used for the treatment.

Coating Process A—Continuous Immersion/Dipping Process

Figure 8:
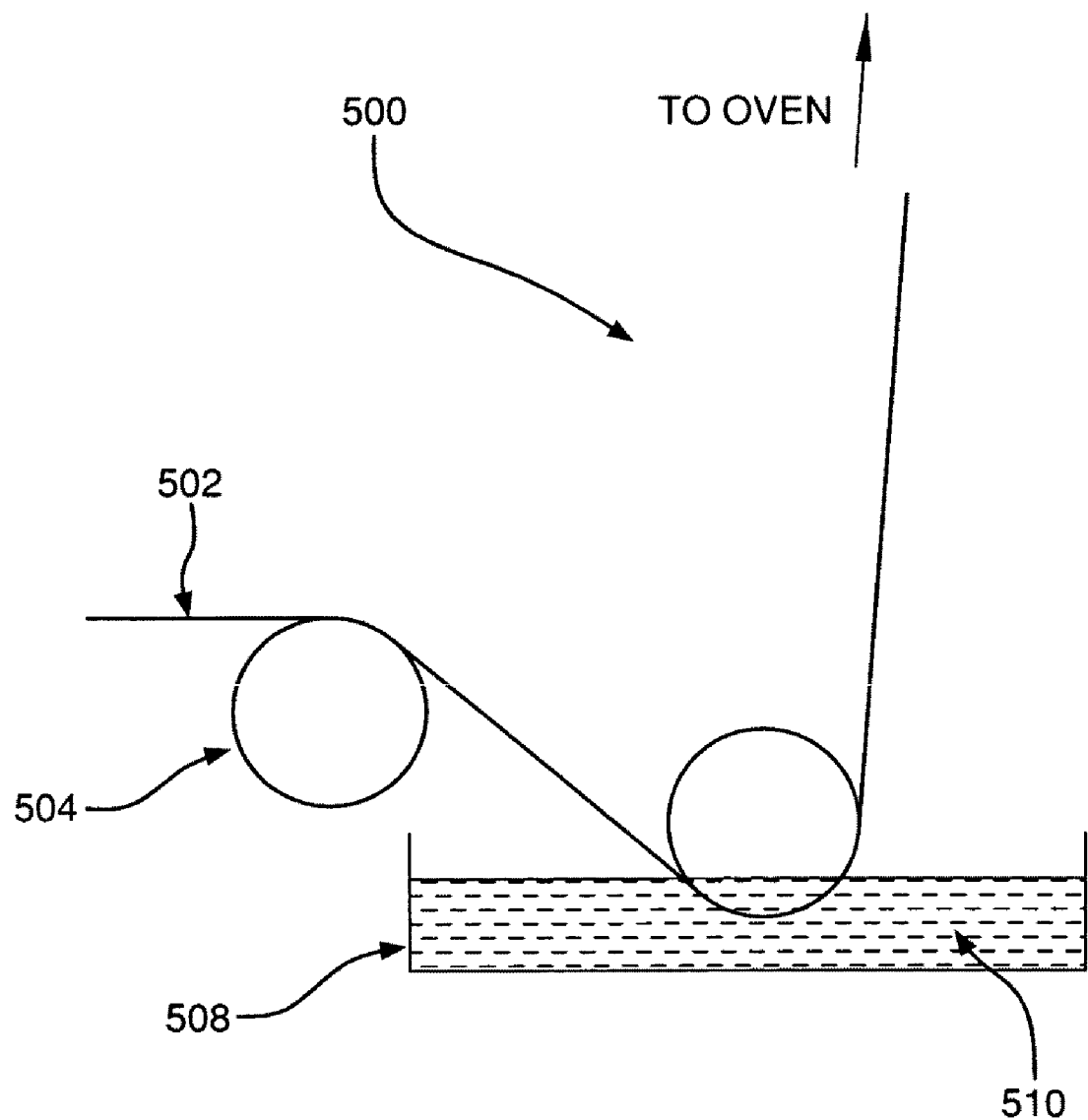
FIG. 8 is a representation of coating apparatus used to form a gas-permeable composite according to the present invention.

FIG. 8 is a representation of apparatus generally designated 500 used in coating process A. As shown in FIG. 8, a microporous substrate 502 is passed over a first roller 504 and then using an immersion roller 506 is passed through a bath 508 containing coating solution 510. The speed of the substrate 502 through the bath 508 is adjusted (typically around 1 m/min) so that the opaque microporous substrate 502 is substantially transparent when pulled out of the bath 508 (as an indication for filling of the pores with the coating solution). Afterwards, the coated substrate is fixed on a tenter frame (not shown) and passed through an oven (not shown) for a dwell time of about 2 minutes to completely remove the solvent. The oven temperature may be varied depending on the solvent to be evaporated and may, for example, range from about 25° C.-150° C. Regarding the described Examples 1-15, the oven temperature was in the range of about 80-100° C.

Discontinuous Coating Process B—Hand Sample Process

One side of a glass slide (2.5 cm×7.5 cm) is provided with a double-sided adhesive tape onto which a sample of the substrate is fixed.

The supported substrate is then held at about a 60° angle over a catch pan and saturated with the coating solution using a pipette. The coating solution almost immediately wetted out the pores of the substrate (i.e. the pores were filled with the coating solution as evidenced by the normally opaque PTFE membrane becoming transparent), and excess solution dripped off into the pan.

Afterwards, the coated substrate is dried for 10 minutes at room temperature in a fume hood and an additional 5 minutes at 100° C. in a ventilated oven.

The following Examples were tested for air permeability (reported in Gurley seconds), water entry pressure (WEP), liquid entry pressure (LEP), resistance to wetting with oil (Oil Rating), the initial air flow and the residual air flow after exposure to a testing liquid.

Comparative Example 1

Substrate 1 was only coated with a 1 wt. % Teflon® AF1600 coating solution using the continuous coating process A. The Teflon® AF1600 renders the substrate oleophobic. The coating laydown of Teflon® AF1600 was about 3.7 g/m².

The coating solution was obtained by placing 1 g of a copolymer of tetrafluoroethylene (TFE) and 2,2-bis-trifluoromethyl-4,5-difluoro-1,3,-dioxol (PDD), Teflon® AF1600 amorphous fluoropolymer (64 mole % PDD) supplied by DuPont company, in 99 g of the perfluorinated solvent PF-5070 (from 3M company) to result in a 1 wt. % solution of Teflon® AF1600. The mixture was stirred for around 6 hours at room temperature until the Teflon® AF1600 was completely dissolved.

The resultant coated substrate 1 had an oil rating of 6 and therefore is oleophobic. Furthermore, the coated substrate 1 showed an air flow of about 17 Gurley seconds, a WEP of about 0.93 bar and a LEP of about 0.27 bar. The initial air flow of coated substrate 1 was 3.32 l/h/cm² (measured at a pressure of 12 mbar).

The residual air flow after the air flow recovery test was 0.0 l/h/cm² (measured at a pressure of 12 mbar). There was therefore no air flow recovery after exposure to the test liquid as described in air-flow recovery test.

Figure 9:
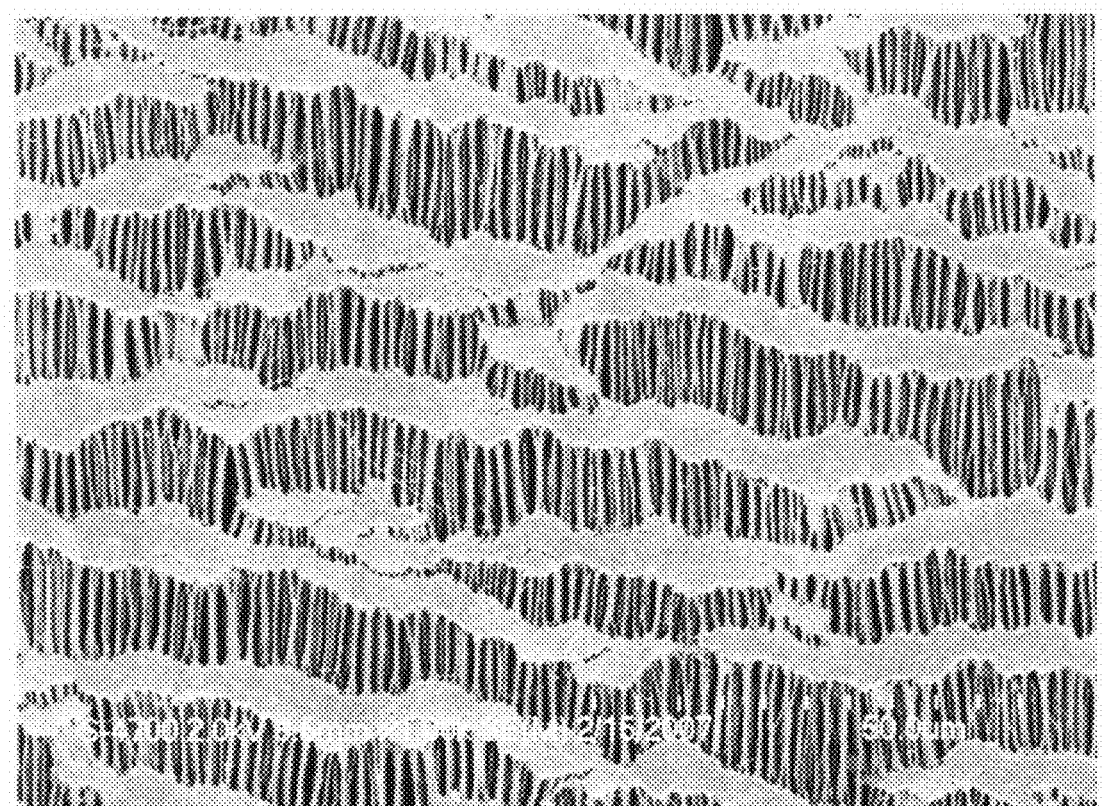
FIGS. 9-10 are SEM surface images at different scales of magnification of a gas-permeable composite which was coated by a solution of 1 wt. % Teflon® AF1600 in a fluorinated solvent.
Figure 10:
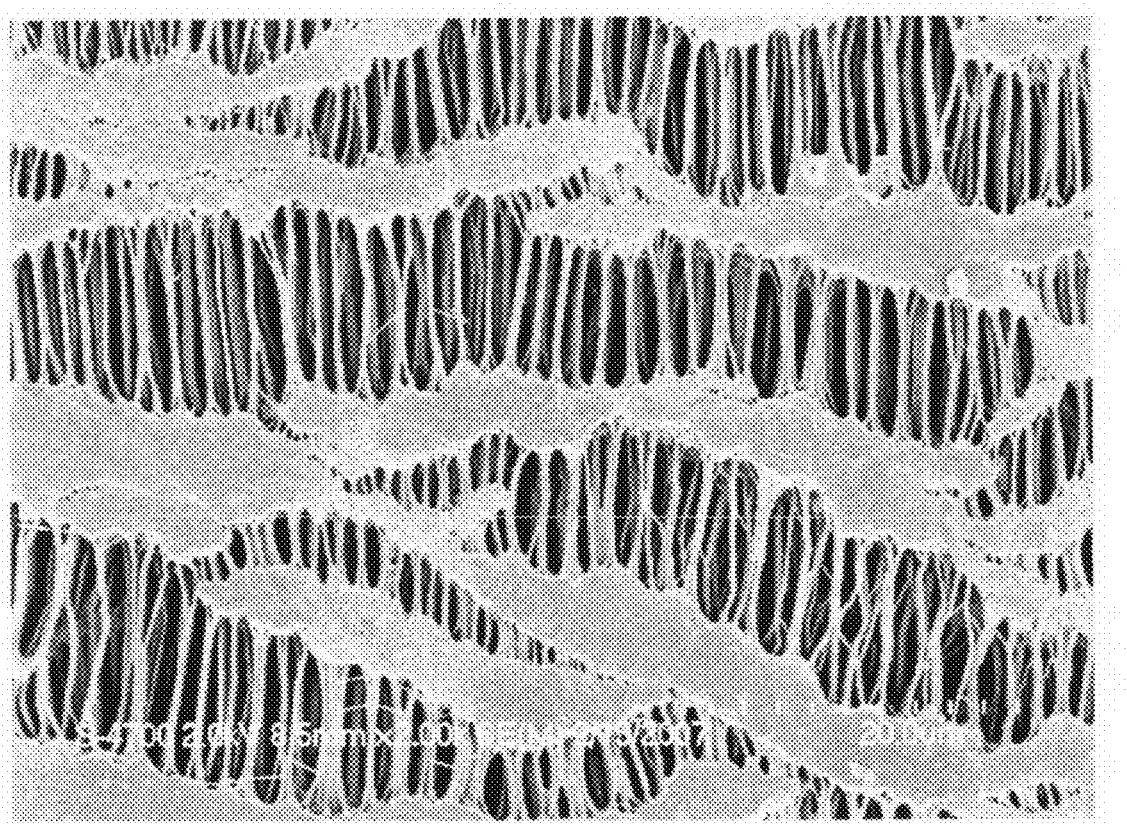

FIGS. 9 and 10 show two surface SEM images at different magnification of Example 1.

All measured data are shown in Table 2 below.

Comparative Example 2

The substrate 1 was coated with a 10 wt. % PFPE coating solution using the continuous coating process A. The coating laydown of the PFPE was of about 38.2 g/m².

The coating solution was obtained by placing 10 g of PFPE (Fomblin® Y LVAC 25/6 from Solvay Solexis company) in 90 g of the perfluorinated solvent PF-5070 (from 3M company) to result in a 10 wt. % coating solution of PFPE. The solution was shaken until the PFPE was completely dissolved.

This coated substrate showed only a very low oil-rating of 2, a Gurley number of about 12.1 seconds, a WEP of about 0.71 bar and a very low LEP of only about 0.07 bar. The initial air flow of the coated substrate 1 was 4.20 l/h/cm² (measured at a pressure of 12 mbar).

The residual air flow after air flow recovery test was about 3.04 l/h/cm² measured at a pressure of 12 mbar). Therefore, this example showed an air flow recovery after exposure to the low surface tension test liquid of air flow recovery test, but only a poor oil rating and very low liquid entry pressure. Therefore this sample will get wetted after longer exposure to low surface tension liquids, or if some hydrostatic pressure is applied.

All measured data are shown in Table 2 below.

Example 3

The substrate 1 was coated with a coating solution comprising 1 wt. % Teflon® AF1600 and 1 wt. % PFPE using the continuous coating process A. The total coating laydown was about 7.5 g/m².

The coating solution was obtained by placing 1 g of Teflon® AF1600 and 1 g of PFPE (Fomblin® Y LVAC 25/6) in 98 g of the perfluorinated solvent PF-5070 (from 3M company) to result in a 1 wt. % Teflon® AF1600/1 wt. % PFPE coating solution. The mixture was stirred around 6 hours at room temperature until the Teflon® AF1600 was completely dissolved.

The resultant coated Example 3 showed an oil-rating of 7, an air flow of 15.3 Gurley seconds, a WEP of about 0.86 bar and a LEP of about 0.26 bar.

The residual air flow after air flow recovery test was 0.0 l/h/cm² (at a pressure of 12 mbar). Therefore this sample showed no air flow recovery after exposure to the test liquid as described in air flow recovery test.

All measured data are shown in Table 2 below.

Example 4

The substrate 1 was coated with a coating solution comprising 1 wt. % Teflon® AF1600 and 5 wt. % PFPE (Fomblin® Y LVAC 25/6) using the continuous coating process A. The total coating laydown was about 23.5 g/m².

The coating solution was obtained by placing 1 g of Teflon® AF1600 and 5 g of PFPE (Fomblin® Y LVAC 25/6) in 94 g of the perfluorinated solvent PF-5070 (from 3M company) to result in a 1 wt. % Teflon® AF1600/5 wt. % PFPE coating solution. The mixture was stirred around 6 hours at room temperature until the Teflon® AF1600 was completely dissolved.

The resultant coated substrate 1 had an oil-rating of 6, a Gurley number of about 12.5 seconds, a WEP of about 0.79 bar and a LEP of about 0.19 bar. The initial air flow of coated substrate 1 was about 3.87 l/h/cm² (measured at a pressure of 12 mbar).

This sample showed a residual air flow of about 2.79 l/h/cm² (measured at 12 mbar) after air flow recovery test. This corresponded to an air flow recovery of 72%.

Therefore this sample showed both a high liquid entry pressure which is important for practical venting applications and a good liquid repellency performance with a challenging liquid as demonstrated by the high air flow recovery after exposure to air-flow recovery test.

All measured data are shown in Table 2 below.

Example 5

The substrate 1 was coated with a coating solution comprising 1 wt. % Teflon® AF1600 and 10 wt. % PFPE using the continuous coating process A. The total coating laydown was about 42.1 g/m².

The coating solution was obtained by placing 1 g of Teflon® AF1600 and 10 g of PFPE (Fomblin® Y LVAC 25/6) in 89 g of the perfluorinated solvent PF-5070 (from 3M company) to result in a 1 wt. % Teflon® AF1600/10 wt. % PFPE coating solution. The mixture was stirred around 6 hours at room temperature until the Teflon® AF1600 was completely dissolved.

The resultant coated substrate had an oil-rating of 5, a Gurley number of about 11 seconds, a WEP of about 0.73 bar and a LEP of about 0.12 bar. The initial air flow of coated substrate 1 was 4.76 l/h/cm² (measured at a pressure of 12 mbar).

This sample showed a residual air flow of about 3.58 l/h/cm² (measured at a pressure of 12 mbar) after air flow recovery test. This corresponded to an air flow recovery of 75.2%.

Therefore, this sample showed both a higher liquid entry pressure and also an air flow recovery after exposure to air flow recovery test.

All measured data are shown in Table 2.

Figure 11:
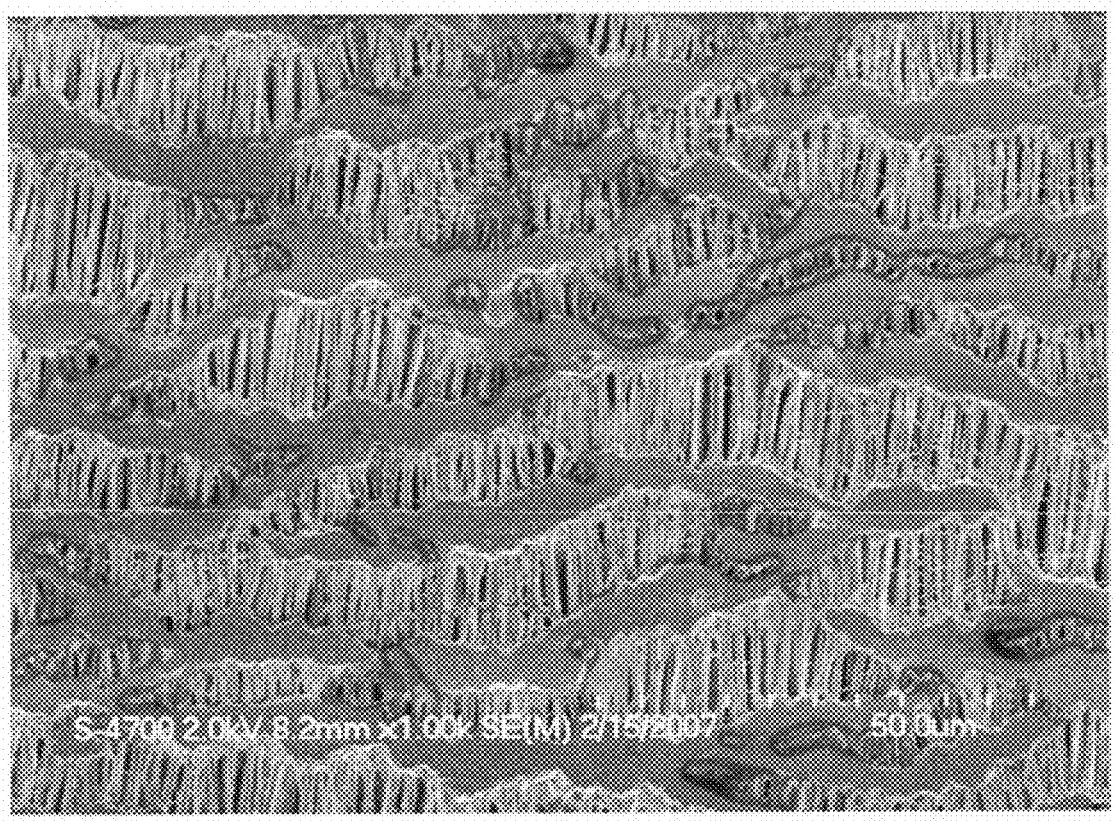
FIGS. 11-13 are SEM images at different scales of magnification of an air-permeable composite according to the present invention which was coated by a solution of 1 wt. % Teflon® AF1600 and 10 wt. % PFPE in a fluorinated solvent.
Figure 12:
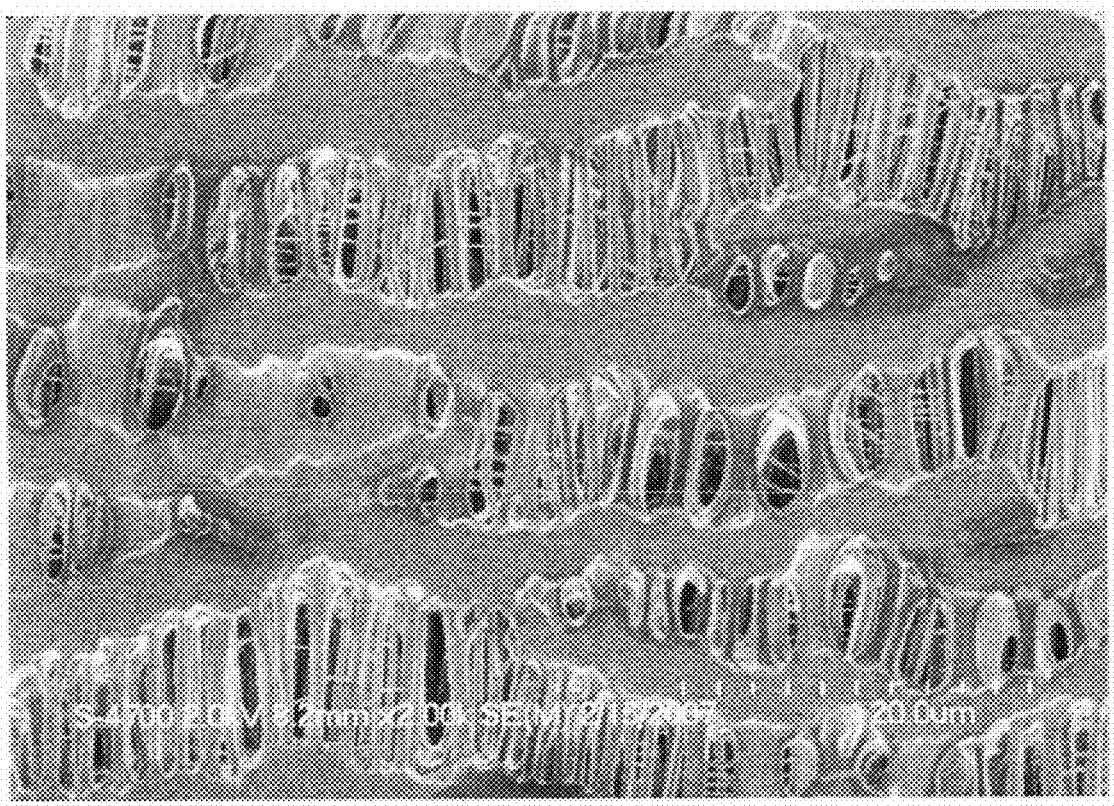

FIGS. 11 and 12 show two surface SEM images of Example 5 coated with the addition of 10 wt. % PFPE to 1 wt. % Teflon® AF 1600 solution. The surface of Example 5 shows both a significantly improved liquid repellency performance and also a marked difference in visual appearance compared with Example 1. Example 5 exhibits bridging elements between nodal island-like regions of the surface. These bridging elements consist of pores (made up by the space between two fibrils) which are (at least partially) filled or covered with the coating components. Clusters of filled/covered pores are also visible.

Figure 13:
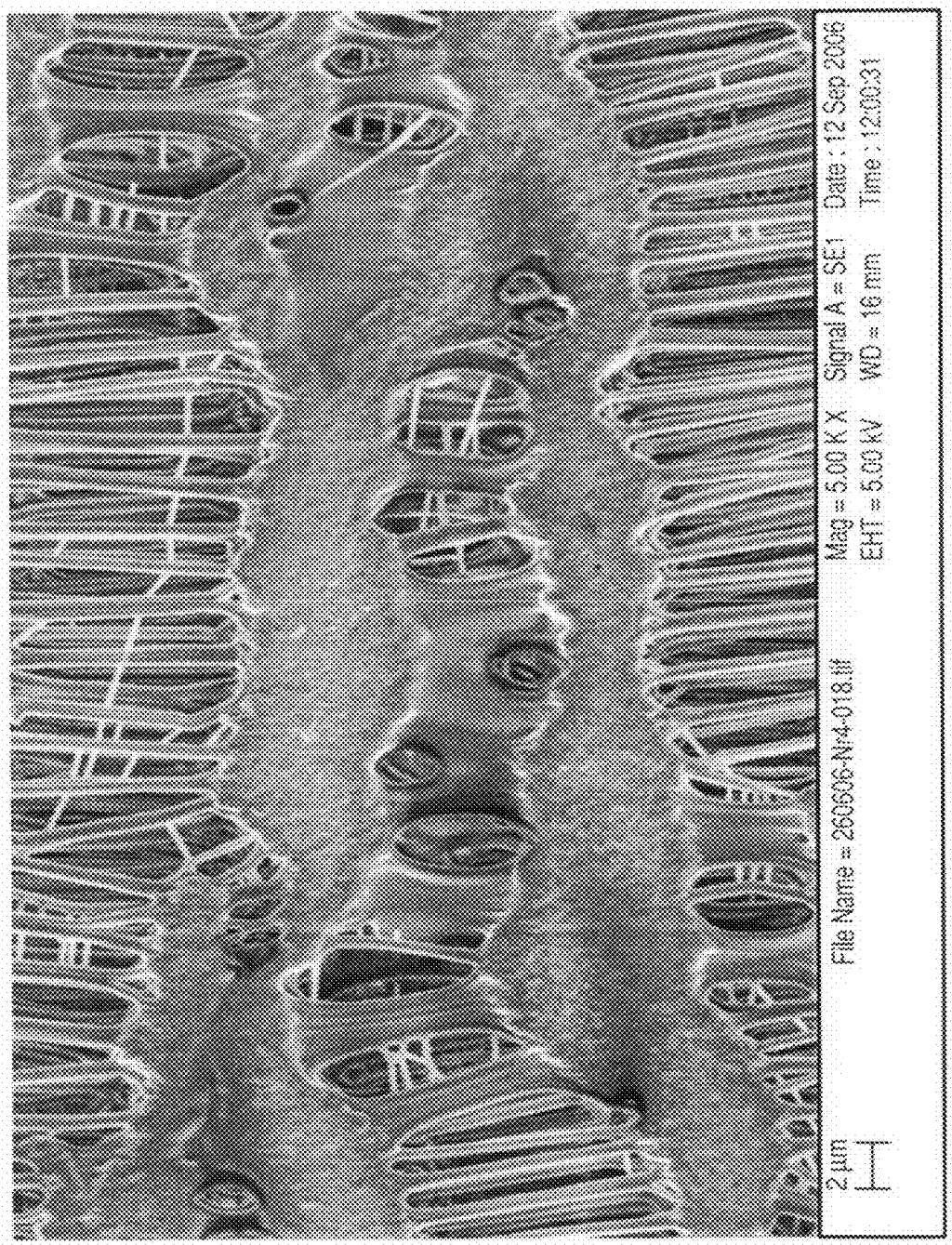

FIG. 13 is a further magnified view of Example 5.

Without wishing to be bound by theory, it is thought that these bridging elements are a reason for the significant improved liquid repellency performance. Another point noteworthy is the fact that although several pores were closed or covered, respectively, the air flow of the coated composite did not deteriorate but still showed high air flow performance.

TABLE 2

Table 2: Summary of the measurements of the Examples 1 to 5 (substrate 1 was used for preparation of all samples).

| Example | Coating Solution Composition | Total Coating Laydown (g/m²) | Oil rating | Air permeability (Gurley) (sec.) | Water entry pressure (WEP) (bar) | Liquid entry pressure (LEP) (bar) | Air-flow recovery test | | |
|---|---|---|---|---|---|---|---|---|---|
| | | | | | | | Initial air flow (l/h/cm²) @ 12 mbar | Residual air flow (l/h/cm²) @ 12 mbar | % air flow recovery |
| 1 | 1% AF1600 | 3.7 | 6 | 17 | 0.93 | 0.27 | 3.32 | 0 | 0 |
| 2 | 10% PFPE | 38.2 | 2 | 12.1 | 0.71 | 0.07 | 4.2 | 3.04 | 72.3 |
| 3 | 1% AF1600/ 1% PFPE | 7.5 | 7 | 15.3 | 0.86 | 0.26 | 3.6 | 0 | 0 |
| 4 | 1% AF1600/ 5% PFPE | 23.5 | 6 | 12.5 | 0.79 | 0.19 | 3.87 | 2.79 | 72.0 |
| 5 | 1% AF1600/ 10% PFPE | 42.1 | 5 | 11.2 | 0.73 | 0.12 | 4.76 | 3.58 | 75.2 |

Figure 14:
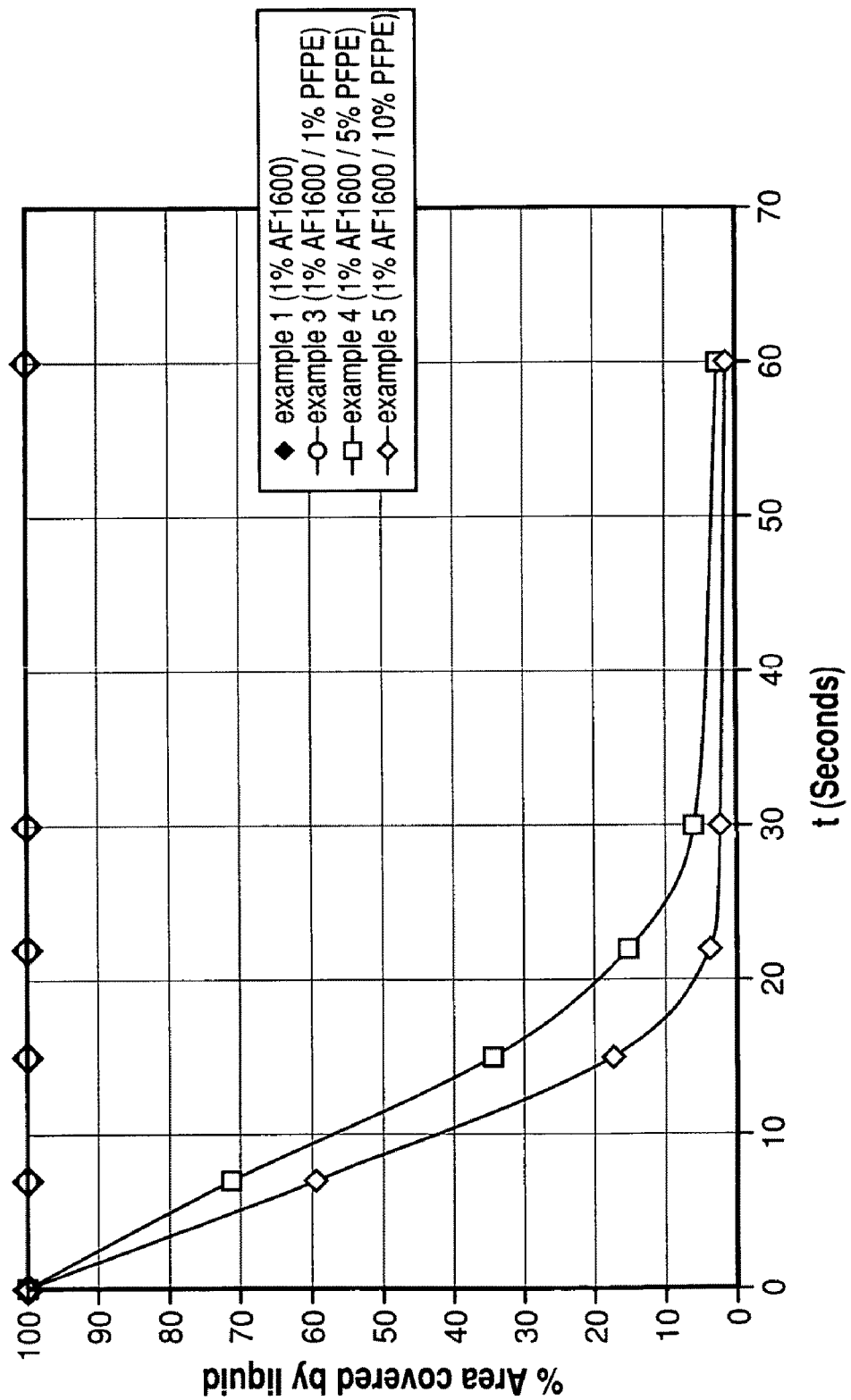
FIG. 14 is a graph showing the percentage of area covered by test liquid vs. time for gas-permeable composites according to the present invention.

FIG. 14 is a graph showing the % of area covered by test liquid vs. time using the liquid repellency test for Examples 1, 3, 4 and 5. As test liquid the already described mixture of water, Polyvinylpyrrolidone and Tegoprene® 5847 was used. A surface tension of 23 mN/m and a viscosity of 13.7 mPa·s (measured at a shear rate of 50 sec$^{-1}$) were determined for this test liquid at a temperature of 25° C. The graph clearly shows that Examples 4 and 5 which have the coating of both Teflon® AF1600 and PFPE have much improved repellency towards the test mixture than Example 1 which only has a coating of Teflon® AF1600.

Figure 15:
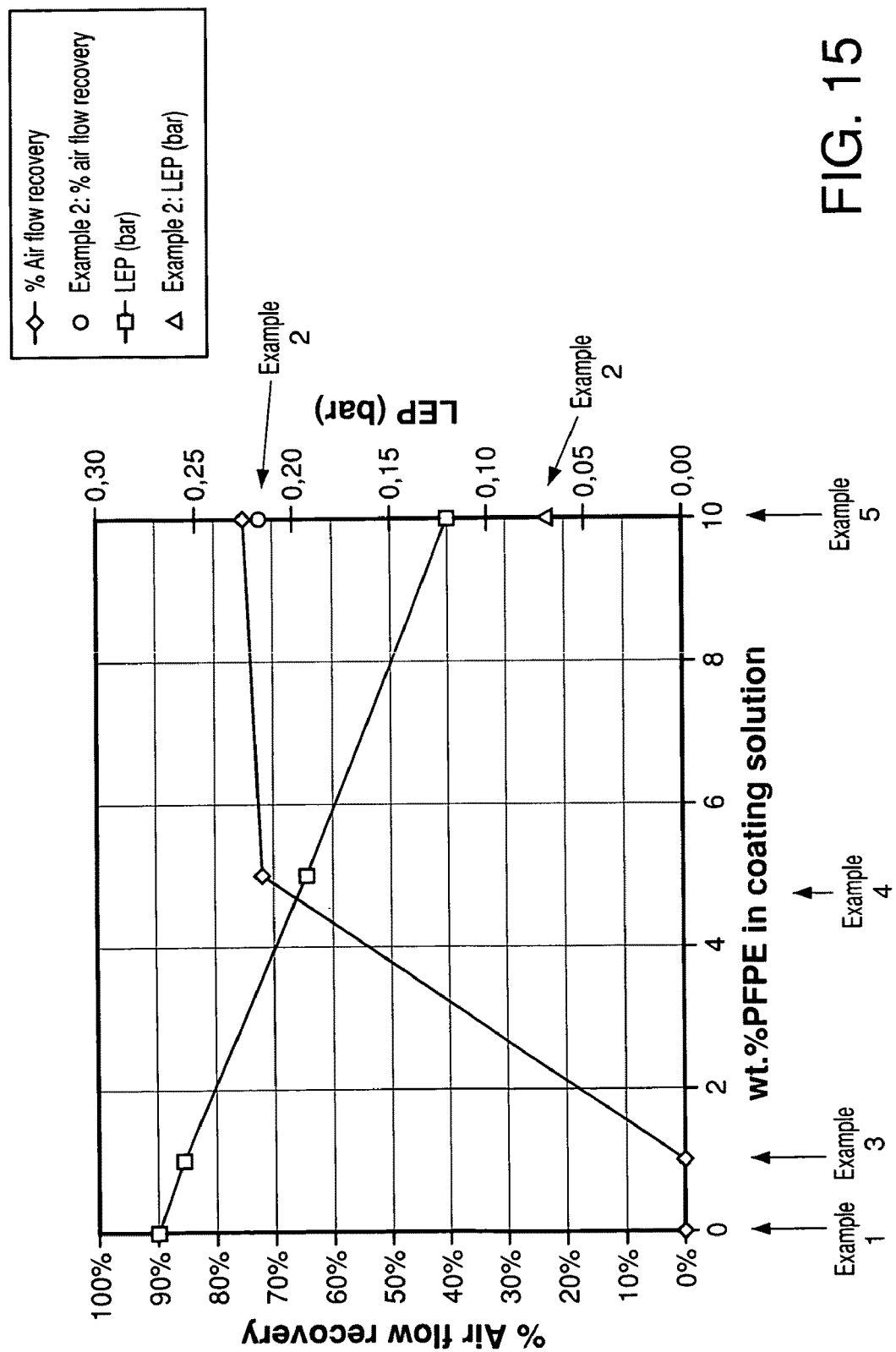
FIG. 15 is a graph showing the percentage of air flow recovery and liquid entry pressure vs. wt. % PFPE in a coating solution for gas-permeable composites according to the present invention.

FIG. 15 shows the % air flow recovery versus the % PFPE oil in the coating solution referring to the Examples 1, 3, 4, 5. Additionally the liquid entry pressure (LEP) of the samples is plotted. FIG. 15 additionally shows the corresponding sample as described in Example 2 which was only coated with the PFPE oil. The test liquid for measuring the liquid entry pressure was the already described mixture of water, 2-Propanol and sodium dodecylsulfate (surface tension: 26.5 mN/m; viscosity: 2.8 mPa·s). FIG. 15 clearly demonstrates that with the two component coating both a significantly improved air flow recovery and a high liquid entry pressure can be achieved.

Figure 16:
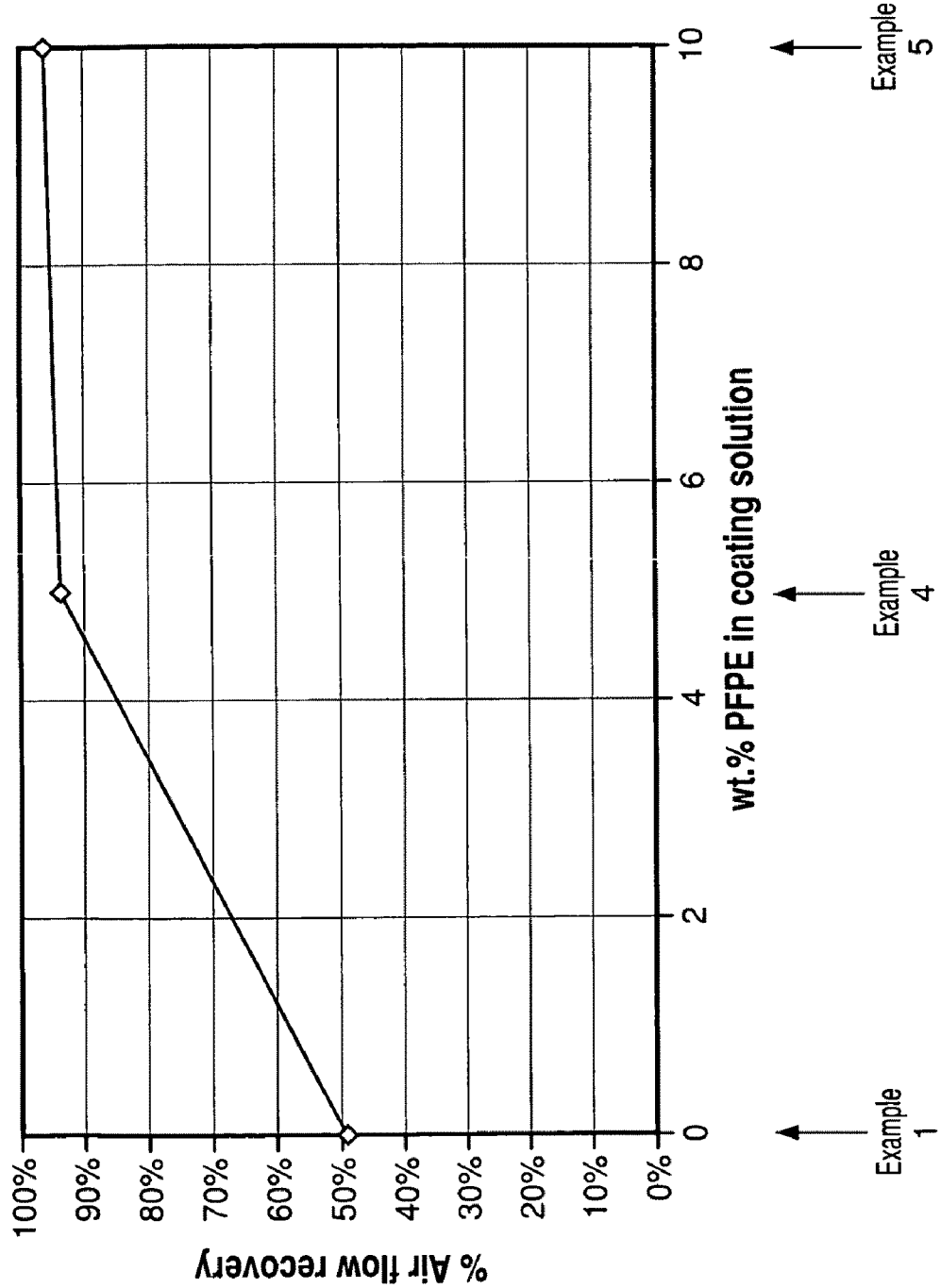
FIG. 16 is a graph showing the percentage of air flow recovery vs. wt. % PFPE in a coating solution for gas-permeable composites according to the present invention.

FIG. 16 shows the % air flow recovery versus the % PFPE in the coating solution for Examples 1, 4 and 5. As test liquid this time a viscous oil was used (Castrol Transmax Z, automatic transmission fluid from Deutsche Castrol Vertriebsgesellschaft mbH, Hamburg). Again a significant improvement in air flow recovery by addition of the PFPE to the coating formulation was recorded. The measured data are summarized in Table 3.

TABLE 3

Results from the air flow recovery test with transmission oil Castrol Transmax Z for Examples 1, 4, 5 (substrate 1).

| Example | Coating Solution Composition | air flow recovery test | | |
|---|---|---|---|---|
| | | Initial air flow (l/h/cm²)@ 12 mbar | Residual air flow (l/h/cm²)@ 12 mbar | % air flow Recovery |
| 1 | 1% AF1600 | 3.17 | 1.56 | 49.3 |
| 4 | 1% AF1600/ | 4.11 | 3.85 | 93.7 |

TABLE 3-continued

Results from the air flow recovery test with transmission oil Castrol Transmax Z for Examples 1, 4, 5 (substrate 1).

| | | air flow recovery test | | |
|---|---|---|---|---|
| Example | Coating Solution Composition | Initial air flow (1/h/cm$^2$)@ 12 mbar | Residual air flow (1/h/cm$^2$)@ 12 mbar | % air flow Recovery |
| 5 | 5% PFPE 1% AF1600/ 10% PFPE | 4.76 | 4.58 | 96.2 |

The following Examples (Examples 6-9) were conducted to demonstrate that an improvement in liquid repellency performance can be also achieved by applying one of the two components first, and the second component in a second coating step. Further a fluoromethacrylate was used as the oleophobic and hydrophobic first component. The Examples start with the already oleophobic treated Substrate 2 (Example 6), where gradually more and more of a PFPE oil is added (Examples 7-9).

Comparative Example 6

The oleophobic substrate 2 was tested without any addition of PFPE. The substrate 2 had an oil-rating of 8, a Gurley number of about 25.5 seconds, a WEP of about 1.11 bar and a LEP of about 0.33 bar. The initial air flow of oleophobic substrate 2 was 2.20 l/h/cm$^2$ (measured at a pressure of 12 mbar).

The residual air flow was 0.0 l/h/cm$^2$ (measured at 12 mbar). Therefore, there was no air flow recovery after exposure to air flow recovery test. All measured data are shown in Table 4 below.

Example 7

The oleophobic substrate 2 was coated with a 1 wt. % PFPE coating solution using the continuous coating process A. The total coating laydown was about 6.4 g/m$^2$.

The coating solution was obtained by placing 1 g of PFPE (Fomblin® Y LVAC 25/6 from Solvay Solexis company) in 99 g of the perfluorinated solvent PF-5070 (from 3M company) to result in a 1 wt. % coating solution of PFPE. The solution was shaken until the PFPE was completely dissolved. The resultant coated substrate had an oil-rating of 8, a Gurley number of about 26 seconds, a WEP of about 1.02 bar and a LEP of about 0.32 bar. The initial air flow of coated oleophobic substrate 2 was 2.15 l/h/cm$^2$ (measured at a pressure of 12 mbar).

The residual air flow after was 0.0 l/h/cm$^2$ (measured at a pressure of 12 mbar). Therefore, there was no air flow recovery after exposure to air flow recovery test. All measured data are shown in Table 4 below.

Example 8

The oleophobic substrate 2 was coated with a 5 wt. % PFPE coating solution using the continuous coating process A. The total coating laydown was of about 14.5 g/m$^2$.

The coating solution was obtained by placing 5 g of PFPE (Fomblin® Y LVAC 25/6 from Solvay Solexis company) in 95 g of the perfluorinated solvent PF-5070 (from 3M company) to result in a 5 wt. % coating solution of PFPE. The solution was shaken until the PFPE was completely dissolved. The resultant coated substrate had an oil-rating of 6, a Gurley number of about 25.4 seconds, a WEP of about 1.09 bar and a LEP of about 0.28 bar. The initial air flow of coated oleophobic substrate 2 was 2.13 l/h/cm$^2$ (measured at a pressure of 12 mbar).

The residual air flow was 1.02 l/h/cm$^2$ (measured at 12 mbar). Therefore, this example showed both a high liquid entry pressure and an air flow recovery of around 48% after exposure to the low surface tension test liquid of air flow recovery test.

All measured data are shown in Table 4 below.

Example 9

The oleophobic substrate 2 was coated with a 10 wt. % PFPE coating solution using the continuous coating process A. The total coating laydown was of about 25.8 g/m$^2$.

The coating solution was obtained by placing 10 g of PFPE (Fomblin® Y LVAC 25/6 from Solvay Solexis company) in 90 g of the perfluorinated solvent PF-5070 (from 3M company) to result in a 10 wt. % coating solution. The solution was shaken until the PFPE was completely dissolved. The resultant coated substrate had an oil-rating of 5, a Gurley number of about 24.4 seconds, a WEP of about 1.01 bar and a LEP of about 0.21 bar. The initial air flow of coated oleophobic substrate 2 was 2.36 l/h/cm$^2$ (measured at a pressure of 12 mbar).

The residual air flow was 1.20 l/h/cm$^2$ (measured at 12 mbar). Therefore, this example showed both a moderate high liquid entry pressure and a high air flow recovery of 51% after exposure to the low surface tension test liquid of air flow recovery test.

All measured data are shown in Table 4 below.

TABLE 4

Table 4: Summary of the measurements of the Examples 6 to 9 (Example 6 refers to Substrate 2 which was already oleophobic treated, Examples 7-9 refer to Substrate 2 which was additionally coated with a PFPE oil).

| | | | | | | | Air flow recovery test | | |
|---|---|---|---|---|---|---|---|---|---|
| Example | Coating Solution Composition | Total Coating Laydown (g/m$^2$) | Oil Rating | Air permeability (Gurley) (sec.) | water entry pressure (WEP) (bar) | Liquid entry pressure (LEP) (bar) | initial air flow (l/h/cm$^2$) @ 12 mbar | residual air flow after 5 min (l/h/cm$^2$ @ 12 mbar | % air flow recovery |
| 6 | no PFPE | 4.3 | 8 | 25.5 | 1.11 | 0.33 | 2.2 | 0 | 0 |
| 7 | 1% PFPE | 6.4 | 8 | 26 | 1.02 | 0.32 | 2.15 | 0 | 0 |
| 8 | 5% PFPE | 14.5 | 6 | 25.4 | 1.09 | 0.28 | 2.13 | 1.02 | 47.7 |
| 9 | 10% PFPE | 25.8 | 5 | 24.4 | 1.01 | 0.21 | 2.36 | 1.2 | 51 |

Figure 17:
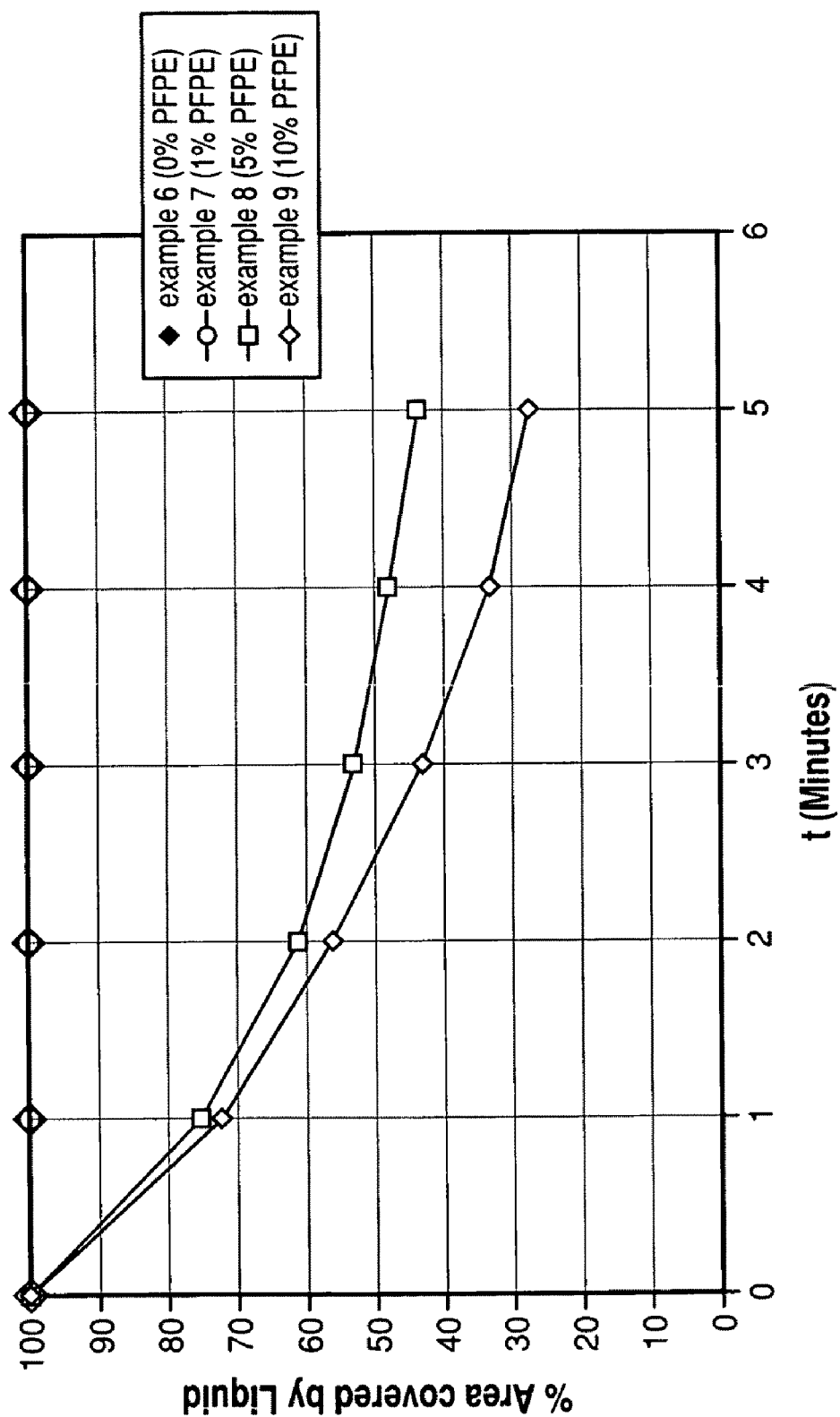
FIG. 17 is a graph showing the percentage of area covered with a test liquid vs. time for gas-permeable composites according to the present invention.

FIG. 17 is a graph showing the % of area covered by the test liquid vs. time using liquid repellency test for Examples 6, 7, 8 and 9. As test liquid again the already described mixture of water, Polyvinylpyrrolidone and Tegoprene® 5847 was used (surface tension of 23 mN/m and a viscosity of 13.7 mPa·s at 25° C.). The graph in FIG. 17 clearly shows that Examples 8 and 9 which have the coating of PFPE as well as the oleophobic coating on the ePTFE substrate 2 have much improved repellency towards the test mixture than Example 6 which has no additional PFPE coating.

Figure 18:
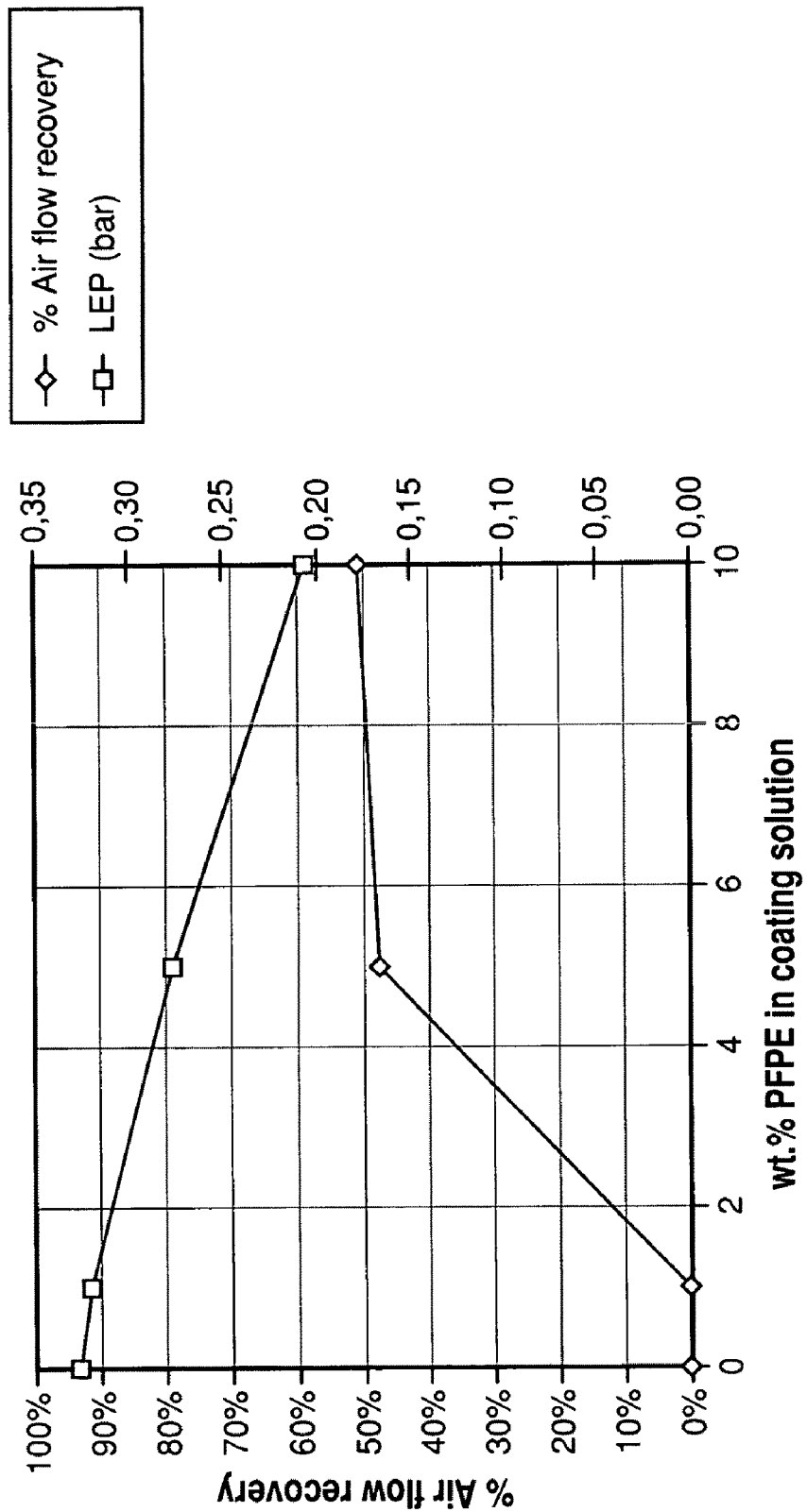
FIG. 18 is a graph showing the percentage of air flow recovery and liquid entry pressure vs. wt. % PFPE in a coating solution for gas-permeable composites according to the present invention.

FIG. 18 is a graph showing both the % air flow recovery- and also the liquid entry pressure (LEP) vs. wt. % of PFPE in the coating solution for Examples 6, 7, 8 and 9. The test liquid for measuring the % air flow recovery was again the already described mixture of water, Polyvinylpyrrolidone and Tegoprene® 5847. The test liquid for measuring the liquid entry pressure was the already described mixture of water, 2-Propanol and sodium dodecylsulfate (surface tension: 26.5 mN/m; viscosity: 2.8 mPa·s). The graph in FIG. 18 clearly shows that Examples 8 and 9 have a much improved repellency towards the test mixture than Example 6, but still exhibit a high LEP greater than 0.2 bar.

Examples 10 and 11 described below were prepared to prove a good liquid repellency performance using different types of PFPE oils. In these examples, Krytox® GPL107 (from DuPont Company) and Fomblin® Y LVAC25/6 from (Solvay Solexis Company) were tested and compared with each other. In both cases about the same good liquid repellency performance was achieved.

Example 10

The substrate 1 was coated with a coating solution comprising 1 wt. % Teflon® AF1600 and 10 wt. % PFPE-oil (Krytox® GPL107 from DuPont) using the discontinuous coating process B.

The coating solution was obtained by placing 1 g of Teflon® AF 1600 and 10 g of PFPE (Krytox® GPL107 from DuPont) in 89 g of the perfluorinated solvent PF-5070 (from 3M company) to result in a 1 wt. % Teflon® AF1600/10 wt. % PFPE coating solution. The mixture was stirred around 6 hours at room temperature until the Teflon® AF1600 was completely dissolved.

Example 11

The substrate 1 was coated with a coating solution comprising 1 wt. % Teflon® AF1600 and 10 wt. % PFPE-oil (Fomblin® Y LVAC 25/6 from Solvay Solexis company) using the discontinuous coating process B.

The coating solution was obtained by placing 1 g of Teflon® AF1600 and 10 g of PFPE (Fomblin® Y LVAC 25/6 from Solvay Solexis company) in 89 g of the perfluorinated solvent PF-5070 (from 3M company) to result in a 1 wt. % Teflon® AF1600/10 wt. % PFPE coating solution. The mixture was stirred for around 6 hours at room temperature until the Teflon® AF 1600 was completely dissolved.

Figure 19:
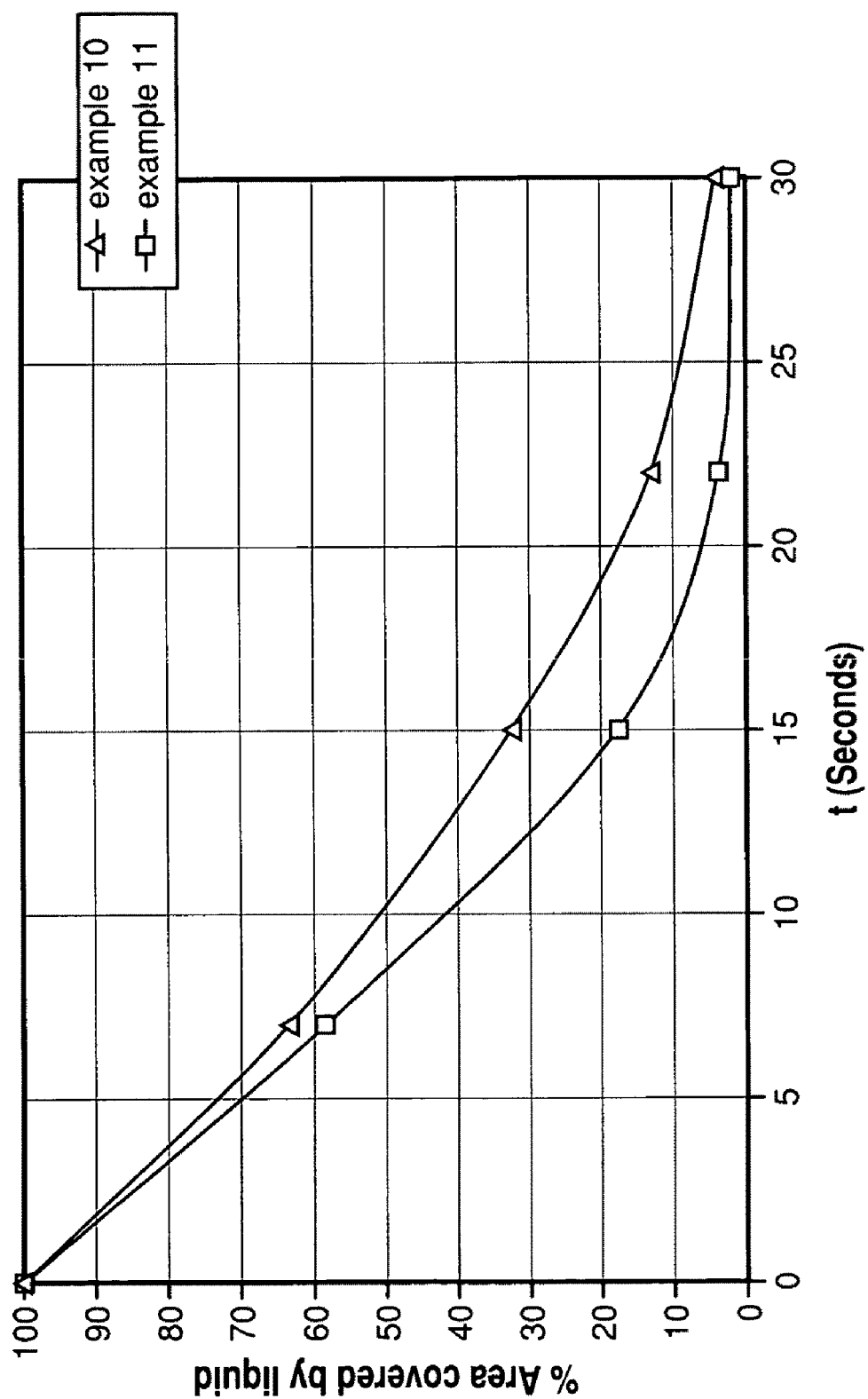
FIG. 19 is a graph showing the percentage of area covered by a liquid vs. time for gas-permeable composites according to the present invention.

FIG. 19 is a graph showing the % of area covered by the test liquid vs. time using liquid repellency test for Examples 10 and 11. As test liquid again the already described mixture of water, Polyvinylpyrrolidone and Tegoprene® 5847 was used (surface tension of 23 mN/m and a viscosity of 13.7 mPa·s at 25° C.). The graph shows that both types of PFPE oils are about same effective in improving the liquid repellency performance of the prepared substrates.

Examples 12 and 13 are examples with the biaxial expanded ePTFE membrane (Substrate 3). Also in this case an improvement in air flow recovery was achieved by combining a liquid PFPE oil with Teflon® AF.

Example 12

Substrate 3 was only coated with a 1 wt. % Teflon® AF1600 coating solution using the continuous coating process A.

The coating solution was obtained by placing 1 g Teflon® AF1600 in 99 g of the perfluorinated solvent PF-5070 (from 3M company) to result in a 1 wt. % solution of Teflon® AF 1600. The mixture was stirred for around 6 hours at room temperature until the Teflon® AF1600 was completely dissolved.

The resultant coated substrate 3 had an oil rating of 5. Furthermore, the coated substrate 12 showed an air flow of about 15.6 Gurley seconds, a WEP of about 3.7 bar and a LEP of about 0.69 bar. The initial air flow of coated substrate 3 was 4.85 l/h/cm$^2$ (measured at a pressure of 12 mbar).

The residual air flow was 0.0 l/h/cm$^2$ (measured at a pressure of 12 mbar). There was therefore no air flow recovery after exposure to the test liquid as described in air flow recovery test.

All measured data are shown in Table 5 below.

Example 13

The substrate 3 was coated with a coating solution comprising 1 wt. % Teflon® AF1600 and 10 wt. % PFPE oil (Fomblin® Y LVAC 25/6 from Solvay Solexis company) using the continuous coating process A.

The coating solution was obtained by placing 1 g of Teflon® AF1600 and 10 g of PFPE (Fomblin® Y LVAC 25/6 from Solvay Solexis company) in 89 g of the perfluorinated solvent PF-5070 (from 3M company) to result in a 1 wt. % Teflon® AF1600/10 wt. % PFPE coating solution. The mixture was stirred around 6 hours at room temperature until the Teflon® AF 1600 was completely dissolved.

The resultant coated substrate 3 had an oil rating of 4. Furthermore, the coated substrate 3 showed an air flow of about 40.6 Gurley seconds, a WEP of about 2.60 bar and a LEP of about 0.35 bar. The initial air flow of coated substrate 1 was 3.05 l/h/cm$^2$ (measured at a pressure of 12 mbar).

The residual air flow was 0.25 l/h/cm$^2$ (measured at a pressure of 12 mbar). This means an air flow recovery of 8% after exposure to the test liquid as described in air flow recovery test.

All measured data are shown in Table 5 below.

TABLE 5

Table 5: Summary of the measurements on the Examples 12 and 13 (substrate 3 was used for preparation of all samples).

| | | | | | | Air-flow recovery test | | |
|---|---|---|---|---|---|---|---|---|
| Example | Coating Solution Composition | Oil Rating | Air permeability (Gurley) (sec.) | Water entry pressure (WEP) (bar) | Liquid entry pressure (LEP) (bar) | Initial air flow (l/h/cm$^2$) @ 12 mbar | Residual air flow after 5 min (l/h/cm$^2$) @ 12 mbar | % air flow recovery |
| 12 | 1% AF1600 | 5 | 15.6 | 3.7 | 0.69 | 4.85 | 0 | 0 |
| 13 | 1% AF1600/ 10% PFPE | 4 | 40.6 | 2.6 | 0.35 | 3.05 | 0.25 | 8.0 |

Figure 20:
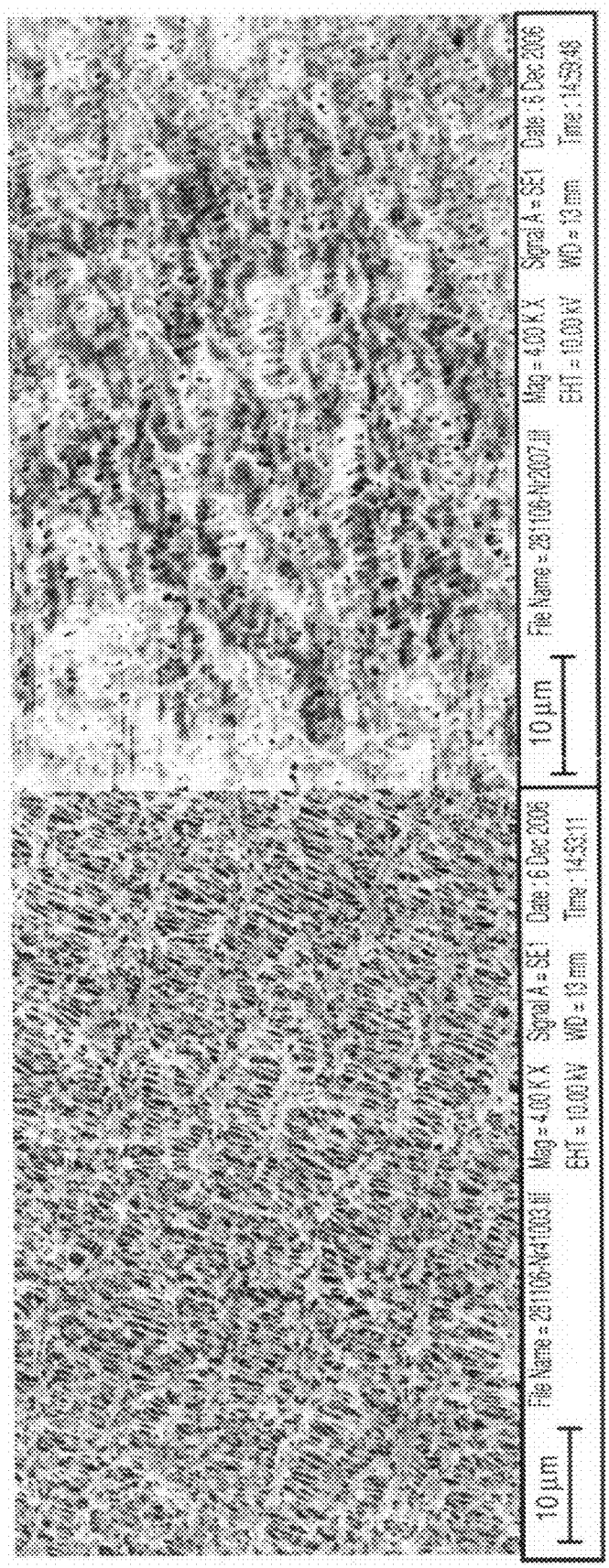
FIG. 20 compares SEM images of two samples, the first coated with a solution of 1 wt. % Teflon® AF1600 in a fluorinated solvent (left image), and the second coated with a mixture of 1 wt. % Teflon® AF1600 and 10 wt. % PFPE in a fluorinated solvent (right image)

FIG. 20 compares an SEM image of Example 12 with Example 13. As already pointed out for Example 5 in the earlier examples, Example 13 also shows that a significant amount of pores are filled or covered by the coating components.

Example 15 in the following is a further example showing both a high air flow recovery after liquid challenge and also a high liquid entry pressure (LEP). Example 14 is added as for comparison purposes.

Example 14

Substrate 4 was coated with a 1 wt. % Teflon® AF1600 coating solution using the continuous coating process A.

The coating solution was obtained by placing 1 g Teflon® AF1600 in 99 g of the perfluorinated solvent PF-5070 (from 3M company) to result in a 1 wt. % solution of Teflon® AF1600. The mixture was stirred for around 6 hours at room temperature until the Teflon® AF1600 was completely dissolved.

The resultant coated substrate 4 showed an oil rating of 6. Furthermore, the coated substrate 4 exhibited an air flow of about 13.5 Gurley seconds, a WEP of about 1.36 bar and a LEP of about 0.35 bar. The initial air flow of coated substrate 4 was 3.64 l/h/cm$^2$ (measured at a pressure of 12 mbar).

The residual air flow was 0.57 l/h/cm$^2$ (measured at a pressure of 12 mbar). This means an air flow recovery of 15.7% after exposure to the test liquid as described in air flow recovery test.

Figure 21:
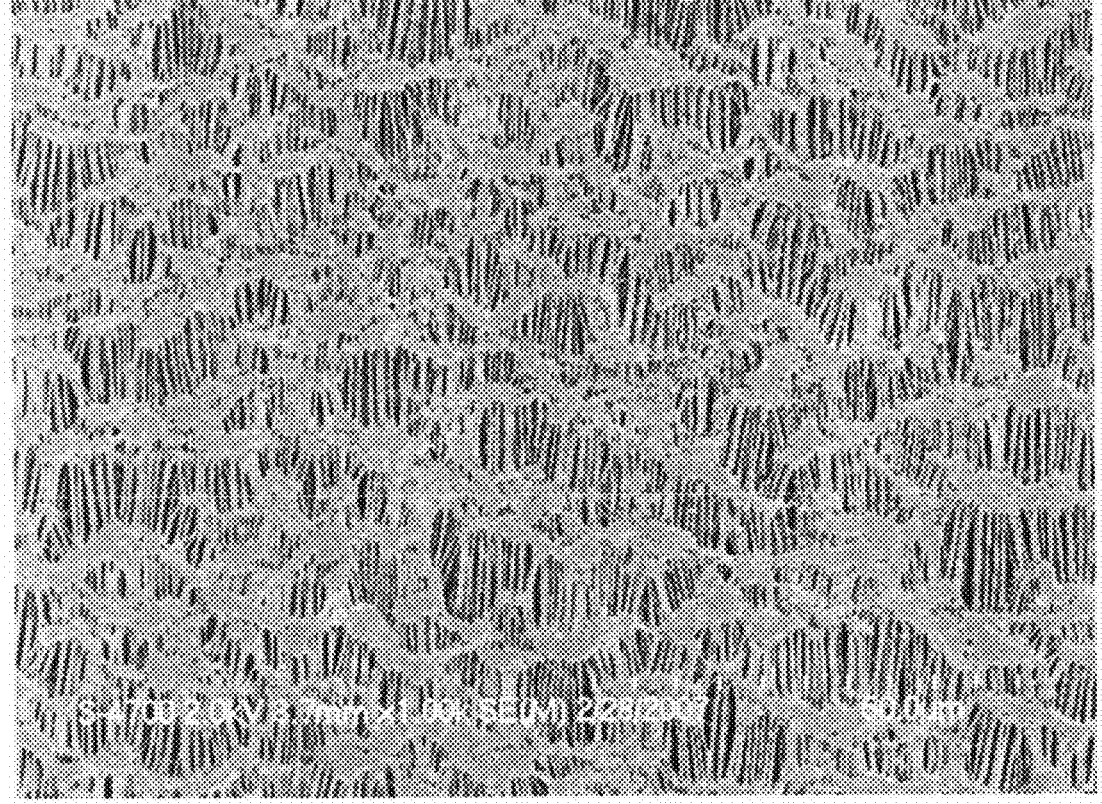
FIGS. 21-22 are SEM images at different scales of magnification of an air-permeable composite which was coated by a solution of 1 wt. % Teflon® AF1600 in a fluorinated solvent.
Figure 22:
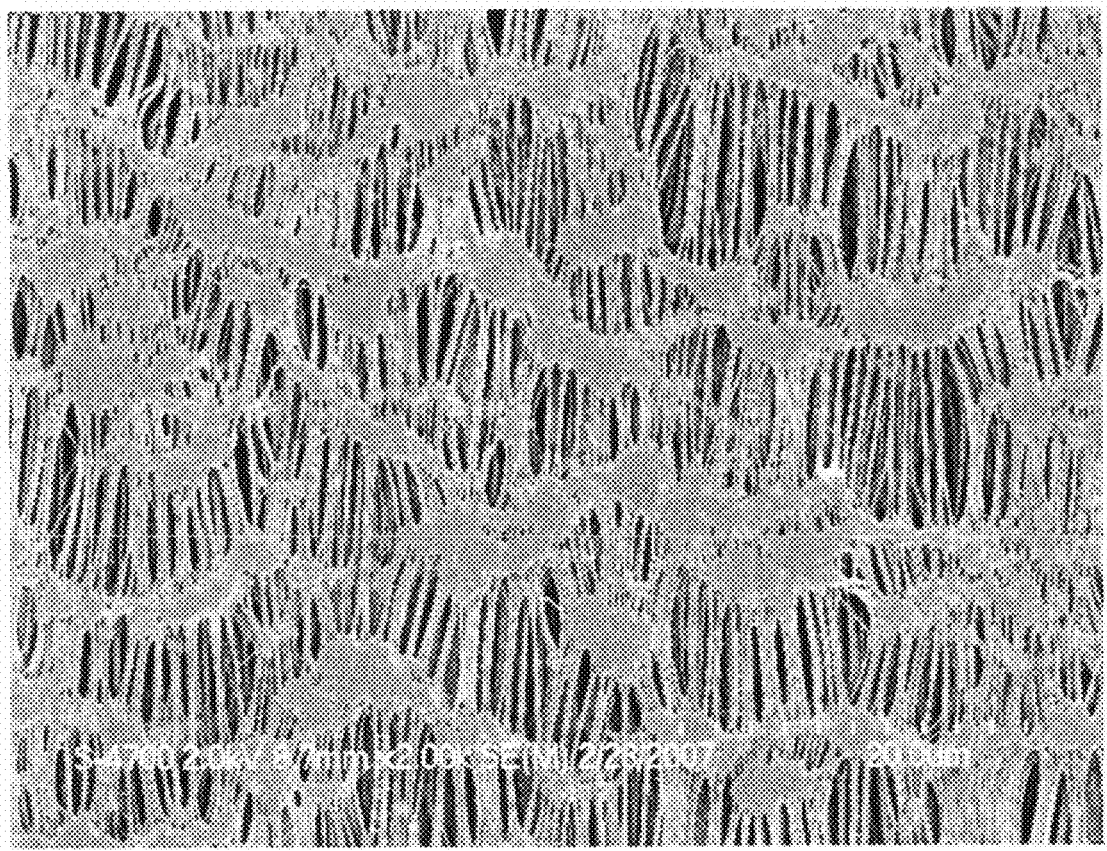

FIGS. 21 and 22 show SEM surface images of Example 14 which is only Teflon® AF coated.

All measured data are shown in Table 6 below.

Example 15

Substrate 4 was coated with a coating solution comprising 1 wt. % Teflon® AF1600 and 4 wt. % PFPE using the continuous coating process A.

The coating solution was obtained by placing 1 g of Teflon® AF1600 and 4 g of PFPE (Fomblin® Y LVAC 25/6) in 95 g of the perfluorinated solvent PF-5070 (from 3M company) to result in a 1 wt. % Teflon® AF1600/4 wt. % PFPE coating solution. The mixture was stirred around 6 hours at room temperature until the Teflon® AF1600 was completely dissolved.

The resultant coated substrate 4 had an oil-rating of 6, a Gurley number of about 13.1 seconds, a WEP of about 1.21 bar and a LEP of about 0.25 bar. The initial air flow of coated substrate 1 was 4.95 l/h/cm$^2$ (measured at a pressure of 12 mbar).

This sample showed a residual air flow of about 3.89 l/h/cm$^2$ (measured at 12 mbar). This corresponded to an air flow recovery of 78.5%.

Therefore this sample showed both a superior air flow recovery with a challenging liquid as demonstrated by the high air flow recovery after exposure to air flow recovery test and also a higher liquid entry pressure which is important for practical venting applications.

Figure 23:
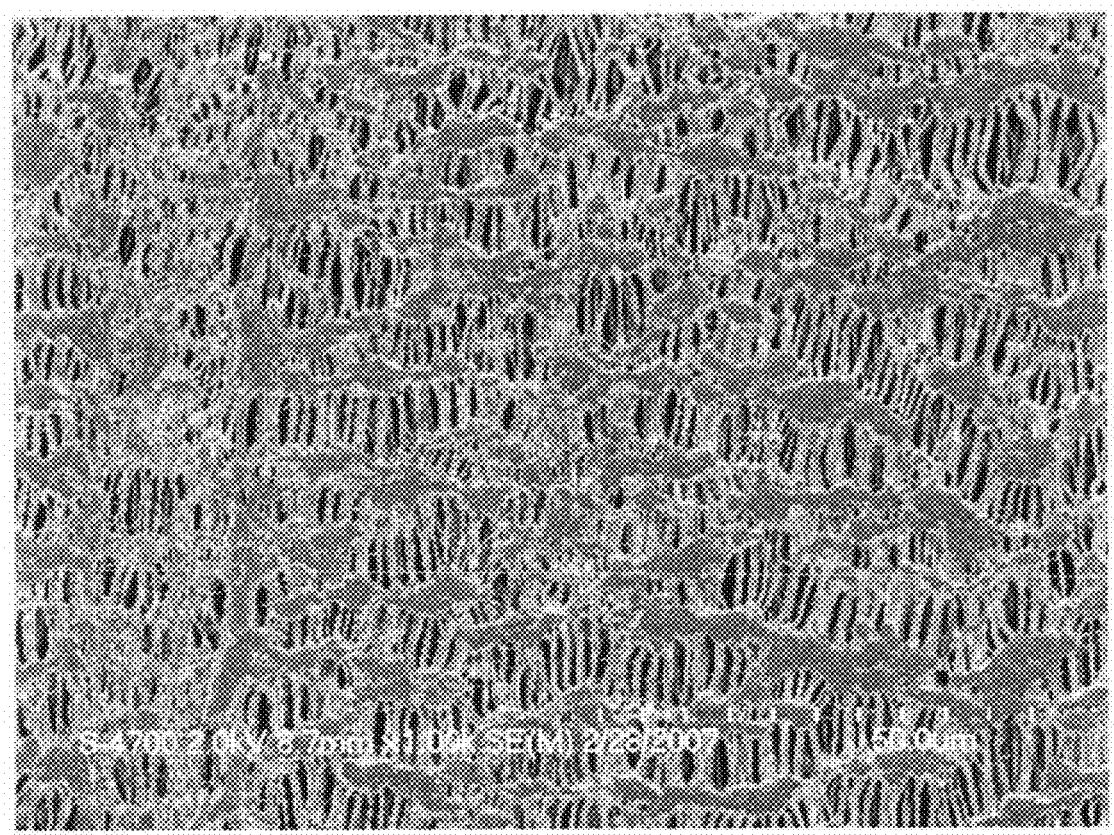
FIGS. 23-24 are SEM images at different scales of magnification of an air-permeable composite according to the present invention which was coated by a solution of 1 wt. % Teflon® AF1600 and 4 wt. % PFPE in a fluorinated solvent.
Figure 24:
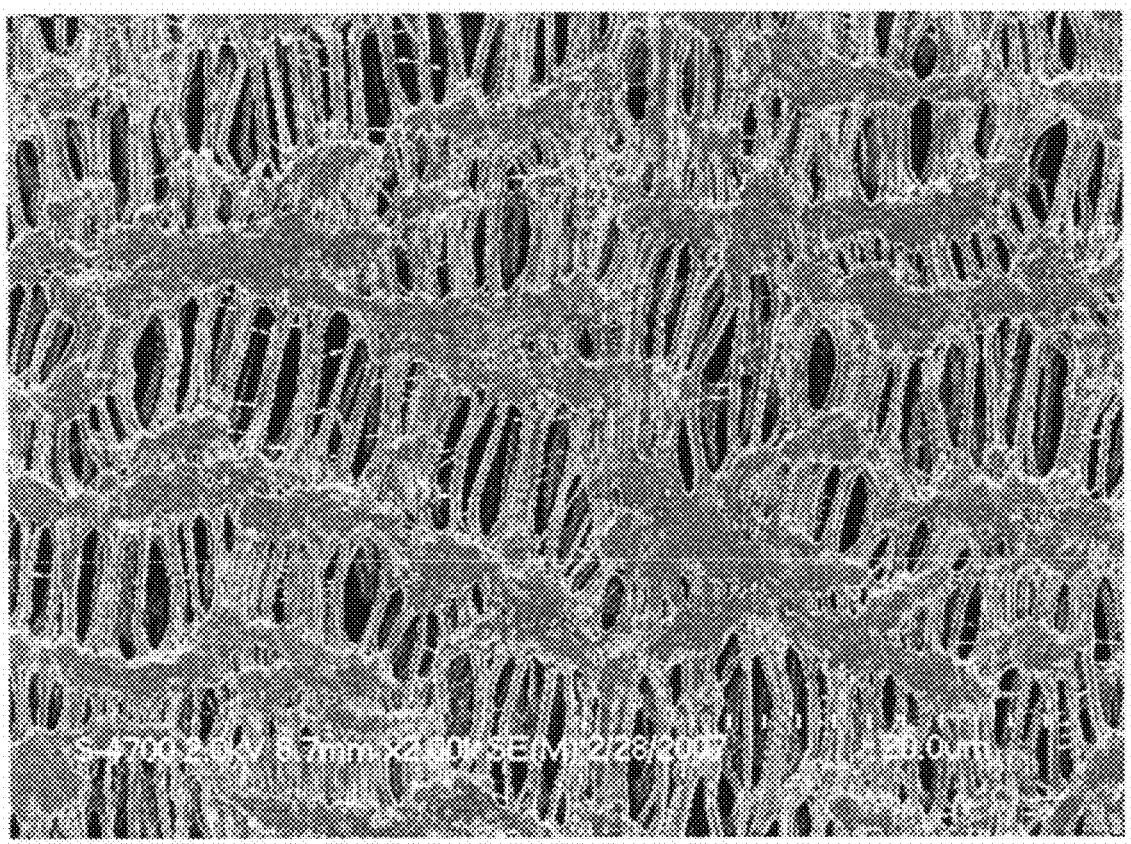

FIGS. 23 and 24 show SEM images of Example 15 with the combination of Teflon® AF and PFPE oil. Example 15 exhibits bridging elements between the nodal areas consisting of the coating components at least partially filling or covering pores.

All measured data are shown in Table 6 below.

TABLE 6

Table 6: Summary of the measurements on the Examples 14 and 15 (substrate 4 was used for preparation of all samples).

| | | | | | | Air flow recovery test | | |
|---|---|---|---|---|---|---|---|---|
| Example | Coating Solution composition | Oil rating | Air permeability (Gurley) (sec.) | Water entry pressure (WEP) (bar) | Liquid entry pressure (LEP) (bar) | Initial air flow (l/h/cm$^2$) @ 12 mbar | Residual air flow after 5 min (l/h/cm$^2$) @ 12 mbar | % air flow recovery |
| 14 | 1% AF1600 | 6 | 13.5 | 1.36 | 0.35 | 3.64 | 0.57 | 15.7 |
| 15 | 1% AF1600/ 4% PFPE | 6 | 13.1 | 1.21 | 0.25 | 4.95 | 3.89 | 78.5 |

The invention claimed is:
1. A venting apparatus having an opening for venting gas from an enclosure or receptacle, said venting apparatus including a porous gas-permeable venting composite comprising:
   (a) a porous polymeric structure having a structure defining a plurality of pores extending therethrough and with at least one outer surface;
   (b) a coating covering at least a portion of said outer surface of the porous polymeric structure, wherein the porous polymeric structure with the coating is porous and gas-permeable;
   (c) said coating comprising at least a first and a second component;
   (d) said first component comprising oleophobic and hydrophobic fluorinated material; and
   (e) said second component comprising a perfluoropolyether (PFPE), said PFPE comprising the following end-groups:

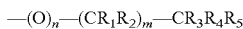

wherein:
   $R_1$=H, F, Cl, Br or I;
   $R_2$=H, F, Cl, Br or I;
   $R_3$=H, F, Cl, Br or I;
   $R_4$=H, F, Cl, Br or I;
   $R_5$=H, F, Cl, Br, I, alkyl or aryl;
   n=0 or 1; and
   =0-10,
wherein the weight ratio between the first and the second component in the formed coating is within the range of 1 weight part of the first component to 0.01-100 weight parts of the second component.

2. A venting apparatus having an opening for venting gas from an enclosure or receptacle, said venting apparatus including a porous gas-permeable venting composite comprising:
   (a) a porous polymeric structure having a structure defining a plurality of pores extending therethrough and with at least one outer surface;
   (b) a coating covering at least a portion of said outer surface of the porous polymeric structure, wherein the porous polymeric structure with the coating is porous and gas-permeable;
   (c) said coating comprising at least a first and a second component;
   (d) said first component comprising oleophobic and hydrophobic fluorinated material; and
   (e) said second component comprising a block copolymer, said block-copolymer comprising a PFPE backbone.

3. A venting apparatus having an opening for venting gas from an enclosure or receptacle, said venting apparatus including a porous gas-permeable venting composite comprising:
   (a) a porous polymeric structure having a structure defining a plurality of pores extending therethrough and with at least one outer surface;
   (b) a coating covering at least a portion of said outer surface of the porous polymeric structure, wherein the porous polymeric structure with the coating is porous and gas-permeable;
   (c) said coating comprising at least a first and a second component;
   (d) said first component comprising oleophobic and hydrophobic fluorinated material; and
   (e) said second component comprising a perfluoropolyether (PFPE), said PFPE comprising the following end-groups:

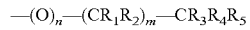

wherein:
   $R_1$=H, F, Cl, Br or I;
   $R_2$=H, F, Cl, Br or I;
   $R_3$=H, F, Cl, Br or I;
   $R_4$=H, F, Cl, Br or I;
   $R_5$=H, F, Cl, Br, I, alkyl or aryl;
   n=0 or 1; and
   m=0-10,
wherein the gas-permeable composite has an air flow recovery greater than 5% in the air flow recovery test after contact with a water based liquid at 25° C. and a liquid contact time of 5 sec and a waiting time of 5 min, with the liquid being composed of 3 wt. % polyvinylpyrrolidone, 3 wt. % silicone surfactant, and 94 wt. % deionised water, and the liquid having a surface tension of 23 mN/m and a viscosity of 13.7 mPa·s measured at a shear rate of 50 $\sec^{-1}$.

4. A venting apparatus having an opening for venting gas from an enclosure or receptacle, said venting apparatus including a porous gas-permeable venting composite comprising:
   (a) a porous polymeric structure having a structure defining a plurality of pores extending therethrough and with at least one outer surface;
   (b) a coating covering at least a portion of said outer surface of the porous polymeric structure, wherein the porous polymeric structure with the coating is porous and gas-permeable;
   (c) said coating comprising at least a first and a second component;
   (d) said first component comprising oleophobic and hydrophobic fluorinated material; and
   (e) said second component comprising a block copolymer, said block-copolymer comprising a PFPE backbone,
wherein the gas-permeable composite has an air flow recovery greater than 5% in the air flow recovery test after contact with a water based liquid at 25° C. and a liquid contact time of 5 sec and a waiting time of 5 min, with the liquid being composed of 3 wt. % polyvinylpyrrolidone, 3 wt. % silicone surfactant, and 94 wt. % deionised water, and the liquid having a surface tension of 23 mN/m and a viscosity of 13.7 mPa·s measured at a shear rate of 50 $\sec^{-1}$.

5. A venting apparatus including a porous gas-permeable venting composite according to claim 3 wherein the weight ratio between the first and the second component in the formed coating is within the range of 1 weight part of the first component to 0.01-100 weight parts of the second component.

6. A venting apparatus including a porous gas-permeable venting composite according to claim 1 wherein the weight ratio between the first and the second component in the formed coating is within the range of 1 weight part of the first component to 0.5-100 weight parts of the second component.

7. A venting apparatus including a porous gas-permeable venting composite according to claim 6 wherein the weight ratio between the first and the second component in the formed coating is within the range of 1 weight part of the first component to 1.5-100 weight parts of the second component.

8. A venting apparatus including a porous gas-permeable venting composite according to claim 7 wherein the weight ratio between the first and the second component in the formed coating is within the range of 1 weight part of the first component to 2-100 weight parts of the second component.

9. A venting apparatus including a porous gas-permeable venting composite according to claim 1 or 2, wherein the gas-permeable composite has an air flow recovery greater than 50% in the gas flow recovery test after contact with a viscous oil at 25° C. having both a viscosity of about 60 mPa·s (at a shear rate of 50 sec$^{-1}$) and a surface tension of about 29.5 mN/m.

10. A venting apparatus including a porous gas-permeable venting composite according to claim 1 or 2, wherein the gas-permeable composite has an oil rating of greater than 2.

11. A venting apparatus including a porous gas-permeable venting composite according to claim 10, wherein the gas-permeable composite has an oil rating of greater than 3.

12. A venting apparatus including a porous gas-permeable venting composite according to claim 1 or 2, wherein the ratio of total coating weight relative to the weight of the porous polymeric structure is at least 3%.

13. A venting apparatus including a porous gas-permeable venting composite according to claim 1 or 2, wherein the coating blocks 0.01-70% of pores on the outer surface of the porous polymeric structure.

14. A venting apparatus including a porous gas-permeable venting composite according to claim 1 or 2, wherein the first component comprises an oleophobic and hydrophobic fluorinated or perfluorinated oligomer and/or polymer.

15. A venting apparatus including a porous gas-permeable venting composite according to claim 14, wherein the first component comprises a compound selected from the groups of fluorinated or perfluorinated esters in oligomeric or polymeric form, and tetrafluoroethylene co- or ter-polymers.

16. A venting apparatus including a porous gas-permeable venting composite according to claim 1, wherein the second component is selected from at least one of the following and combinations thereof:

$$CF_3—[(OCF(CF_3)CF_2)_m—(OCF_2)_n—]OCF_3$$

where m+n=8 to 1000 and
m/n=20 to 1000;

$$CF_3—[(OCF_2CF_2)_m—(OCF_2)_n—]CF_3$$

where m+n=40 to 1000 and
m/n=0.5 to 2;

$$CF_3CF_2CF_2O—(CF(CF_3)CF_2O)_n—CF_2CF_3$$

where n=10 to 1000; and $$CF_3CF_2CF_2O—(CF_2CF_2CF_2O)_n—CF_2CF_3$$

where n=10 to 1000.

17. A gas-permeable composite according claim 1, wherein the second component is selected from at least one of the following and combinations thereof:

$$CF_3—[(OCF(CF_3)CF_2)_m—(OCF_2)_n—]OCF_3$$

where m+n=8 to 45 and
m/n=20 to 1000;

$$CF_3—[(OCF_2CF_2)_m—(OCF_2)_n—]OCF_3$$

where m+n=40 to 180 and
m/n=0.5 to 2;

$$CF_3CF_2CF_2O—(CF(CF_3)CF_2O)_n—CF_2CF_3$$

where n=10 to 60; and $$CF_3CF_2CF_2O—(CF_2CF_2CF_2O)_n—CF_2CF_3.$$

18. A venting apparatus including a porous gas-permeable venting composite according to claim 1, wherein the second component comprises repeat units including any of the following: $CF_2O$; $CF_2CF_2O$; $CF(CF_3)O$; $CF_2CF_2CF_2O$; $CF_2CF(CF_3)O$; $CF(CF_3)CF_2O$; $C(CF_3)_2O$; $CF_2CF_2CF_2CF_2O$; $C_5F_{100}$ or $C_6F_{12}O$.

19. A venting apparatus including a porous gas-permeable venting composite according to claim 1, wherein the endgroups are selected from at least one of the following and combinations thereof:

—$OCF_3$; —$OC_2F_5$; —$OC_3F_7$; —$OC_4F_9$; —$OC_5F_{11}$;
—$OC_6F_{13}$; —$OC_7F_{15}$; —$OC_8F_{17}$; —$OC_9F_{19}$;
—$OC_{10}F_{21}$;

—$OCF_2H$; —$OC_2F_4H$; —$OC_3F_6H$; —$OC_4F_8H$;
—$OC_5F_{10}H$; —$OC_6F_{12}H$; —$OC_7F_{14}H$;
—$OC_8F_{16}H$; —$OC_9F_{18}H$; —$OC_{10}F_{20}H$;

—$OCF_2Cl$; —$OC_2F_4Cl$; —$OC_3F_6Cl$; —$OC_4F_8Cl$;
—$OC_5F_{10}Cl$; —$OC_6F_{12}Cl$; —$OC_7F_{14}Cl$;
—$OC_8F_{16}Cl$; —$OC_9F_{18}Cl$; —$OC_{10}F_{20}Cl$;

—$OCF_2Br$; —$OC_2F_4Br$; —$OC_3F_6Br$; —$OC_4F_8Br$;
—$OC_5F_{10}Br$; —$OC_6F_{12}Br$; —$OC_7F_{14}Br$;
—$OC_8F_{16}Br$; —$OC_9F_{18}Br$; —$OC_{10}F_{20}Br$;

—$OCF_2I$; —$OC_2F_4I$; —$OC_3F_6I$; —$OC_4F_8I$;
—$OC_5F_{10}I$; —$OC_6F_{12}I$; —$OC_7F_{14}I$; —$OC_8F_{16}I$;
—$OC_9F_{18}I$; —$OC_{10}F_{20}I$;

—$OCF_1H_2$; —$OC_2F_3H_2$; —$OC_3F_5H_2$; —$OC_4F_7H_2$;
—$OC_5F_9H_2$; —$OC_6F_{11}H_2$; —$OC_7F_{13}H_2$;
—$OC_8F_{15}H_2$; —$OC_9F_{17}H_2$; —$OC_{10}F_{19}H_2$;

—$OCFCl_2$; —$OC_2F_3Cl_2$; —$OC_3F_5Cl_2$; —$OC_4F_7Cl_2$;
—$OC_5F_9Cl_2$; —$OC_6F_{11}Cl_2$; —$OC_7F_{13}Cl_2$;
—$OC_8F_{15}Cl_2$; —$OC_9F_{17}Cl_2$; —$OC_{10}F_{19}Cl_2$;

—$OCF_1Br_2$; —$OC_2F_3Br_2$; —$OC_3F_5Br_2$;
—$OC_4F_7Br_2$; —$OC_5F_9Br_2$; —$OC_6F_{11}Br_2$;
—$OC_7F_{13}Br_2$; —$OC_8F_{15}Br_2$; —$OC_9F_{17}Br_2$;
—$OC_{10}F_{19}Br_2$;

—$OCF_1I_2$; —$OC_2F_3I_2$; —$OC_3F_5I_2$; —$OC_4F_7I_2$;
—$OC_5F_9I_2$; —$OC_6F_{11}I_2$; —$OC_7F_{13}I_2$;
—$OC_8F_{15}I_2$; —$OC_9F_{17}I_2$; —$OC_{10}F_{19}I_2$;

—$CF_3$; —$C_2F_5$; —$C_3F_7$; —$C_4F_9$; —$C_5F_{11}$; —$C_6F_{13}$;
—$C_7F_{15}$; —$C_8F_{17}$; —$C_9F_{19}$; —$C_{10}F_{21}$;

—$CF_2H$; —$C_2F_4H$; —$C_3F_6H$; —$C_4F_8H$; —$C_5F_{10}H$;
—$C_6F_{12}H$; —$C_7F_{14}H$; —$C_8F_{16}H$; —$C_9F_{18}H$;
—$C_{10}F_{20}H$;

—$CF_2Cl$; —$C_2F_4Cl$; —$C_3F_6Cl$; —$C_4F_8Cl$;
—$C_5F_{10}Cl$; —$C_6F_{12}Cl$; —$C_7F_{14}Cl$; —$C_8F_{16}Cl$;
—$C_9F_{18}Cl$; —$C_{10}F_{20}Cl$;

—$CF_2Br$; —$C_2F_4Br$; —$C_3F_6Br$; —$C_4F_8Br$;
—$C_5F_{10}Br$; —$C_6F_{12}Br$; —$C_7F_{14}Br$; —$C_8F_{16}Br$;
—$C_9F_{18}Br$; —$C_{10}F_{20}Br$;

—$CF_2I$; —$C_2F_4I$; —$C_3F_6I$; —$C_4F_8I$; —$C_5F_{10}I$;
—$C_6F_{12}I$; —$C_7F_{14}I$; —$C_8F_{16}I$; —$C_9F_{18}I$;
—$C_{10}F_{20}I$; —$CF_1H_2$; —$C_2F_3H_2$; —$C_3F_5H_2$;
—$C_4F_7H_2$; —$C_5F_9H_2$; —$C_6F_{11}H_2$; —$C_7F_{13}H_2$;
—$C_8F_{15}H_2$; —$C_9F_{17}H_2$; —$C_{10}F_{19}H_2$;

—$CFCl_2$; —$C_2F_3Cl_2$; —$C_3F_5Cl_2$; —$C_4F_7Cl_2$;
—$C_5F_9Cl_2$; —$C_6F_{11}Cl_2$; —$C_7F_{13}Cl_2$;
—$C_8F_{15}Cl_2$; —$C_9F_{17}Cl_2$; —$C_{10}F_{19}Cl_2$;

—$CF_1Br_2$; —$C_2F_3Br_2$; —$C_3F_5Br_2$; —$C_4F_7Br_2$;
—$C_5F_9Br_2$; —$C_6F_{11}Br_2$; —$C_7F_{13}Br_2$;
—$C_8F_{15}Br_2$; —$C_9F_{17}Br_2$; —$C_{10}F_{19}Br_2$; and —$CF_1I_2$; —$C_2F_3I_2$; —$C_3F_5I_2$; —$C_4F_7I_2$; —$C_5F_9I_2$;
—$C_6F_{11}I_2$; —$C_7F_{13}I_2$; —$C_8F_{15}I_2$; —$C_9F_{17}I_2$;
—$C_{10}F_{19}I_2$.

20. A venting apparatus including a porous gas-permeable venting composite according to claim 1 or 2, wherein the porous polymeric structure is microporous comprising inorganic, organic or polymeric material.

21. A venting apparatus including a porous gas-permeable venting composite according to claim 1 or 2, wherein the porous polymeric structure is a woven or non-woven.

22. A venting apparatus including a porous gas-permeable venting composite according to claim 1 or 2, wherein the porous polymeric structure comprises expanded PTFE.

23. A venting apparatus including a porous gas-permeable venting composite according to claim 1 or 2, wherein the composite is laminated to or combined with a support layer.

24. A venting apparatus including a porous gas-permeable venting composite according to claim 23, wherein the support layer comprises a woven structure or non-woven structure.

25. A venting apparatus including a porous gas-permeable venting composite according to claim 23, wherein the gas-permeable composite is laminated to both sides of the support layer.

26. A venting apparatus having an opening for venting gas from an enclosure or receptacle, said venting apparatus including a porous gas-permeable venting composite comprising:
(a) a porous polymeric structure having a structure defining a plurality of pores extending therethrough and with at least one outer surface;
(b) a coating covering at least a portion of said outer surface of the porous polymeric structure, wherein the porous polymeric structure with the coating is porous and gas-permeable;
(c) said coating comprising at least a first and a second component;
(d) said first component comprises an oleophobic and hydrophobic compound selected from the groups of fluorinated or perfluorinated esters in oligomeric or polymeric form, and tetrafluoroethylene co- or ter-polymers; and
(e) said second component comprising a perfluoropolyether (PFPE) selected from at least one of the following and combinations thereof:

$$CF_3-[(OCF(CF_3)CF_2)_m-(OCF_2)_n-]OCF_3$$

where m+n=8 to 1000 and
m/n=20 to 1000;

$$CF_3-[(OCF_2CF_2)_m-(OCF_2)_n]OCF_3$$

where m+n=40 to 1000 and
m/n=0.5 to 2;

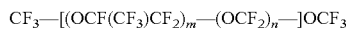

where n=10 to 1000; and $$CF_3CF_2CF_2O-(CF_2CF_2CF_2O)_n-CF_2CF_3,$$

where n=10 to 1000.

27. A venting apparatus including a porous gas-permeable venting composite according to claim 26, wherein said second component is selected from at least one of the following and combinations thereof:

$$CF_3-[(OCF(CF_3)CF_2)_m-(OCF_2)_n-]OCF_3$$

where m+n=8 to 45 and
m/n=20 to 1000;

$$CF_3-[(OCF_2CF_2)_m-(OCF_2)_n-]OCF_3$$

where m+n=40 to 180 and
m/n=0.5 to 2;

$$CF_3CF_2CF_2O-(CF(CF_3)CF_2O)_n-CF_2CF_3$$ where
n=10 to 60; and $$CF_3CF_2CF_2O-(CF_2CF_2CF_2O)_n-CF_2CF_3.$$

28. A venting apparatus having an opening for venting gas from an enclosure or receptacle, said venting apparatus comprising:
a porous gas-permeable composite venting element located within, outside or on said venting apparatus and forming a liquid-tight seal for said opening, said porous gas-permeable composite venting element comprising:
(a) a porous polymeric structure having a structure defining a plurality of pores extending therethrough and with at least one outer surface;
(b) a coating covering at least a portion of said outer surface of the porous polymeric structure, wherein the porous polymeric structure with the coating is porous and gas-permeable;
(c) said coating comprising at least a first and a second component;
(d) said first component comprising oleophobic and hydrophobic fluorinated material; and
(e) said second component comprising a perfluoropolyether (PFPE), comprising the following end-groups:

$$-(O)_n-(CR_1R_2)_m-CR_3R_4R_5$$

wherein:
$R_1$=H, F, Cl, Br or I;
$R_2$=H, F, Cl, Br or I;
$R_3$=H, F, Cl, Br or I;
$R_4$=H, F, Cl, Br or
$R_5$=H, F, Cl, Br, I, alkyl or aryl;
n=0 or 1; and
m=0-10.

29. A method of venting gas from an enclosure or receptacle, said method comprising:
providing a porous gas-permeable composite venting element within, outside or on a venting apparatus and forming a liquid-tight seal for an opening on said venting apparatus, said porous gas-permeable composite venting element comprising:
(a) a porous polymeric structure having a structure defining a plurality of pores extending therethrough and with at least one outer surface;
(b) a coating covering at least a portion of said outer surface of the porous polymeric structure, wherein the porous polymeric structure with the coating has pores and is gas-permeable;
(c) said coating comprising at least a first and a second component;
(d) said first component comprising oleophobic and hydrophobic fluorinated material; and
(e) said second component comprising a perfluoropolyether (PFPE), said PFPE comprising the following end-groups:

$$-(O)_n-(CR_1R_2)_m-CR_3R_4R_5$$

wherein:
$R_1$=H, F, Cl, Br or I;
$R_2$=H, F, Cl, Br or I;
$R_3$=H, F, Cl, Br or I;
$R_4$=H, F, Cl, Br or I;
$R_5$=H, F, Cl, Br, I, alkyl or aryl;
n=0 or 1; and
m=0-10.

* * * * *

UNITED STATES PATENT AND TRADEMARK OFFICE
CERTIFICATE OF CORRECTION

| | | |
|---|---|---|
| PATENT NO. | : 8,075,669 B2 | |
| APPLICATION NO. | : 12/107595 | |
| DATED | : December 13, 2011 | |
| INVENTOR(S) | : Klaus Meindl and Wolfgang Buerger | |

It is certified that error appears in the above-identified patent and that said Letters Patent is hereby corrected as shown below:

At column 2, line 66: change "-$OC_6F_1Br_2$" to -- -$OC_6F_{11}Br_2$ --.

At column 3, line 23: change "-$C_6F_1Br_2$" to -- -$C_6F_{11}Br_2$ --.

At column 7, line 58: change "poly(BFP/TFE)" to -- poly(HFP/TFE)--.

At column 40, lines 36-37, change "$OCF_{112}$; -$OC_2F_{312}$; -$OC_3F_{512}$; -$OC_4F_{712}$; -$OC_5F_{912}$;" to -- $OCF_1I_2$; -$OC_2F_3I_2$; -$OC_3F_5I_2$; -$OC_4F_7I_2$; -$OC_5F_9I_2$ --.

At column 40, line 65, change "-$C_4F_{712}$; -$C_5F_{912}$;" to -- -$C_4F_7I_2$; -$C_5F_9I_2$; --.

Signed and Sealed this
Fifth Day of June, 2012

David J. Kappos
*Director of the United States Patent and Trademark Office*